United States Patent
Tamse et al.

(10) Patent No.: US 11,546,602 B2
(45) Date of Patent: Jan. 3, 2023

(54) METHOD AND APPARATUS FOR IMAGE ENCODING, AND METHOD AND APPARATUS FOR IMAGE DECODING

(71) Applicant: SAMSUNG ELECTRONICS CO., LTD., Suwon-si (KR)

(72) Inventors: Anish Tamse, Suwon-si (KR); Woongil Choi, Suwon-si (KR); Minwoo Park, Suwon-si (KR); Seungsoo Jeong, Suwon-si (KR); Yinji Piao, Suwon-si (KR); Gahyun Ryu, Suwon-si (KR); Kiho Choi, Suwon-si (KR); Narae Choi, Suwon-si (KR); Minsoo Park, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/271,087

(22) PCT Filed: Aug. 26, 2019

(86) PCT No.: PCT/KR2019/010839
§ 371 (c)(1),
(2) Date: Feb. 24, 2021

(87) PCT Pub. No.: WO2020/040623
PCT Pub. Date: Feb. 27, 2020

(65) Prior Publication Data
US 2021/0321111 A1    Oct. 14, 2021

Related U.S. Application Data

(60) Provisional application No. 62/722,452, filed on Aug. 24, 2018.

(51) Int. Cl.
*H04N 19/137* (2014.01)
*H04N 19/105* (2014.01)
(Continued)

(52) U.S. Cl.
CPC ......... *H04N 19/137* (2014.11); *H04N 19/105* (2014.11); *H04N 19/159* (2014.11);
(Continued)

(58) Field of Classification Search
CPC .. H04N 19/137; H04N 19/105; H04N 19/159; H04N 19/176; H04N 19/186;
(Continued)

(56) References Cited

U.S. PATENT DOCUMENTS 9,571,851 B2   2/2017  Kim et al.
9,854,275 B2  12/2017  Joshi et al.
(Continued)

FOREIGN PATENT DOCUMENTS

KR   10-1346691 B1   12/2013
KR   10-1432767 B1    8/2014
(Continued)

OTHER PUBLICATIONS

Filippov, Alexey et al., "Support of 4:4:4 and 4:2:2 chroma formats in VVC", Joint Video Experts Team (JVET) of ITU-T SG 16 WP 3 and ISO/IEC JTC 1/SC 29/WG 11, 14th Meeting: Geneva, CH, Mar. 19, 2019-Mar. 27, 2019, Document: JVET-N0671-v1. (6 pages total).

(Continued)

*Primary Examiner* — Richard T Torrente
(74) *Attorney, Agent, or Firm* — Sughrue Mion, PLLC

(57) ABSTRACT

Provided is an image decoding method including determining a current chroma block having a rectangular shape corresponding to a current luma block included in one of a plurality of luma blocks, determining a piece of motion information for the current chroma block and a chroma block adjacent to the current chroma block by using motion information of the current chroma block and the adjacent chroma block, and performing inter prediction on the current (Continued)

chroma block and the adjacent chroma block by using the piece of motion information for the current chroma block and the adjacent chroma block to generate prediction blocks of the current chroma block and the adjacent chroma block.

3 Claims, 34 Drawing Sheets

(51) Int. Cl.
  *H04N 19/159* (2014.01)
  *H04N 19/176* (2014.01)
  *H04N 19/186* (2014.01)
  *H04N 19/513* (2014.01)

(52) U.S. Cl.
  CPC ......... *H04N 19/176* (2014.11); *H04N 19/186* (2014.11); *H04N 19/513* (2014.11)

(58) Field of Classification Search
  CPC .... H04N 19/513; H04N 19/119; H04N 19/70; H04N 19/51; H04N 19/124
  See application file for complete search history.

(56) References Cited

U.S. PATENT DOCUMENTS

| | | | |
|---|---|---|---|
| 2005/0053294 A1 | 3/2005 | Mukerjee et al. | |
| 2018/0316929 A1* | 11/2018 | Li | H04N 19/44 |
| 2019/0020878 A1* | 1/2019 | Xu | H04N 19/103 |
| 2019/0089974 A1 | 3/2019 | Lee | |
| 2020/0275118 A1* | 8/2020 | Wang | H04N 19/59 |
| 2020/0296380 A1* | 9/2020 | Aono | H04N 19/176 |
| 2020/0314446 A1 | 10/2020 | Tamse et al. | |

FOREIGN PATENT DOCUMENTS

| | | |
|---|---|---|
| KR | 10-1586125 B1 | 2/2016 |
| KR | 10-2018-0059443 A | 6/2018 |
| WO | 2015/078304 A1 | 6/2015 |
| WO | 2018/182310 A1 | 10/2018 |

OTHER PUBLICATIONS

International Search Report and Written Opinion dated Nov. 29, 2019 by the International Searching Authority in counterpart International Patent Application No. PCT/KR2019/010839. (PCT/ISA/210; PCT/ISA/220 and PCT/ISA/237).

Communication dated Jul. 15, 2021, issued by the Korean Patent Office in counterpart Korean Patent Application No. 10-2020-7037879.

Communication dated May 6, 2022, issued by the European Patent Office in counterpart European Application No. 19851989.4.

Chen et al., "Algorithm Description of Joint Exploration Test Model 7 (JEM 7)," Joint Video Exploration Team (JVET) of ITU-T SG 16 WP 3 and ISO/IEC JTC 1/SC 29/WG 11, Document: JVET-G1001-v1, Jul. 2017, XP030023716, Total 48 pages.

Schwarz et al., "Non-CE7: Alternative Entropy Coding for Dependent Quantization," Joint Video Experts Team (JVET) of ITU-T SG 16 WP 3 and ISO/IEC JTC 1/SC 29/WG 11, Document: JVET-K0072-v2, Jul. 2018, XP030197391, Total 17 pages.

Office Action dated Nov. 17, 2022 issued by Indian Patent Office in counterpart Indian Application No. 202147009073.

* cited by examiner

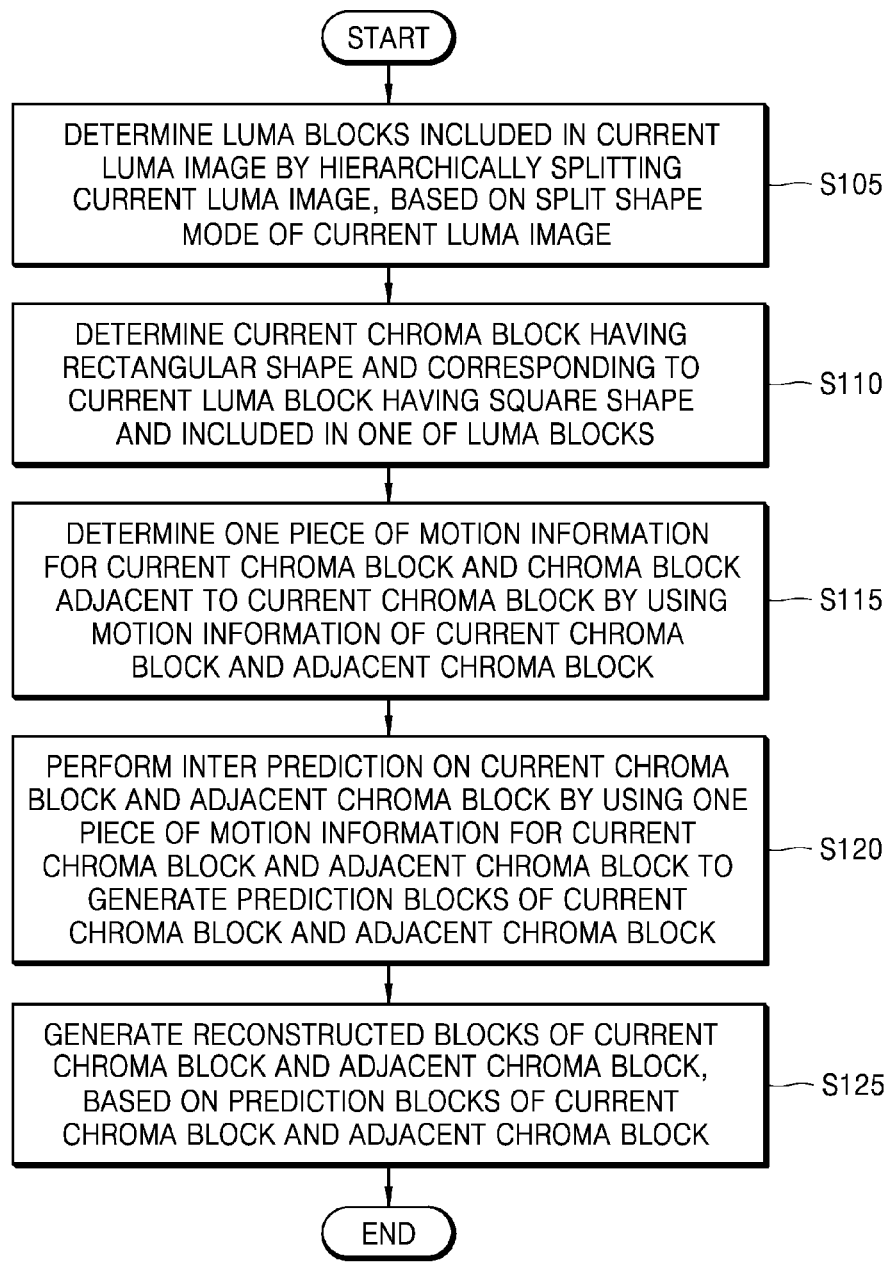

FIG. 13

| BLOCK SHAPE / DEPTH | 0: SQUARE | 1: NS_VER | 2: NS_HOR |
|---|---|---|---|
| DEPTH D | 1300 | 1310 | 1320 |
| DEPTH D+1 | 1302 | 1312 | 1322 |
| DEPTH D+2 | 1304 | 1314 | 1324 |
| ... | ... | ... | ... |

FIG. 20C

| state | quantizer | next state ||
| | | (k & 1) ==0 | (k & 1) ==1 |
|---|---|---|---|
| 0 | Q0 | 0 | 2 |
| 1 | Q0 | 2 | 0 |
| 2 | Q1 | 1 | 3 |
| 3 | Q1 | 3 | 1 |

FIG. 21A

```
for( n = ( i = = lastSubBlock) ?lastScanPos−1 : numSbCoeff−1; n >= 0; n−− ) {
    xC = ( xS <<log2SbSize ) + DiagScanOrder[log2SbSize][log2SbSize][n][0]
    yC = ( yS <<log2SbSize ) + DiagScanOrder[log2SbSize][log2SbSize][n][1]
    if(coded_sub_block_flag[xS][yS] && ( n > 0 || !inferSbDcSigCoeffFlag ) ) {
        sig_coeff_flag[xC][yC]                                                    ae(v)    ─2100
    }
    if(sig_coeff_flag[xC][yC]) {
        par_level_flag[n]                                                         ae(v)    ─2110
        rem_abs_gt1_flag[n]                                                       ae(v)
        if(lastSigScanPosSb= =−1)
            lastSigScanPosSb = n
        firstSigScanPosSb = n
    }
    AbsLevelPass1[xC][yC] =
        sig_coeff_flag[xC][yC] + par_level_flag[n] + 2 * rem_abs_gt1_flag[n]
    if(dep_quant_enabled_flag)
        QState= QStateTransTable[QState][par_level_flag[n]]
}
for(n = numSbCoeff− 1; n >= 0; n−−) {
```

FIG. 21B

| | | |
|---|---|---|
| if(sig_coeff_flag[ xC ][ yC ] ) {     2120 | | |
|    if( A <= n && n <= B ) { | | |
|       par_level_flag[ n ] | ae(v) | ~2130 |
|    } | | |
|    rem_abs_gt1_flag[ n ] | ae(v) | |
|    if( lastSigScanPosSb = = −1 ) | | |
|       lastSigScanPosSb = n | | |
|    firstSigScanPosSb = n | | |
| } | | |

FIG. 21C

| | | | |
|---|---|---|---|
| if( sig_coeff_flag[ xC ][ yC ] ) { — 2140 | | | |
| if( A > n ) { | | | |
| par_level_flag[ n ] | | ae(v) | —2150 |
| } | | | |
| rem_abs_gt1_flag[ n ] | | ae(v) | |
| if( lastSigScanPosSb == −1 ) | | | |
| lastSigScanPosSb = n | | | |
| firstSigScanPosSb = n | | | |
| } | | | |

FIG. 21D

| | | |
|---|---|---|
| if( sig_coeff_flag[xC ][ yC ] ) { —2160 | | |
| if( A < n ) { | | |
| par_level_flag[ n ] | ae(v) | —2170 |
| } | | |
| rem_abs_gt1_flag[ n ] | ae(v) | |
| if( lastSigScanPosSb = = −1 ) | | |
| lastSigScanPosSb = n | | |
| firstSigScanPosSb = n | | |
| } | | |

# METHOD AND APPARATUS FOR IMAGE ENCODING, AND METHOD AND APPARATUS FOR IMAGE DECODING

CROSS-REFERENCE TO RELATED APPLICATIONS

This application is a National Stage of International Application No. PCT/KR2019/010839, filed Aug. 26, 2019, claiming priority based on U.S. Provisional Patent Application No. 62/722,452, filed Aug. 24, 2018, the contents of all of which are incorporated herein by reference in their entirety.

TECHNICAL FIELD

A method and apparatus according to an embodiment are capable of encoding or decoding an image by using coding units, prediction units, or transform units, which have various shapes and are included in the image. A method and apparatus according to an embodiment are capable of encoding or decoding an image by performing inter prediction on data units having various shapes.

BACKGROUND ART

As hardware capable of reproducing and storing high-resolution or high-quality image content has been developed and become widely popular, a codec capable of efficiently encoding or decoding high-resolution or high-quality image content is in high demand. Encoded image content may be decoded to be reproduced. Currently, methods of effectively compressing high-resolution or high-quality image content are implemented. For example, an efficient image compression method is implemented by a process of processing an image, which is to be encoded, in an arbitrary method.

Various data units may be used to compress an image, and there may be an inclusion relationship between the data units. A data unit to be used to compress an image may be split by various methods, and the image may be encoded or decoded by determining an optimized data unit according to characteristics of the image.

DESCRIPTION OF EMBODIMENTS

Solution to Problem

According to an embodiment of the disclosure, an image decoding method includes determining a plurality of luma blocks in a current luma image by hierarchically splitting the current luma image, based on a split shape mode of the current luma image; determining a current chroma block of a rectangular shape corresponding to a current luma block included in one of the plurality of luma blocks; determining a piece of motion information for the current chroma block and a chroma block adjacent to the current chroma block by using motion information of the current chroma block and the adjacent chroma block; performing inter prediction on the current chroma block and the adjacent chroma block by using the piece of motion information for the current chroma block and the adjacent chroma block to generate prediction blocks of the current chroma block and the adjacent chroma block; and generating reconstructed blocks of the current chroma block and the adjacent chroma block, based on the prediction blocks of the current chroma block and the adjacent chroma block, wherein the motion information of the current chroma block used to determine the piece of motion information for the current chroma block and the adjacent chroma block corresponds to motion information of the current luma block, and the motion information of the adjacent chroma block used to determine the piece of motion information for the current chroma block and the adjacent chroma block corresponds to motion information of an adjacent luma block corresponding to the adjacent chroma block.

A chroma format of a current chroma image including the current chroma block may be 4:2:2.

The current chroma block and the adjacent chroma block may be blocks adjacent to each other in a left-and-right direction.

The motion information of the current chroma block and the adjacent chroma block may include a motion vector of the current chroma block and a motion vector of the adjacent chroma block adjacent to the current chroma block, and the piece of motion information for the current chroma block and the adjacent chroma block may include one motion vector for the current chroma block and the adjacent chroma block, and a value of the one motion vector for the current chroma block and the adjacent chroma block may be an average value of the motion vector of the current chroma block and the motion vector of the adjacent chroma block.

A height of the current chroma block may be equal to a height of the current luma block, and a width of the current luma block may be half a width of the current luma block.

When a size of the current luma block is 4×4, a size of the current chroma block may be 2×4.

The image decoding method may further include generating a prediction block of the current luma block by performing motion compensation on the current luma block by using a motion vector of the current luma block.

The generating of the prediction block of the current luma block may include determining a refined motion vector of the current luma block by using the motion vector of the current luma block, based on a motion vector refinement search in a reference luma image of the current luma image; and performing motion compensation on the current luma block by using the refined motion vector of the current luma block.

The determining of the refined motion vector of the current luma block may include performing the motion vector refinement search using a reconstructed pixel value of a reference luma block in the reference luma image indicated by the motion vector of the current luma block without using a reconstructed neighboring pixel value of the reference luma block in the reference luma image.

The performing of the motion vector refinement search may include determining a neighboring pixel value of the reference luma block in the reference luma image, based on the reconstructed pixel value of the reference luma block, and performing the motion vector refinement search using the determined reconstructed pixel value and neighboring pixel value of the reference luma block in the reference luma image.

The image decoding method may further include obtaining a parity flag indicating a parity of a coefficient level in the current luma block from a bitstream; and generating a residual block of the current luma block by performing dependent inverse-quantization on information of a transform coefficient of the current luma block, based on a value of the parity flag.

The parity flag may be obtained from a bitstream by limiting the number of parity flags to be obtained according to a predetermined scan order.

The split shape mode may be a mode based on a split shape mode including one of quad split, binary split, and tri-split.

According to an embodiment of the disclosure, an image decoding apparatus may include at least one processor configured to: determine a plurality of luma blocks included in a current luma image by hierarchically splitting the current luma image, based on a split shape mode of the current luma image, determine a current chroma block of a rectangular shape corresponding to a current luma block included in one of the plurality of luma blocks, determine a piece of motion information for the current chroma block and a chroma block adjacent to the current chroma block by using motion information of the current chroma block and the adjacent chroma block, perform inter prediction on the current chroma block and the adjacent chroma block by using the piece of motion information for the current chroma block and the adjacent chroma block to generate prediction blocks of the current chroma block and the adjacent chroma block, and generate reconstructed blocks of the current chroma block and the adjacent chroma block, based on the prediction blocks of the current chroma block and the adjacent chroma block.

The motion information of the adjacent chroma block used to determine the piece of motion information for the current chroma block and the adjacent chroma block may correspond to motion information of an adjacent luma block corresponding to the adjacent chroma block.

A chroma format of a current chroma image including the chroma block may be 4:2:2, and a height of the current chroma block may be equal to a height of the current luma block and a width of the current chroma block may be half a width of the current luma block.

The at least one process may be further configured to: generate a prediction block of the current luma block by performing motion compensation on the current luma block by using a motion vector of the current luma block, determine a refined motion vector of the current luma block during the generation of the prediction block of the current luma block by using the motion vector of the current luma block, based on a motion vector refinement search in a reference luma image of the current luma image, and perform motion compensation on the current luma block by using the refined motion vector of the current luma block.

During the determining of the refined motion vector of the current luma block by the at least one processor, the motion vector refinement search may be performed using a reconstructed pixel value of a reference luma block in the reference luma image indicated by the motion vector of the current luma block without using a reconstructed neighboring pixel value of the reference luma block in the reference luma image.

The at least one process may be further configured to obtain a parity flag indicating a parity of a coefficient level in a current luma block from a bitstream, and generate a residual block of the current luma block by performing dependent quantization on information of a transform coefficient of the current luma block, based on the parity flag.

The parity flag may be obtained from a bitstream by limiting the number of parity flags to be obtained according to a predetermined scan order.

According to an embodiment of the disclosure, an image encoding method may include determining a plurality of luma blocks included in a current luma image by hierarchically splitting the current luma image, based on a split shape mode of the current luma image;

determining a current chroma block of a rectangular shape corresponding to a current luma block included in one of the plurality of luma blocks;

determining a piece of motion information for the current chroma block and a chroma block adjacent to the current chroma block by using motion information of the current chroma block and the adjacent chroma block;

performing inter prediction on the current chroma block and the adjacent chroma block by using the piece of motion information for the current chroma block and the adjacent chroma block to generate prediction blocks of the current chroma block and the adjacent chroma block; and generating a residual block of the current chroma block and an adjacent chroma block, based on the prediction blocks of the current chroma block and the adjacent chroma block, and encoding the residual block of the current chroma block and the adjacent chroma block.

The motion information of the adjacent chroma block used to determine the piece of motion information for the current chroma block and the adjacent chroma block may correspond to motion information of an adjacent luma block corresponding to the adjacent chroma block.

According to an embodiment of the disclosure, a computer program for the image decoding method may be recorded on a computer-readable recording medium.

BRIEF DESCRIPTION OF THE DRAWINGS

FIG. 1B is a flowchart of an image decoding method, according to various embodiments.

FIG. 13 illustrates a process of determining a depth of a coding unit as a shape and size of the coding unit change, when the coding unit is recursively split such that a plurality of coding units are determined, according to an embodiment.

FIGS. 20A to 20C are diagrams for describing a dependent quantization process according to an embodiment.

FIGS. 21A to 21D are diagrams illustrating a residual encoding syntax structure according to various embodiments of the disclosure.

BEST MODE

Figure 1A:
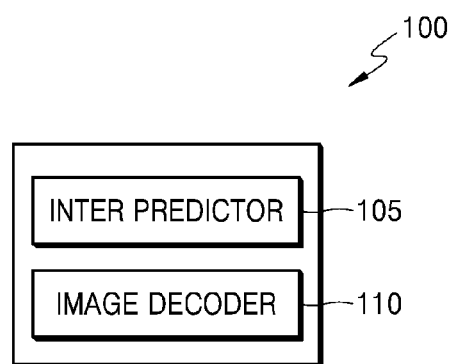
FIG. 1A is a block diagram of an image decoding apparatus, according to various embodiments.

According to an embodiment of the disclosure, an image decoding method includes determining a plurality of luma blocks in a current luma image by hierarchically splitting the current luma image, based on a split shape mode of the current luma image; determining a current chroma block of a rectangular shape corresponding to a current luma block included in one of the plurality of luma blocks; determining a piece of motion information for the current chroma block and a chroma block adjacent to the current chroma block by using motion information of the current chroma block and the adjacent chroma block; performing inter prediction on the current chroma block and the adjacent chroma block by using the piece of motion information for the current chroma block and the adjacent chroma block to generate prediction blocks of the current chroma block and the adjacent chroma block; and generating reconstructed blocks of the current chroma block and the adjacent chroma block, based on the prediction blocks of the current chroma block and the adjacent chroma block, wherein the motion information of the current chroma block used to determine the piece of motion information for the current chroma block and the adjacent chroma block corresponds to motion information of the current luma block, and the motion information of the adjacent chroma block used to determine the piece of motion information for the current chroma block and the adjacent chroma block corresponds to motion information of an adjacent luma block corresponding to the adjacent chroma block.

According to an embodiment of the disclosure, an image decoding apparatus may include at least one processor configured to: determine a plurality of luma blocks included in a current luma image by hierarchically splitting the current luma image, based on a split shape mode of the current luma image, determine a current chroma block of a rectangular shape corresponding to a current luma block included in one of the plurality of luma blocks, determine a piece of motion information for the current chroma block and a chroma block adjacent to the current chroma block by using motion information of the current chroma block and the adjacent chroma block, perform inter prediction on the current chroma block and the adjacent chroma block by using the piece of motion information for the current chroma block and the adjacent chroma block to generate prediction blocks of the current chroma block and the adjacent chroma block, and generate reconstructed blocks of the current chroma block and the adjacent chroma block, based on the prediction blocks of the current chroma block and the adjacent chroma block.

The motion information of the adjacent chroma block used to determine the piece of motion information for the current chroma block and the adjacent chroma block may correspond to motion information of an adjacent luma block corresponding to the adjacent chroma block.

According to an embodiment of the disclosure, an image encoding method may include determining a plurality of luma blocks included in a current luma image by hierarchically splitting the current luma image, based on a split shape mode of the current luma image;

determining a current chroma block of a rectangular shape corresponding to a current luma block included in one of the plurality of luma blocks;

determining a piece of motion information for the current chroma block and a chroma block adjacent to the current chroma block by using motion information of the current chroma block and the adjacent chroma block;

performing inter prediction on the current chroma block and the adjacent chroma block by using the piece of motion information for the current chroma block and the adjacent chroma block to generate prediction blocks of the current chroma block and the adjacent chroma block; and generating a residual block of the current chroma block and an adjacent chroma block, based on the prediction blocks of the current chroma block and the adjacent chroma block, and encoding the residual block of the current chroma block and the adjacent chroma block.

The motion information of the adjacent chroma block used to determine the piece of motion information for the current chroma block and the adjacent chroma block may correspond to motion information of an adjacent luma block corresponding to the adjacent chroma block.

According to an embodiment of the disclosure, a computer program for the image decoding method may be recorded on a computer-readable recording medium.

MODE OF DISCLOSURE

Advantages and features of embodiments of the disclosure set forth herein and methods of achieving them will be apparent from the following description of embodiments of the disclosure in conjunction with the accompanying drawings. However, the disclosure is not limited to embodiments of the disclosure set forth herein and may be embodied in many different forms. The embodiments of the disclosure are merely provided so that the disclosure will be thorough and complete and will fully convey the scope of the disclosure to those of ordinary skill in the art.

The terms used herein will be briefly described and then embodiments of the disclosure set forth herein will be described in detail.

In the present specification, general terms that have been widely used nowadays are selected, when possible, in consideration of functions of the disclosure, but non-general terms may be selected according to the intentions of technicians in the this art, precedents, or new technologies, etc. Some terms may be arbitrarily chosen by the present applicant. In this case, the meanings of these terms will be explained in corresponding parts of the disclosure in detail. Thus, the terms used herein should be defined not based on the names thereof but based on the meanings thereof and the whole context of the disclosure.

As used herein, the singular forms "a", "an" and "the" are intended to include the plural forms as well, unless the context clearly indicates otherwise.

It will be understood that when an element is referred to as "including" another element, the element may further include other elements unless mentioned otherwise.

The term "unit" used herein should be understood as software or a hardware component which performs certain functions. However, the term "unit" is not limited to software or hardware. The term "unit" may be configured to be stored in an addressable storage medium or to reproduce one or more processors. Thus, the term "unit" may include, for example, components, such as software components, object-oriented software components, class components, and task components, processes, functions, attributes, procedures, subroutines, segments of program code, drivers, firmware, microcode, a circuit, data, database, data structures, tables, arrays, and parameters. Functions provided in components and "units" may be combined to a small number of components and "units" or may be divided into sub-components and "sub-units".

According to an embodiment of the disclosure, the "unit" may be implemented with a processor and a memory. The term "processor" should be interpreted broadly to include a general-purpose processor, a central processing unit (CPU), a microprocessor, a digital signal processor (DSP), a controller, a microcontroller, a state machine, and the like. In some circumstances, a "processor" may refer to an application-specific integrated circuit (ASIC), a programmable logic device (PLD), a field programmable gate array (FPGA), and the like. The term "processor" may refer to a combination of processing devices, e.g., a combination of a DSP and a microprocessor, a combination of a plurality of microprocessors, a combination of one or more microprocessors in combination with a DSP core, or a combination of any other configurations.

The term "memory" should be interpreted broadly to include any electronic component capable of storing electronic information. The term "memory" may refer to various types of processor-readable media such as random access memory (RAM), read-only memory (ROM), non-volatile RAM (NVRAM), programmable ROM (PROM), erase-programmable ROM (EPROM), electrical erasable PROM (EEPROM), flash memory, a magnetic or optical data storage device, registers, and the like. When a processor is capable of reading information from and/or writing information to a memory, the memory may be referred to as being in electronic communication with the processor. A memory integrated in a processor is in electronic communication with the processor.

The term "image", when used herein, should be understood to include a static image such as a still image of a video, and a moving picture, i.e., a dynamic image, which is a video.

The term "sample", when used herein, refers to data allocated to a sampling position of an image, i.e., data to be processed. For example, samples may be pixel values in a spatial domain, and transform coefficients in a transform domain. A unit including at least one sample may be defined as a block.

Hereinafter, embodiments of the disclosure will be described in detail with reference to the accompanying drawings, so that the embodiments of the disclosure may be easily implemented by those of ordinary skill in the art. For clarity, parts irrelevant to a description of the disclosure are omitted in the drawings.

Hereinafter, an image encoding apparatus and an image decoding apparatus, and an image encoding method and an image decoding method according to various embodiments will be described with reference to FIGS. 1 to 21D. With reference to FIGS. 3 to 16, a method of determining a data unit of an image according to various embodiments will be described, and with reference to FIGS. 1 and 2, and FIGS. 17A to 21D, an image encoding apparatus and an image decoding apparatus, and an image encoding method and an image decoding method for performing inter prediction on data units determined in various shapes according to various embodiments will be described.

Hereinafter, an encoding or decoding method and apparatus for encoding or decoding an image based on various-shape data units according to an embodiment of the disclosure will now be described with reference to FIGS. 1 and 2.

Figure 1C:
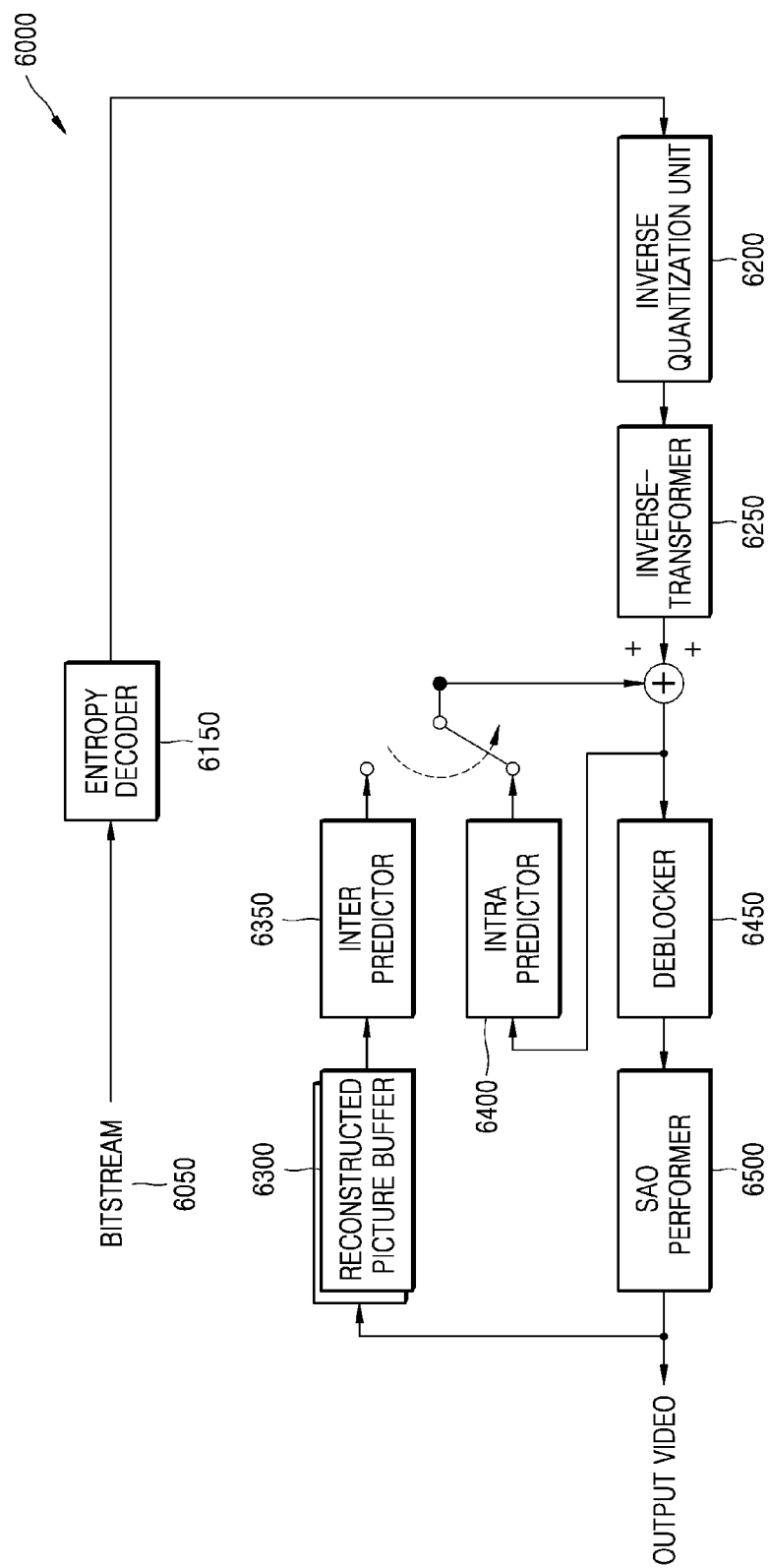
FIG. 1C is a block diagram of an image decoder according to various embodiments.

FIG. 1A is a block diagram of an image decoding apparatus, according to various embodiments.

An image decoding apparatus 100 according to various embodiments may include an inter predictor 105 and an image decoder 110. The inter predictor 105 and the image decoder 110 may include at least one processor. Also, the inter predictor 105 and the image decoder 110 may include a memory storing instructions to be performed by the at least one processor. The image decoder 110 and the inter predictor 105 may be implemented as separate hardware components, or the image decoder 110 may include the inter predictor 105.

A history-based motion vector prediction technique according to an embodiment will be described below.

The history-based motion vector prediction technique refers to a technique for storing a history-based motion information list including N (N is a positive integer) pieces of previously decoded motion information (preferably, last N pieces of decoded motion information among the previously decoded motion information) in a buffer and performing motion vector prediction based on the history-based motion information list.

The inter predictor 105 may generate an Advanced Motion Vector Prediction (AMVP) candidate list or a merge candidate list by using at least some of the motion information included in the history-based motion information list.

Similar to the above-described history-based motion vector prediction technique, the inter predictor 105 may store a history-based motion information list including motion information of N previously decoded affine blocks in a buffer.

In this case, the affine block is a block having motion information in a motion information unit (preferably, a sub-block unit or a pixel unit) smaller than a block size, and motion information may be generated in the motion information unit, based on the affine model. For example, the affine block may be a block having motion information generated based on an affine model-based motion compensation mode. In this case, the affine model-based motion compensation mode refers to a mode in which motion compensation is performed using one of various affine motion models, such as a 4-parameter affine motion model and a 6-parameter affine motion model for motion compensation.

When the same motion information is generated several times, the inter predictor 105 may allocate relatively high priority to the same motion information in a history-based motion information list.

The inter predictor 105 may generate an affine Advanced Motion Vector Prediction (AMVP) candidate list or an affine merge candidate list by using at least some of affine motion information included in the history-based motion information list. In this case, all candidates included in the affine AMVP candidate list or the affine merge candidate list may be determined based on the motion information included in the history-based motion information list, or candidates included in the history-based motion information list may be added to the affine AMVP candidate list or the affine merge candidate list with higher or lower priority than existing candidates.

The inter predictor 105 may derive motion information for a current block from motion information of one of the candidates included in the history-based motion information list.

For example, the motion information for the current block may be derived by an extrapolation process. That is, the inter predictor 105 may derive the motion information for the current block from motion information of one of the candidates included in the history-based motion information list by performing an extrapolation process similar to that performed to calculate an affine inherited model by using a neighboring motion vector. The inter predictor 105 may derive the motion information for the current block from motion information of one of the candidates included in the history-based motion information list, and thus, a motion vector for a neighboring block (e.g., motion vectors of a block TL located at a top left side of the neighboring block, a block TR located at a top right side of the neighboring block, and a block BL located at a bottom left side of the neighboring block) may not be accessed unlike when an affine candidate is generated according to the related art. Therefore, there is no need to determine whether motion information of the neighboring block is available, thereby reducing hardware implementation costs.

In this case, the history-based motion information list for the affine model may be managed by a first-in first-out (FIFO) method.

Additionally, the inter predictor 105 may use one motion vector, which is included in the history-based motion information list for the affine model, for a normal merge mode process or an AMVP mode process. That is, the inter predictor 105 may generate a motion information candidate list for the normal merge mode process or the AMVP mode process by using a motion vector included in the history-based motion information list for the affine model.

In this case, the normal merge mode process or the AMVP mode process refers to a process in which basically, motion information generated based on the affine model-based motion compensation mode is not used. In this case, the normal merge mode process or the AMVP mode process may be understood to mean a merge mode process or an AMVP mode process disclosed in a standard such as the HEVC standard or the VVC standard.

Candidate reordering will be described below.

When there are several pieces of affine motion information of a neighboring block available for a current block, the inter predictor 105 may generate an affine merge candidate list or an affine AMVP candidate list such that high priority is allocated to motion information of a block having a large size (large length, height or area) among the several pieces of affine motion information. Alternatively, the inter predictor 105 may determine priority of each neighboring block in the affine merge candidate list or the affine AMVP candidate list, based on widths of upper neighboring blocks having affine motion information. The inter predictor 105 may determine priority of each neighboring block in the affine merge candidate list or the affine AMVP candidate list, based on heights of left neighboring blocks having affine motion information.

A far distance affine candidate will be described below.

In order to derive inherited affine motion information of a current block, the inter predictor 105 may search for a neighboring block having affine motion information (hereinafter referred to as a neighboring affine block) and use the extrapolation technique on the current block, based on the affine motion information of the neighboring affine block.

The inter predictor 105 may derive the inherited affine motion information of the current block by using a block distant from the current block, as well as the neighboring affine block.

For example, affine blocks located at upper, left, and upper left sides of the current block may be scanned, and affine motion information of one of the scanned affine blocks may be added to the affine AMVP candidate list or the affine merge candidate list. In this case, one of the scanned affine blocks may not be added immediately but may be added to the affine AMVP candidate list or the affine merge candidate list after the extrapolation process is performed on the motion information of the affine block.

Affine motion compensation based on motion information of a temporal affine candidate block will be described below.

The inter predictor 105 may use motion information of three positions on a current block to derive the affine motion information of the current block. In this case, the three positions may be a top-left (TL) corner, a top-right (TR) corner, and a below-left (BL) corner. However, embodiments of the disclosure are not limited thereto, and the inter predictor 105 may temporally determine the three positions. For example, the inter predictor 105 may determine a TL corner, a TR corner, and a BL corner of a collocated block as three surrounding positions. In this case, the collocated block refers to a block included in an image decoded before a current image and located at the same position as the current block. When a reference index is different, the motion information may be scaled. The inter predictor 105 may derive the affine motion information of the current block, based on motion information of the temporally determined three positions.

In order to determine motion information for deriving the affine motion information of the current block from a reference frame, the inter predictor 105 may determine motion information of three positions on a corresponding block as motion information for deriving the affine motion information of the current block instead of the three positions on the collocated block. In this case, the corresponding block refers to a block located at a position away by an offset defined by a motion vector from the current block. The motion vector may be obtained from a block located temporally and spatially around the current block.

The inter predictor 105 may temporally determine at least some of the three positions and determine the remaining positions by using an inherited candidate or motion information of a block spatially adjacent to the current block.

When the collocated block or the corresponding block of the reference frame does not have motion information, the inter predictor 105 may search for motion information of neighboring blocks of the collocated block or the corresponding block and determine motion information for deriving the affine motion information of the current block by using the searched-for motion information.

The inter predictor 105 may perform the following operation to fill an inner region of the current block with affine motion information by using an inherited affine candidate.

The inter predictor 105 may determine three points in a neighboring block as start points, and derive a motion vector for the inner region of the current block, based on the start points. Alternatively, the inter predictor 105 may first derive motion vectors of three points in the current block, and derive a motion vector of the remaining region of the current block, based on the motion vectors of the three points.

An adaptive motion vector resolution technique will be described below.

The adaptive motion vector resolution technique refers to a technique for representing a resolution of a motion vector difference (hereinafter referred to as MVD) with respect to a coding unit to be currently decoded. In this case, information regarding the resolution of the MVD may be signaled through a bitstream.

The inter predictor 105 is not limited to signaling information (preferably index information) about the resolution of the MVD, and may derive the resolution of the current block, based on at least one of an MVD of a previous block and an MVD of the current block.

For example, when the MVD of the current block is an odd number, the inter predictor 105 may determine the resolution of the MVD of the current block as 4 or ¼. The inter predictor 105 may determine the resolution of the MVD of the current block by combining explicit signaling and implicit derivation.

For example, the inter predictor 105 may determine whether the resolution of the MVD of the current block is ¼, based on a flag obtained from a bitstream. That is, when the flag is a first value, it may indicate that the resolution of the MVD of the current block is ¼, and when the flag is a second value, it may indicate that the resolution of the MVD of the current block is not ¼. When the flag is the second value, the inter predictor 105 may derive the resolution of the MVD of the current block, based on the MVD.

Specifically, when an AMVR flag amvr_flag obtained from the bitstream is 0, the inter predictor 105 may determine that a motion accuracy of a quarter pixel is to be used for the MVD of the current block. That is, when the AMVR flag amvr_flag is 0, the inter predictor 105 may perform the same MVD decoding process as a process disclosed in a standard such as the HEVC standard or the VVC standard.

When the AMVR flag amvr_flag is 1, the inter predictor 105 may determine that a motion accuracy of another pixel is to be used for the MVD of the current block.

When the AMVR flag amvr_flag is 1, the inter predictor 105 may additionally perform a derivation process for a resolution of a motion vector between accuracy of one pixel and accuracy of four pixels. The image decoder 110 may first decode the MVD of the current block, and the inter predictor 105 may determine the resolution of the MVD of the current block by checking a Least Significant Bit (LSB) of the MVD of the current block. When the LSB is 0, the inter predictor 105 may determine a resolution of one pixel as the resolution of the MVD of the current block. When the LSB is 1, the inter predictor 105 may determine a resolution of four pixels as the resolution of the MVD of the current block. Embodiments of the disclosure are not limited thereto, and the resolution of the MVD of the current block may be determined as the resolution of four pixels when the LSB is 0 and determined as the resolution of one pixel when the LSB is 1.

The inter predictor 105 may determine the MVD of the current block, based on the resolution of the MVD of the current block. That is, the inter predictor 105 may determine the resolution of the MVD of the current block, based on information regarding the MVD of the current block, which is obtained from a bitstream, and determine the MVD of the current block, based on the information regarding the MVD of the current block and the resolution of the MVD of the current block.

For example, when the resolution of the MVD of the current block is determined as the resolution of one pixel, the inter predictor 105 may determine the MVD of the current block, based on Equation 1 below. In this case, when the MVD is 1, it may mean a ¼ pixel. The MVD on the right side of Equation 1 may be a value obtained by decoding the information regarding the MVD of the current block included in the bitstream.

$$MVD=(MVD>>1)*4 \qquad [\text{Equation 1}]$$

When the resolution of the MVD of the current block is determined as the resolution of four pixels, the inter predictor 105 may determine the MVD of the current block, based on Equation 2 below. In this case, when the MVD is 1, it may mean a ¼ pixel. The MVD on the right side of Equation 1 may be a value obtained by decoding the information regarding the MVD of the current block included in the bitstream.

$$MVD(MVD>>1)*16 \qquad [\text{Equation 2}]$$

A history-based motion vector prediction technique according to an embodiment will be described below.

The image decoder 110 may store recently decoded N intra prediction modes in a history-based list. When the same intra prediction mode occurs in the history-based list, the image decoder 110 may determine priority of the intra prediction mode to be high. The image decoder 110 may determine an intra prediction mode in the history-based list, based on an index or flag information included in a bitstream. The image decoder 110 may derive a Most Probable Mode (MPM) by using the intra prediction mode in the history-based list.

The image decoder 110 may store recently decoded N modes in the history-based list. In this case, the stored N modes may be, but are not limited to, an intra mode, an inter mode, a Decoder Side Motion Vector Refinement (DMVR) mode, an affine mode, a skip mode, and the like. The image decoder 110 may obtain information in the form of an index indicating a mode in the history-based list from the bitstream, decode the information, and determine a mode for the current block, based on the decoded information.

The image decoder 110 may determine a context model, based on the history-based list. For example, the image decoder 110 may store recently decoded N modes (e.g., prediction modes such as an inter mode or an intra prediction mode) in the history-based list, and derive a context model for entropy decoding information regarding a prediction mode of the current block, based on the modes included in the history-based list.

A motion information candidate list reordering technique will be described below.

The inter predictor 105 may determine priority of a neighboring candidate block in an AMVP candidate list or a merge candidate list, based on the size of the neighboring candidate block. For example, the inter predictor 105 may determine priority of the neighboring candidate block in the AMVP candidate list or the merge candidate list to be higher as a width, height, or area of the neighboring candidate block increases. In detail, when a width of a neighboring candidate block above a current block is large, the inter predictor 105 may determine priority of the neighboring candidate block to be high. When a height of a neighboring candidate block at a left side of the current block is large, the inter predictor 105 may determine priority of the neighboring candidate block to be high.

Motion compensation of a chroma block according to an embodiment will be described below.

The image decoder 110 may determine a plurality of luma blocks in a current luma image by hierarchically splitting the current luma image, based on a split shape mode of the current luma image. The split shape mode of the current luma image may be provided in units of blocks. That is, after the current block is split into a plurality of blocks according to the split shape mode of the current block, a corresponding block may be additionally split according to a split shape mode of the plurality of blocks. The split shape mode of the current luma image may be determined by obtaining information regarding the split shape mode thereof from a bitstream. The split shape mode may be a mode based on a split shape mode including one of quad split, binary split, and tri-split.

The image decoder 110 may determine a current rectangular chroma block corresponding to a current luma block having a square shape included in one of the plurality of luma blocks. In this case, the current luma block having the square shape may be a sub-block included in a coding unit of a luma component, and particularly, a motion information unit in an affine model-based motion compensation mode, but embodiments are not limited thereto. For example, the current luma block having the square shape may have a size of N×N (N is an integer). A size of the current luma block having the square shape may be 4×4 but is not limited thereto. The current luma block having the square shape has been described above but embodiments of the disclosure are not limited thereto and a current luma block may have a rectangular shape. For example, the current luma block may have a size of 2N×N or N×2N (N is an integer), e.g., 8×4 or 4×8.

A height of a current chroma block having a rectangular shape may be the same as that of the current luma block and a width of the current chroma block may be half that of the current luma block, but embodiments of the disclosure are not limited thereto and the width of the current chroma block may be the same as that of the current luma block and the height of the current chroma block may be half that of the current luma block. For example, when the current luma block has a size of 4×4, the chroma block may have a size of 4×2 or 2×4. In this case, a chroma format of a chroma image including the current chroma block may be 4:2:2.

However, embodiments of the disclosure are not limited thereto, and the height of the rectangular current chroma block may be half that of the current luma block and the width thereof may be half that of the current luma block. For example, a current chroma block corresponding to a current rectangular luma block having a size of 8×4 or 4×8 may have a size of 4×2 or 2×4. In this case, the chroma format of the chroma image including the current chroma block may be 4:2:0. The inter predictor 105 may determine a piece of motion information for the current chroma block and a chroma block adjacent to the current chroma block by using motion information of the current chroma block and the adjacent chroma block. In this case, the motion information of the current chroma block used to determine the piece of motion information for the current chroma block and the adjacent chroma block may correspond to motion information of the current luma block. In addition, the motion information of the adjacent chroma block used to determine the piece of motion information for the current chroma block and the adjacent chroma block may correspond to motion information of an adjacent luma block corresponding to the adjacent chroma block.

For example, the motion information of the current chroma block may be the same as that of the current luma block, and the motion information of the adjacent chroma block may be the same as that of the adjacent luma block.

In this case, the current chroma block and the adjacent chroma block may be blocks adjacent to each other in a left-and-right direction. However, embodiments of the disclosure are not limited thereto, and the current chroma block and the adjacent chroma block may be blocks adjacent to each other vertically. A block that is a combination of the current chroma block and the adjacent chroma block may be a square block and have a size of 4×4, but embodiments of the disclosure are not limited thereto.

The motion information of the current chroma block and a block adjacent to the current chroma block may include motion vectors of the current chroma block and the adjacent chroma block, and a piece of motion information for the current chroma block and the adjacent chroma block may include a motion vector for the current chroma block and the adjacent chroma block.

The inter predictor 105 may determine an average value of the motion vector of the current chroma block and the motion vector of the adjacent chroma block as a value of a motion vector for the current chroma block and the adjacent chroma block.

The inter predictor 105 may perform motion compensation on a chroma block by using different filters in a horizontal direction and a vertical direction. In this case, the filters may vary according to coefficients thereof and the number of filter taps.

The inter predictor 105 may determine motion information of a chroma block by merging motion information of two chroma blocks and thus may have a low memory bandwidth when motion compensation is performed.

Alternatively, the inter predictor 105 may perform interpolation based on motion information of rectangular chroma blocks to determine motion information of a square chroma block smaller than the rectangular chroma blocks. For example, the inter predictor 105 may perform interpolation based on motion information of 2×4 chroma blocks to determine motion information of 2×2 chroma blocks.

The inter predictor 105 may perform inter prediction on a current chroma block and a chroma block adjacent to the current chroma block by using a piece of motion information for the current chroma block and the adjacent chroma block to generate prediction blocks of the current chroma block and the adjacent chroma block.

When a chroma format of a chroma image is 4:2:2, an embodiment of the disclosure in which the inter predictor 105 determines a chroma block corresponding to a current luma block and an embodiment of the disclosure in which motion information of the chroma block will be described with reference to FIGS. 17A to 17C below.

A Decoder Side Motion Vector Refinement (DMVR) technique will be described below. The DMVR technique refers to a technique of determining a refined motion vector by determining a reference block of a reference frame on the basis of a motion vector and searching for a neighboring region (e.g., a block extending by two pixels in up, down, left and right directions). In this case, when the inter predictor 105 searches for a neighboring region to determine a refined motion vector, a pixel value of the neighboring region should be additionally fetched. Thus, a memory bandwidth may be increased.

The inter predictor 105 may generate a prediction block of a current luma or chroma block by performing motion compensation on the current luma or chroma block by using a motion vector of the current luma block. In this case, the inter predictor 105 may determine a refined motion vector of a current luma or chroma block by using the motion vector of the current luma or chroma block, based on a motion vector refinement search in a reference luma or chroma image of a current luma or chroma image.

In detail, the inter predictor 105 may perform the motion vector refinement search using reconstructed pixel values of a reference luma or chroma block in a reference luma or chroma image indicated by the motion vector of the current luma or chroma block without using reconstructed neighboring pixel values of the reference luma or chroma block in the reference luma or chroma block in the reference luma or chroma image. A memory bandwidth may be reduced by performing the motion vector refinement search without using the reconstructed neighboring pixel values.

A problem that may occur when the inter predictor 105 performs decoding according to the DMVR technique and an embodiment of the disclosure for solving the problem will be described with reference to FIGS. 18A to 18C below.

When a size of a current block is larger than a predetermined size, the inter predictor 105 may determine that inter prediction based on the DMVR technique is not to be performed on the current block. That is, when inter prediction is performed by the DMVR technique, the smaller a block, the larger a block to be expanded to perform the motion vector refinement search, compared to the size of the block, and thus, an increase rate in a memory bandwidth is higher in DMVR for the smaller block. To solve this problem, inter prediction based on the DMVR technique may be performed on a current block having a size larger than a predetermined size to prevent an increase in a memory bandwidth.

When the inter predictor 105 performs inter prediction based on the DMVR technique, a latency problem may occur. That is, the inter predictor 105 may perform inter prediction on a neighboring block, which is to be decoded after a current block, by using motion information refined by the DMVR technique only after the motion vector refinement based on the DMVR technique is performed on the current block.

In order to solve the latency problem, the inter predictor 105 may use unrefined motion information obtained from a bitstream to decode a block to be decoded after the current block rather than refined motion information obtained by an inter prediction process based on the DMVR technique for inter prediction of the current block. However, loss may occur when the refined motion vector is not used.

In order to prevent loss, the inter prediction unit 105 may determine priority of motion vectors of neighboring blocks, which are inter-predicted based on the DMVR technique, to be low during derivation of a motion vector of a current block based on the AMVP or merge candidate list, thereby preventing a motion vector of the current block from being derived using the motion vectors of the neighboring blocks.

Alternatively, when a predetermined number or more of blocks among neighboring blocks of the current block are inter-predicted based on the DMVR technique, the inter predictor 105 may determine that inter prediction based on the DMVR technique is not to be performed on the current block. Accordingly, the number of unrefined motion vectors to be used during derivation of motion vectors of blocks to be decoded later may be reduced.

A latency problem that occurs when decoding based on the DMVR technique is performed and a method of solving the latency problem will be described in detail with reference to FIG. 19 below.

A triangular prediction mode will be described below. The triangular prediction mode refers to a mode in which a coding unit is split in a diagonal direction and prediction is performed based on two triangular portions (or triangular prediction units) obtained by dividing the coding unit in the diagonal direction.

In this case, the diagonal direction may include a first direction from an upper left corner of the coding unit to a lower right corner thereof and a second direction from an upper right corner of the coding unit to a lower left corner thereof. Thus, there may be two types of triangular portions, based on the diagonal direction. Each of the two triangular portions may have a motion vector. Motion compensation may be performed on the two triangular portions, based on motion vectors thereof, and the two motion-compensated triangular portions may be merged into one block. A mask may be used to prevent a sudden transition during the merging of the two motion-compensated triangular portions.

The inter predictor 105 may split a coding unit of a block into two square or rectangular units in a horizontal or vertical direction rather than using triangular portions obtained in the triangular prediction mode, and perform motion compensation using motion vectors of the two square or rectangular units. The inter predictor 105 may split a coding unit in the horizontal or vertical direction to prevent an increase in a memory bandwidth.

When the coding unit is split into two portions in the diagonal direction, the inter predictor 105 may split the coding unit, based on only a diagonal direction of ±45 degrees relative to the horizontal direction. That is, the inter predictor 105 may split the coding unit into two portions in the diagonal direction of ±45 degrees relative to a center part of the coding unit. Therefore, when a block that is long in the vertical/horizontal direction is split, it is possible to prevent the block from being split into a direction close to the vertical/horizontal direction.

The inter predictor 105 may search for a motion vector of a neighboring block of a current coding unit, and split the current coding unit, based on a size of a motion vector of a searched-for neighboring block. For example, the inter predictor 105 may detect a change in the size of motion vectors of upper neighboring blocks while searching for the upper neighboring blocks in a horizontal direction from an upper left neighboring block to an upper right neighboring block, and when a degree of a change in the movement of an upper neighboring block is greater than a predetermined level, the upper neighboring block may be determined as a start or end point of division. In addition, the inter predictor 105 may detect a change in the size of motion vectors of left neighboring blocks while searching for the left neighboring blocks in a vertical direction from an upper left neighboring block to a lower left neighboring block, and when a degree of a change in the movement of a left neighboring block is greater than a predetermined level, the left neighboring block may be determined as a start or end point of division. The inter predictor 105 may split a current coding unit, based on the start or end point of division.

A dependent inverse quantization technique will be described below. The dependent inverse quantization technique is a technique for performing inverse quantization using one of two inverse quantization units for all coefficients, and inverse quantization may be performed using different quantization parameters by the two inverse quantization units.

The image decoder 110 may determine one of a plurality of states, based on at least one of a parity of a transform coefficient to be currently decoded or a parity of a previously decoded transform coefficient, and determine an inverse quantization unit (or a quantization parameter to be used by an inverse quantization unit) to be used for a transform coefficient to be currently decoded, based on the determined state.

The image decoder 110 may adaptively perform dependent inverse quantization, based on a scan region within a block currently being decoded. For example, when a current transform coefficient is located in an upper left corner region of the block currently being decoded, decoding based on the dependent inverse quantization technique may be performed on the current transform coefficient, and inverse quantization may be performed on information about a transform coefficient for the remaining region of the block currently being decoded, based on a single quantization parameter.

The image decoder 110 may adaptively perform dependent inverse quantization, based on at least one of a size of the block currently being decoded, a location of a current block (or a current sub block), or a location of the current transform coefficient. For example, when the size of the current block is larger than a predetermined size, the image decoder 110 may decode the block currently being decoded, based on the dependent inverse quantization technique.

The image decoder 110 may perform dependent inverse quantization when the block currently being decoded is a luma block, and may perform inverse quantization on information about a transform coefficient of the block currently being decoded block, based on a single quantization parameter, when the block currently being decoded is a chroma block.

The image decoder 110 may determine the number of quantization parameters (QPs), which are to be used for dependent inverse quantization, to be greater than two, and determine the number of states to be greater than four. For example, the image decoder 110 may determine the number of QPs, which are to be used for dependent inverse quantization, to be three and determine the number of states to be eight.

When parity flag is not used, the image decoder 110 may adaptively perform decoding based on the dependent inverse quantization technique, based on a level size. For example, when a previously decoded level is greater than N, the image decoder 110 may determine that inverse quantization based on the dependent inverse quantization technique is not to be performed when a level of the current transform coefficient is decoded. In this case, N may be determined, based on at least one of a quantization parameter, a block size, or a bit depth of a sample.

The image decoder 110 may determine a structure of a state machine, based on a previously decoded block.

The image decoder 110 may determine a context model to be used for entropy decoding at least one of a significant coefficient flag for a current transform coefficient, a gt1_flag or a gt2_flag, based on at least one of a significant coefficient flag for a neighboring coefficient having the same quantization parameter as the current transform coefficient, the gt1_flag or the gt2_flag. Alternatively, the image decoder 110 may determine a context model to be used for entropy decoding at least one of the significant coefficient flag for the current transform coefficient, the gt1_flag or the gt2_flag, based on at least one of a significant coefficient flag for a neighboring coefficient having the same state as the current transform coefficient, the gt1_flag or the gt2_flag. The image decoder 110 may perform entropy decoding in consideration of a relation between coefficients using similar quantization parameters as described above, thereby improving decoding efficiency.

The image decoder 110 may obtain a parity flag indicating parity of a transform coefficient level in a current luma/chroma block from a bitstream. The image decoder 110 may generate a residual block of the current luma/chroma block by performing dependent inverse quantization on information of a transform coefficient of the current luma/chroma block, based on the parity flag. In this case, the parity flag may be obtained from a bitstream by limiting the number of parity flags to be obtained according to a predetermined scan order. The image decoder 110 may limit the number of parity flags to be obtained according to the scan order by limiting a region in which parity flags are to be obtained. For example, when a current scan position is within a predetermined range and a significant coefficient flag at the current scan position has a value of 1, the image decoder 110 may obtain a parity flag from the bitstream. Alternatively, when a value of the current scan position is greater or less than a predetermined value and the significant coefficient flag at the current scan position has a value of 1, the image decoder 110 may obtain a parity flag from the bitstream.

Alternatively, the image decoder 110 may determine a first value, count the number of obtained parity flags each time parity flags are obtained from the bitstream, compare the number of counted flags with the first value, and determine not to obtain parity flags when the number of counted flags is greater than the first value.

Alternatively, the image decoder 110 may subtract 1 from the first value whenever a parity flag is obtained from the bitstream, and determine not to obtain parity flags when a result of subtracting 1 from the first value is zero. However, the counting, by the image decoder 110, of only the number of parity flags obtained from the bitstream has been described above, but embodiments of the disclosure are not limited thereto and the number of significant coefficient flags, gtX_flag, etc., which are not parity flags, may be counted together. Here, gtX_flag may refer to a flag indicating whether an absolute value of a level of a transform coefficient at a current scan position is greater than X.

An embodiment of the disclosure in which the image decoder 110 limits the number of parity flags obtained according to a predetermined scan order will be described in detail with reference to FIGS. 21A to 21D below.

The image decoder 110 may limit the number of parity flags to be obtained in a predetermined scan order so as to limit the total number of bins of parity flags to be entropy decoded, based on the context model, thereby reducing decoding complexity.

A method of determining a resolution of an MVD of a current block and a value of the MVD similar to the dependent inverse quantization technique will be described below.

The image decoder 110 may determine one of a plurality of states, based on at least one of a parity of an MVD of a current block and a parity of an MVD of a previous block, and determine a resolution of the MVD of the current block, based on the determined state. In this case, the determined resolution of the MVD of the current block may correspond to a quantization parameter to be used for an inverse quantization unit of the dependent inverse quantization technique, and the MVD of the current block/previously decoded block may correspond to a level of a coefficient that is being currently decoded or that was decoded by the dependent quantization technique.

The image decoder 110 may generate a reconstructed block of a current luma or chroma block, based on a prediction block of the current luma or chroma block. The image decoder 110 may obtain information about a residual block of the current luma or chroma block from the bitstream, decode the information about the residual block, and generate a residual block of the current luma or chroma block, based on the decoded information about the residual block of the current luma or chroma block. The image decoder 110 may generate a reconstructed block of the current luma or chroma block, based on the residual block of the current luma or chroma block and the prediction block of the current luma or chroma block.

FIG. 1B is a flowchart of an image decoding method according to various embodiments.

In operation S105, the image decoding apparatus 100 may determine a plurality of luma blocks included in a current luma image by hierarchically splitting the current luma image, based on a split shape mode of the current luma image.

In operation S110, the image decoding apparatus 100 may determine a current chroma block having a rectangular shape and corresponding to a current luma block included in one of the plurality of luma blocks.

In operation S115, the image decoding apparatus 100 may determine a piece of motion information for the current chroma block and a chroma block adjacent to the current chroma block by using motion information of the current chroma block and the adjacent chroma block. The adjacent chroma block may be a block corresponding to an adjacent luma block adjacent to the current luma block.

In operation S120, the image decoding apparatus 100 may perform inter prediction on the current chroma block and the adjacent chroma block by using a piece of motion information for the current chroma block and the adjacent chroma block to generate prediction blocks of the current chroma block and the adjacent chroma block.

In operation S125, the image decoding apparatus 100 may generate reconstructed blocks of the current chroma block and the adjacent chroma block, based on the prediction blocks of the current chroma block and the adjacent chroma block.

Figure 10:
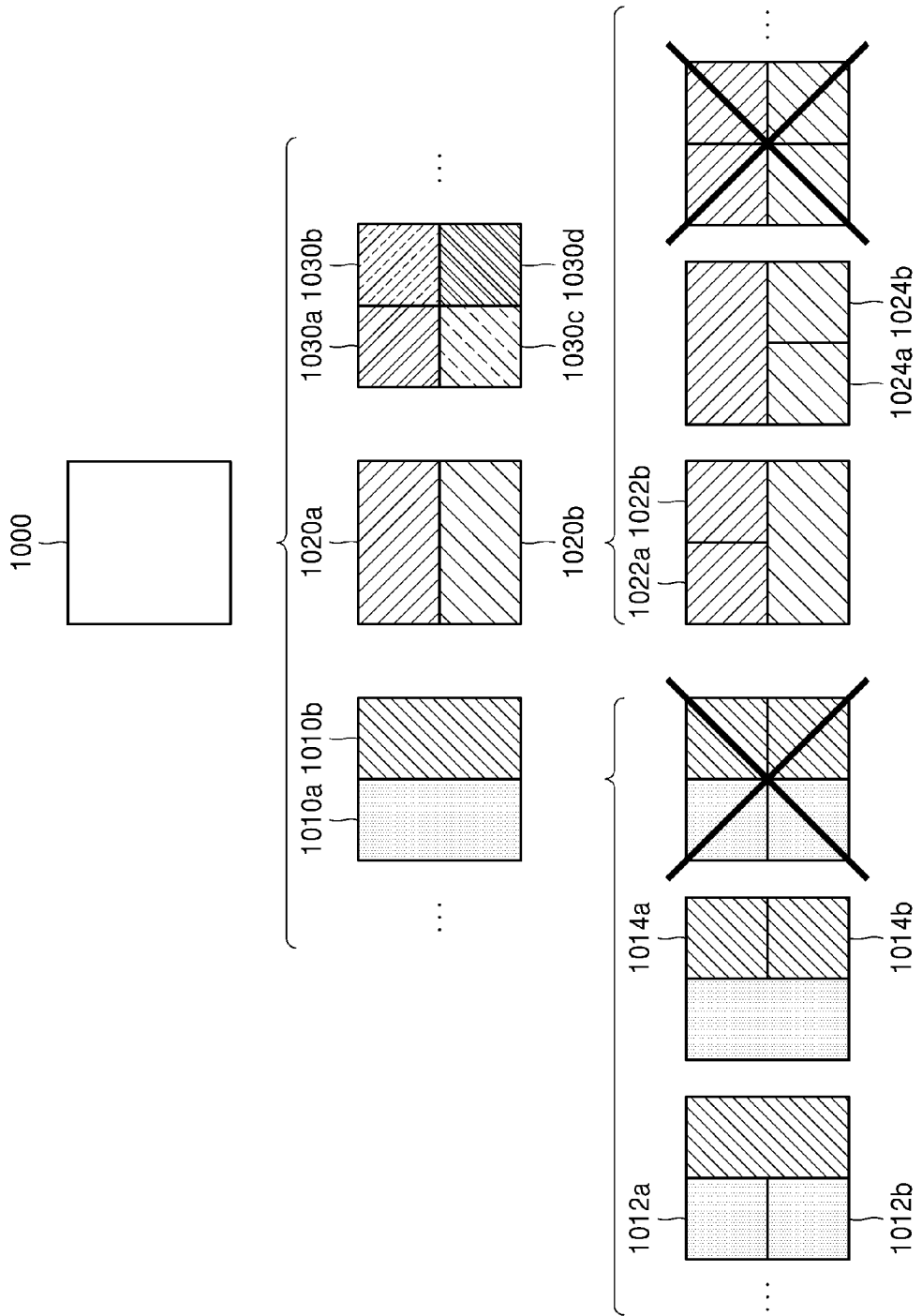
FIG. 10 illustrates that a shape into which a second coding unit is splittable is restricted when the second coding unit having a non-square shape, which is determined as the image decoding apparatus splits a first coding unit, satisfies a predetermined condition, according to an embodiment.

FIG. 10 is a block diagram of an image decoder 6000 according to various embodiments.

The image decoder 6000 according to various embodiments performs operations necessary for the image decoder 110 of the image decoding apparatus 100 to decode image data.

Referring to FIG. 10, an entropy decoder 6150 parses, from a bitstream 6050, encoded image data to be decoded, and encoding information necessary for decoding. The encoded image data is a quantized transform coefficient, and an inverse quantization unit 6200 and an inverse-transformer 6250 reconstruct residue data from the quantized transform coefficient.

An intra predictor 6400 performs intra prediction on each of blocks. An inter predictor 6350 performs inter prediction on each block by using a reference image obtained from a reconstructed picture buffer 6300. Data of a spatial domain for a block of a current image included in the bitstream 6050 may be reconstructed by adding residual data and prediction data of each block which are generated by the intra predictor 6400 or the inter predictor 6350, and a deblocker 6450 and a sample adaptive offset (SAO) performer 6500 may perform loop filtering on the reconstructed data of the spatial domain, such that a filtered reconstructed image may be output. Reconstructed images stored in the reconstructed picture buffer 6300 may be output as a reference image. The inter predictor 105 may include the intra predictor 6400. In order for the image decoding apparatus 100 to encode the image data, the image decoder 6000 according to various embodiments may perform operations of each stage on each block.

Figure 2A:
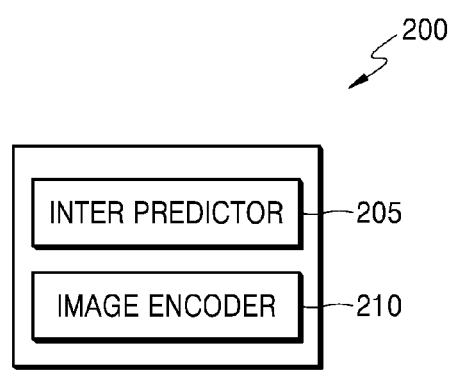
FIG. 2A is a block diagram of an image encoding apparatus, according to various embodiments.

FIG. 2A is a block diagram of an image encoding apparatus according to various embodiments.

According to various embodiments, the image encoding apparatus 200 may include an inter predictor 205 and an image encoder 210.

The inter predictor 205 and the image encoder 210 may include at least one processor. In addition, the inter predictor 205 and the image encoder 210 may include a memory that stores instructions to be executed by at least one processor. The image encoder 210 may be implemented as hardware separate from the inter prediction unit 205 or may include the inter predictor 205.

A history-based motion vector prediction technique according to an embodiment will be described below.

The history-based motion vector prediction technique refers to a technique for storing a history-based motion information list of N pieces of previously encoded motion information (preferably, N pieces of lastly encoded motion information among previously encoded motion information) in a buffer and performing motion vector prediction, based on the history-based motion information list.

The inter predictor 105 may generate an Advanced Motion Vector Prediction (AMVP) candidate list or a merge candidate list by using at least some of the motion information included in the history-based motion information list.

Similar to the above-described history-based motion vector prediction technique, the inter predictor 105 may store a history-based motion information list of motion vector information of N previously encoded affine blocks in the buffer.

When the same motion information is generated several times, the inter predictor 205 may allocate relatively high priority to the same motion information in the history-based motion information list.

The inter predictor 205 may generate an affine Advanced Motion Vector Prediction (AMVP) candidate list or an affine merge candidate list by using at least some of affine motion information included in the history-based motion information list. In this case, all candidates included in the affine AMVP candidate list or the affine merge candidate list may be determined based on the motion information included in the history-based motion information list, or candidates included in the history-based motion information list may be added to the affine AMVP candidate list or the affine merge candidate list with higher or lower priority than existing candidates.

The inter predictor 205 may derive motion information for a current block from motion information of one of the candidates included in the history-based motion information list. For example, the motion information for the current block may be derived by an extrapolation process. That is, the inter predictor 205 may derive the motion information for the current block from motion information of one of the candidates included in the history-based motion information list by performing an extrapolation process similar to that performed to calculate an affine inherited model by using a neighboring motion vector. The inter predictor 205 may derive the motion information for the current block from motion information of one of the candidates included in the history-based motion information list, and thus, a motion vector for a neighboring block (e.g., motion vectors of a block TL located at a top left side of the neighboring block, a block TR located at a top right side of the neighboring block, and a block BL located at a bottom left side of the neighboring block) may not be accessed similar to when an affine candidate is generated according to the related art. Therefore, there is no need to determine whether motion information of the neighboring block is available, thereby reducing hardware implementation costs.

In this case, the history-based motion information list for the affine model may be managed by the first-in first-out (FIFO) method.

Additionally, the inter predictor 205 may use a motion vector, which is included in the history-based motion information list, for a normal merge mode process or an AMVP mode process. That is, the inter predictor 205 may generate a motion information candidate list for the normal merge mode process or the AMVP mode process by using a motion vector included in the history-based motion information list. In this case, the normal merge mode process or the AMVP mode process refers to a process in which basically, motion information generated based on the affine model-based motion compensation mode is not used. In this case, the normal merge mode process or the AMVP mode process may be understood to mean a merge mode process or an AMVP mode process disclosed in a standard such as the HEVC standard or the VVC standard.

Candidate reordering will be described below.

When there are several pieces of affine motion information of a neighboring block available for a current block, the inter predictor 205 may generate an affine merge candidate list or an affine AMVP candidate list such that high priority is allocated to motion information of a block having a large size (large length, height or area) among the several pieces of affine motion information. Alternatively, the inter predictor 205 may determine priority of each neighboring block in the affine merge candidate list or the affine AMVP candidate list, based on widths of upper neighboring blocks having affine motion information. The inter predictor 205 may determine priority of each neighboring block in the affine merge candidate list or the affine AMVP candidate list, based on heights of left neighboring blocks having affine motion information.

A far distance affine candidate will be described below.

In order to derive inherited affine motion information of a current block, the inter predictor 205 may search for a neighboring block having affine motion information (hereinafter referred to as a neighboring affine block) and perform the extrapolation technique on the current block, based on the affine motion information of the neighboring affine block.

The inter predictor 205 may derive the inherited affine motion information of the current block by using an affine block distant from the current block, as well as the neighboring affine block. For example, affine blocks located at upper, left, and upper left sides of the current block may be scanned, and affine motion information of one of the scanned affine blocks may be added to the affine AMVP candidate list or the affine merge candidate list. In this case, one of the scanned affine blocks may not be added immediately but may be added to the affine AMVP candidate list or the affine merge candidate list after the extrapolation process is performed on the motion information of the affine block.

Affine motion compensation based on motion information of a temporal affine candidate block will be described below.

The inter predictor 105 may use motion information of three positions on a current block to derive the affine motion information of the current block. In this case, the three positions may be a top-left (TL) corner, a top-right (TR) corner, and a below-left (BL) corner. However, the disclosure is not limited thereto, and the inter predictor 105 may determine temporal positions as the three positions. For example, the inter predictor 105 may determine a TL corner, a TR corner, and a BL corner of a collocated block as three surrounding positions. In this case, the collocated block refers to a block included in an image decoded before a current image and located at the same position as the current block. When a reference index is different, the motion information may be scaled. The inter predictor 105 may derive the affine motion information of the current block, based on motion information of the temporally determined three positions.

In order to determine motion information for deriving the affine motion information of the current block from a reference frame, the inter predictor 105 may determine motion information of three positions on a corresponding block as motion information for deriving the affine motion information of the current block instead of the three positions on the collocated block. In this case, the corresponding block refers to a block located at a position away by an offset defined by a motion vector from the current block. The motion vector may be obtained from a block located temporally and spatially around the current block.

The inter predictor 105 may temporally determine at least some of the three positions and determine the remaining positions by using an inherited candidate or motion information of a block spatially adjacent to the current block.

When a collocated block or a corresponding block of a reference frame does not have motion information, the inter predictor 205 may search for motion information of neighboring blocks of the collocated block or the corresponding block and determine motion information for deriving affine motion information of the current block by using the searched-for motion information.

The inter predictor 205 may perform the following operation to fill an inner region of the current block with affine motion information by using an inherited affine candidate.

The inter predictor 205 may determine three points in a neighboring block as start points, and derive a motion vector for the inner region of the current block, based on the start points.

Alternatively, the inter predictor 205 may first derive motion vectors of three points in the current block, and derive a motion vector of the remaining region of the current block, based on the motion vectors of the three points.

An adaptive motion vector resolution technique will be described below.

The adaptive motion vector resolution technique refers to a technique for representing a resolution of a motion vector difference (hereinafter referred to as MVD) with respect to a coding unit to be currently encoded. In this case, information regarding the resolution of the MVD may be signaled through a bitstream.

The image encoding apparatus 200 is not limited to encoding information about a resolution of an MVD (preferably, index information) and generating a bitstream including the encoded information, and may derive a resolution of a current, based on at least one of an MVD of a previous block or an MVD of the current block.

For example, when the resolution of the MVD of the current block is 4 or ¼, the image encoder 210 may encode the MVD of the current block such that the MVD of the current block is an odd number.

The image encoder 210 may encode information for explicit signaling so that the image decoding apparatus 100 may determine the resolution of the MVD of the current block from a combination of explicit signaling and implicit induction.

For example, the image encoder 210 may encode a flag, based on whether the resolution of the MVD of the current block is ¼. When the flag is a first value, it may indicate that the resolution of the MVD of the current block is ¼, and when the flag is a second value, it may indicate that the resolution of the MVD of the current block is not ¼. When the image encoder 210 derives the resolution of the MVD of the current block, based on an MVD, the image encoder 210 may encode a value of a flag into a second value.

Specifically, when it is determined that the accuracy of a motion of a quarter pixel is to be used for the MVD of the current block, the image encoder 210 may encode an AMVR flag amvr_flag into 0 and generate a bitstream including the encoded AMVR flag amvp_flag. When it is determined that the accuracy of a motion of another pixel is to be used for the MVD of the current block, the image encoder 210 may encode the AMVR flag amvr_flag into 1 and generate a bitstream including the encoded AMVR flag amvp_flag.

The image encoder 210 may modify or determine a value of a least significant bit (LSB) of the MVD of the current block when a resolution of a motion vector for the accuracy of one pixel or the accuracy of four pixels is determined. When a resolution of the MVD of the current block is determined as a resolution of one pixel, the image encoder 210 may modify the value of the LSB of the MVD of the current block to be 0 or determine the value of the LSB (parity bit) of the MVD of the current block as 1.

When a resolution of the MVD of the current block is determined as a resolution of four pixels, the image encoder 210 may modify the value of the LSB of the MVD of the current block to be 1 or determine the value of the LSB (parity bit) of the MVD of the current block as 1.

The image encoder 210 may encode the MVD of the current block, based on the resolution of the MVD of the current block. That is, the image encoder 210 may encode information about the MVD of the current block, based on the MVD of the current block and the resolution of the MVD of the current block.

For example, when the resolution of the MVD of the current block is determined as the resolution of one pixel, the image encoder 210 may determine the MVD of the current block, based on Equation 3 below. In this case, when the MVD is 1, it may mean a ¼ pixel. The MVD on the left side of Equation 3 may be information about the MVD of the current block to be encoded.

$$MVD=((MVD>>2)<<1) \qquad \text{[Equation 3]}$$

When the resolution of the MVD of the current block is determined as the resolution of four pixels, the image encoder 210 may determine the MVD of the current block, based on Equation 4 below. In this case, when the MVD is 1, it may mean a ¼ pixel. The MVD on the left side of Equation 4 may be information about the MVD of the current block to be encoded.

$$MVD=((MVD>>4)<<1)+1 \qquad \text{[Equation 4]}$$

A history-based technique according to an embodiment will be described below.

The image encoder 210 may store recently encoded N intra prediction modes in a history-based list. When the same intra prediction mode occurs in the history-based list, the image encoder 210 may determine priority of the same intra prediction mode to be high. The image encoder 210 may encode an index or flag information indicating an intra prediction mode in the history-based list. The image encoder 210 may derive a Most Probable Mode (MPM), based on the intra prediction model in the history-based list.

The image encoder 210 may store recently encoded N modes in the history-based list. In this case, the stored N modes may be, but are not limited to, an intra mode, an inter mode, a Decoder Side Motion Vector Refinement (DMVR) mode, an affine mode, a skip mode, and the like. The image encoder 210 may encode information in the form of an index indicating a mode for a current block in the history-based list.

The image encoder 210 may determine a context model, based on the history-based list. For example, the image encoder 210 may store recently encoded N modes (e.g., prediction modes such as an inter mode or an intra prediction mode) in the history-based list, and derive a context model for entropy encoding information regarding a prediction mode of the current block, based on the modes included in the history-based list.

A motion information candidate list reordering technique will be described below.

The inter predictor 205 may determine priority of a neighboring block in an AMVP candidate list or a merge candidate list, based on the size of the neighboring block. For example, the inter predictor 205 may determine priority of the neighboring candidate block in the AMVP candidate list or the merge candidate list to be higher as a width, height, or area of the neighboring candidate block increases. In detail, when a width of a neighboring candidate block above a current block is large, the inter predictor 205 may determine priority of the neighboring candidate block to be high. When a height of a neighboring candidate block at a left side of the current block is large, the inter predictor 205 may determine priority of the neighboring candidate block to be high.

Motion compensation of a chroma block according to an embodiment will be described below.

The image encoder 210 may determine a plurality of luma blocks in a current luma image by hierarchically splitting the current luma image, based on a split shape mode of the current luma image. The split shape mode of the current luma image may be provided in units of blocks. That is, after the current block is split into a plurality of blocks according to the split shape mode of the current block, a corresponding block may be additionally split according to a split shape mode of the plurality of blocks. The split shape mode of the current luma image may be encoded. The split shape mode may be a mode based on a split shape mode including one of quad split, binary split, and tri-split.

The image encoder 210 may determine a current rectangular chroma block corresponding to a current luma block having a square shape included in one of the plurality of luma blocks. In this case, the current luma block having the square shape may be a sub-block included in a coding unit of a luma component, and particularly, a motion information unit in an affine model-based motion compensation mode, but embodiments of the disclosure is not limited thereto. For example, the current luma block having the square shape may have a size of N×N (N is an integer). A size of the current luma block having the square shape may be 4×4 but is not limited thereto. The current luma block having the square shape has been described above but embodiments of the disclosure are not limited thereto and a current luma block may have a rectangular shape. For example, the current luma block may have a size of 2N×N or N×2N (N is an integer), e.g., 8×4 or 4×8. A height of a current chroma block having a rectangular shape may be the same as that of the current luma block and a width of the current chroma block may be half that of the current luma block, but embodiments of the disclosure are not limited thereto and the width of the current chroma block may be the same as that of the current luma block and the height of the current chroma block may be half that of the current luma block. For example, when the current luma block has a size of 4×4, the chroma block may have a size of 4×2 or 2×4. In this case, a chroma format of a chroma image including the current chroma block may be 4:2:2.

However, embodiments of the disclosure are not limited thereto, and the height of the rectangular current chroma block may be half that of the current luma block and the width thereof may be half that of the current luma block. For example, a current chroma block corresponding to a current rectangular luma block having a size of 8×4 or 4×8 may have a size of 4×2 or 2×4. In this case, the chroma format of the chroma image including the current chroma block may be 4:2:0. The inter predictor 205 may determine a piece of motion information for the current chroma block and a chroma block adjacent to the current chroma block by using motion information of the current chroma block and the adjacent chroma block. In this case, the motion information of the current chroma block used to determine the piece of motion information for the current chroma block and the adjacent chroma block may correspond to motion information of the current luma block. In addition, the motion information of the adjacent chroma block used to determine the piece of motion information for the current chroma block and the adjacent chroma block may correspond to motion information of an adjacent luma block corresponding to the adjacent chroma block.

For example, the motion information of the current chroma block may be the same as that of the current luma block, and the motion information of the adjacent chroma block may be the same as that of the adjacent luma block.

In this case, the current chroma block and the adjacent chroma block may be blocks adjacent to each other in a left-and-right direction. However, embodiments of the disclosure are not limited thereto, and the current chroma block and the adjacent chroma block may be blocks adjacent to each other vertically. A block that is a combination of the current chroma block and the adjacent chroma block may be a square block and have a size of 4×4, but embodiments of the disclosure are not limited thereto.

The motion information of the current chroma block and a block adjacent to the current chroma block may include motion vectors of the current chroma block and the adjacent chroma block, and a piece of motion information for the current chroma block and the adjacent chroma block may include a motion vector for the current chroma block and the adjacent chroma block.

The inter predictor 205 may determine an average value of a motion vector of the current chroma block and a motion vector of the adjacent chroma block as a value of a motion vector for the current chroma block and the adjacent chroma block.

The inter predictor 205 may perform motion compensation on a chroma block by using different filters in a horizontal direction and a vertical direction. In this case, the filters may vary according to coefficients thereof and the number of filter taps.

The inter predictor 205 may determine motion information of a chroma block by merging motion information of two chroma blocks and thus may have a low memory bandwidth when motion compensation is performed.

The inter predictor 205 may perform interpolation based on motion information of rectangular chroma blocks to determine motion information of a square chroma block smaller than the rectangular chroma blocks. For example, the inter predictor 205 may perform interpolation based on motion information of 2×4 chroma blocks to determine motion information of 2×2 chroma blocks.

The inter predictor 205 may perform inter prediction on a current chroma block and a chroma block adjacent to the current chroma block by using a piece of motion information for the current chroma block and the adjacent chroma block to generate prediction blocks of the current chroma block and the adjacent chroma block.

A Decoder Side Motion Vector Refinement (DMVR) technique will be described below. The DMVR technique refers to a technique of determining a refined motion vector by determining a reference block of a reference frame on the basis of a motion vector and searching for a neighboring region (e.g., a block extending by two pixels in up, down, left and right directions). In this case, when the inter predictor 105 searches for a neighboring region to determine a refined motion vector, a pixel value of the neighboring region should be additionally fetched. Thus, a memory bandwidth may be increased.

The inter predictor 205 may generate a prediction block of a current luma or chroma block by performing motion compensation on the current luma or chroma block by using a motion vector of the current luma block. In this case, the inter predictor 205 may determine a motion vector of a current luma or chroma block refined based on a motion vector refinement search in a reference luma or chroma image of a current luma or chroma image by using the motion vector of the current luma or chroma block. In detail, the inter predictor 205 may perform the motion vector refinement search using reconstructed pixel values of a reference luma or chroma block in a reference luma or chroma image indicated by the motion vector of the current luma or chroma block without using reconstructed neighboring pixel values of the reference luma or chroma block in the reference luma or chroma block in the reference luma or chroma image. A memory bandwidth may be reduced by performing the motion vector refinement search without using the reconstructed neighboring pixel values.

When a size of a current block is larger than a predetermined size, the inter predictor 205 may determine that inter prediction based on the DMVR technique is not to be performed on the current block. That is, when inter prediction is performed by the DMVR technique, the smaller a block, the larger a block to be expanded to perform the motion vector refinement search, compared to the size of the block, and thus, an increase rate in a memory bandwidth is higher in DMVR for the smaller block. To solve this problem, inter prediction based on the DMVR technique may be performed on a current block having a size larger than a predetermined size to prevent an increase in a memory bandwidth.

When the inter predictor 205 performs inter prediction based on the DMVR technique, a latency problem may occur. That is, the inter predictor 205 may perform inter prediction on a neighboring block, which is to be encoded after the current block, using motion information refined by the DMVR technique only after the motion vector refinement based on the DMVR technique is performed on the current block.

In order to solve the latency problem, the inter predictor 205 may use unrefined motion information, which is to be encoded, to encode a block to be encoded after the current block rather than refined motion information obtained by an inter prediction process based on the DMVR technique for inter prediction of the current block. However, loss may occur when the refined motion vector is not used.

In order to prevent loss, the inter prediction unit 205 may determine priority of motion vectors of neighboring blocks, which are inter-predicted based on the DMVR technique, to be low during derivation of a motion vector of a current block based on the AMVP or merge candidate list, thereby preventing a motion vector of the current block from being derived using the motion vectors of the neighboring blocks.

Alternatively, when a predetermined number or more of blocks among neighboring blocks of the current block are inter-predicted based on the DMVR technique, the inter predictor 205 may determine that inter prediction based on the DMVR technique is not to be performed on the current block. Accordingly, the number of unrefined motion vectors to be used during derivation of motion vectors of blocks to be encoded later may be reduced.

A triangular prediction mode will be described below. The triangular prediction mode refers to a mode in which a coding unit is split in a diagonal direction and prediction is performed based on two triangular portions (or triangular prediction units) obtained by dividing the coding unit in the diagonal direction. In this case, the diagonal direction may include a first direction from an upper left corner of the coding unit to a lower right corner thereof and a second direction from an upper right corner of the coding unit to a lower left corner thereof. Thus, there may be two types of triangular portions, based on the diagonal direction. Each of the two triangular portions may have a motion vector. Motion compensation may be performed on the two triangular portions, based on motion vectors thereof, and the two motion-compensated triangular portions may be merged into one block. A mask may be used to prevent a sudden transition during the merging of the two motion-compensated triangular portions.

The inter predictor 205 may split a coding unit of a block into two square or rectangular units in a horizontal or vertical direction rather than using triangular portions obtained in the triangular prediction mode, and perform motion compensation using motion vectors of the two square or rectangular units. The inter predictor 205 may split a coding unit in the horizontal or vertical direction to prevent an increase in a memory bandwidth.

When the coding unit is split into two portions in the diagonal direction, the inter predictor 205 may split the coding unit, based on only a diagonal direction of ±45 degrees relative to the horizontal direction. That is, the inter predictor 205 may split the coding unit into two portions in the diagonal direction of ±45 degrees relative to a center part of the coding unit. Therefore, when a block that is long in the vertical/horizontal direction is split, it is possible to prevent the block from being split into a direction close to the vertical/horizontal direction.

The inter predictor 205 may search for a motion vector of a neighboring block of a current coding unit, and split the current coding unit, based on a size of a motion vector of a searched-for neighboring block. For example, the inter predictor 205 may detect a change in the size of motion vectors of upper neighboring blocks while searching for the upper neighboring blocks in a horizontal direction from an upper left neighboring block to an upper right neighboring block, and when a degree of a change in the movement of an upper neighboring block is greater than a predetermined level, the upper neighboring block may be determined as a start or end point of division. In addition, the inter predictor 205 may detect a change in the size of motion vectors of left neighboring blocks while searching for the left neighboring blocks in a vertical direction from an upper left neighboring block to a lower left neighboring block, and when a degree of a change in the movement of a left neighboring block is greater than a predetermined level, the left neighboring block may be determined as a start or end point of division. The inter predictor 205 may split a current coding unit, based on the start or end point of division.

A dependent quantization technique will be described below. The dependent quantization technique is a technique for performing quantization using two available quantization units for all coefficients, and the two available quantization units may perform quantization using different quantization parameters.

The image encoder 210 may determine a state and a quantization unit to be used for a coefficient being currently encoded, based on at least one of parity of a previously encoded coefficient and parity of the coefficient being currently encoded, and generate a quantized transform coefficient, based on the quantization unit. In this case, the parity of the coefficient being currently encoded may be modified. An embodiment of disclosure regarding dependent quantization will be described in detail with reference to FIGS. 20A to 20C below.

The image encoder 210 may perform dependent quantization on a transform coefficient of a current luma/chroma block, encode residual information of the current luma/chroma block, and encode a parity flag indicating parity of a coefficient level in the current luma/chroma block. In this case, the parity flag may be encoded by limiting the number of parity flags to be encoded according to a predetermined scan order. The image encoder 210 may limit the number of parity flags to be encoded according to the scan order by limiting a region in which parity flags are to be encoded. For example, when a current scan position is within a predetermined range and a coefficient of the current scan position is a significant coefficient, the parity flag may be encoded. Alternatively, when a value of the current scan position is greater than or less than a predetermined value, the parity flag may be encoded when the coefficient of the current scan position is a significant coefficient.

Alternatively, the image encoder 210 may determine a first value, count the number of parity flags encoded whenever parity flags are encoded, compare the number of counted flags with the first value, and determine not to encode parity flags when the number of counted flags is greater than the first value. Alternatively, the image encoder 210 may subtract 1 from the first value whenever a parity flag is encoded, and determine not to encode parity flags when a result of subtracting 1 from the first value is zero. However, the counting by the image encoder 210 of only the number of encoded parity flags has been described above, but embodiments of the disclosure are not limited thereto and the number of encoded significant coefficient flags, gtX_flag, etc., which are not parity flags, may be counted together.

The image encoder 210 may adaptively perform dependent quantization, based on a scan region within a block currently being encoded. For example, when a current transform coefficient is located in an upper left corner region of the block currently being encoded, encoding based on the dependent quantization technique may be performed on the current transform coefficient, and quantization may be performed on the current transform coefficient for the remaining region of the block currently being encoded, based on a single quantization parameter.

The image encoder 210 may adaptively perform dependent quantization, based on at least one of a size of the block currently being encoded, a location of a current block (or sub block), or a location of the current transform coefficient. For example, when the size of the current block is larger than a predetermined size, encoding based on the dependent quantization technique may be performed on the block being currently encoded.

The image encoder 210 may perform dependent quantization when the block currently being encoded is a luma block, and may perform quantization on a transform coefficient of the block currently being encoded block, based on a single quantization parameter, when the block currently being encoded is a chroma block.

The image encoder 210 may determine the number of QPs, which are to be used for dependent quantization, to be greater than two, and determine the number of states to be greater than four. For example, the image encoder 210 may determine the number of QPs, which are to be used for dependent quantization, to be three and determine the number of states to be eight.

When parity flag is not encoded, the image encoder 210 may adaptively perform encoding based on the dependent quantization technique, based on a level size of a coefficient.

For example, when a previously encoded level is greater than N, the image encoder 310 may determine that quantization based on the dependent quantization technique is not to be performed when a level of the current transform coefficient is encoded. In this case, N may be determined, based on at least one of a quantization parameter, a block size, or a bit depth of a sample.

The image encoder 210 may determine a structure of a state machine, based on a previously encoded block.

The image encoder 210 may determine a context model to be used for entropy encoding at least one of a significant coefficient flag for a current transform coefficient, a gt1_flag or a gt2_flag, based on at least one of a significant coefficient flag for a neighboring coefficient having the same quantization parameter as the current transform coefficient, the gt1_flag or the gt2_flag. Alternatively, the image encoder 210 may determine a context model to be used for entropy decoding at least one of the significant coefficient flag for the current transform coefficient, the gt1_flag or the gt2_flag, based on at least one of a significant coefficient flag for a neighboring coefficient having the same state as the current transform coefficient, the gt1_flag or the gt2_flag. The image encoder 210 may perform entropy encoding in consideration of a relation between coefficients using similar quantization parameters as described above, thereby improving encoding efficiency.

The image encoder 210 may limit the number of parity flags to be encoded in a predetermined scan order so as to limit the total number of bins of parity flags to be entropy encoded, based on the context model, thereby reducing encoding complexity.

A method of determining a resolution of an MVD of a current block and a value of the MVD similar to the dependent quantization technique will be described below.

The image encoder 210 may determine one of a plurality of states, based on at least one of a parity of an MVD of a current block and a parity of an MVD of a previous block, and determine a resolution of the MVD of the current block, based on the determined state. In this case, at least one of the parity of the MVD of the current block or the parity of the MVD of the previous block may be modified. In this case, the determined resolution of the MVD of the current block may correspond to a quantization unit of the dependent quantization technique (or a quantization parameter to be used for the quantization unit), and the MVD of the current block/previously encoded block may correspond to a level of a transform coefficient that is being currently encoded or that was encoded by the dependent quantization technique.

The image encoder 210 may generate a residual block of a current luma or chroma block, based on a prediction block of the current luma or chroma block. The image encoder 210 may generate a residual block of the current luma or chroma block, based on an original block of the current luma or chroma block, and encode information about the residual block of the current luma or chroma block.

Figure 2B:
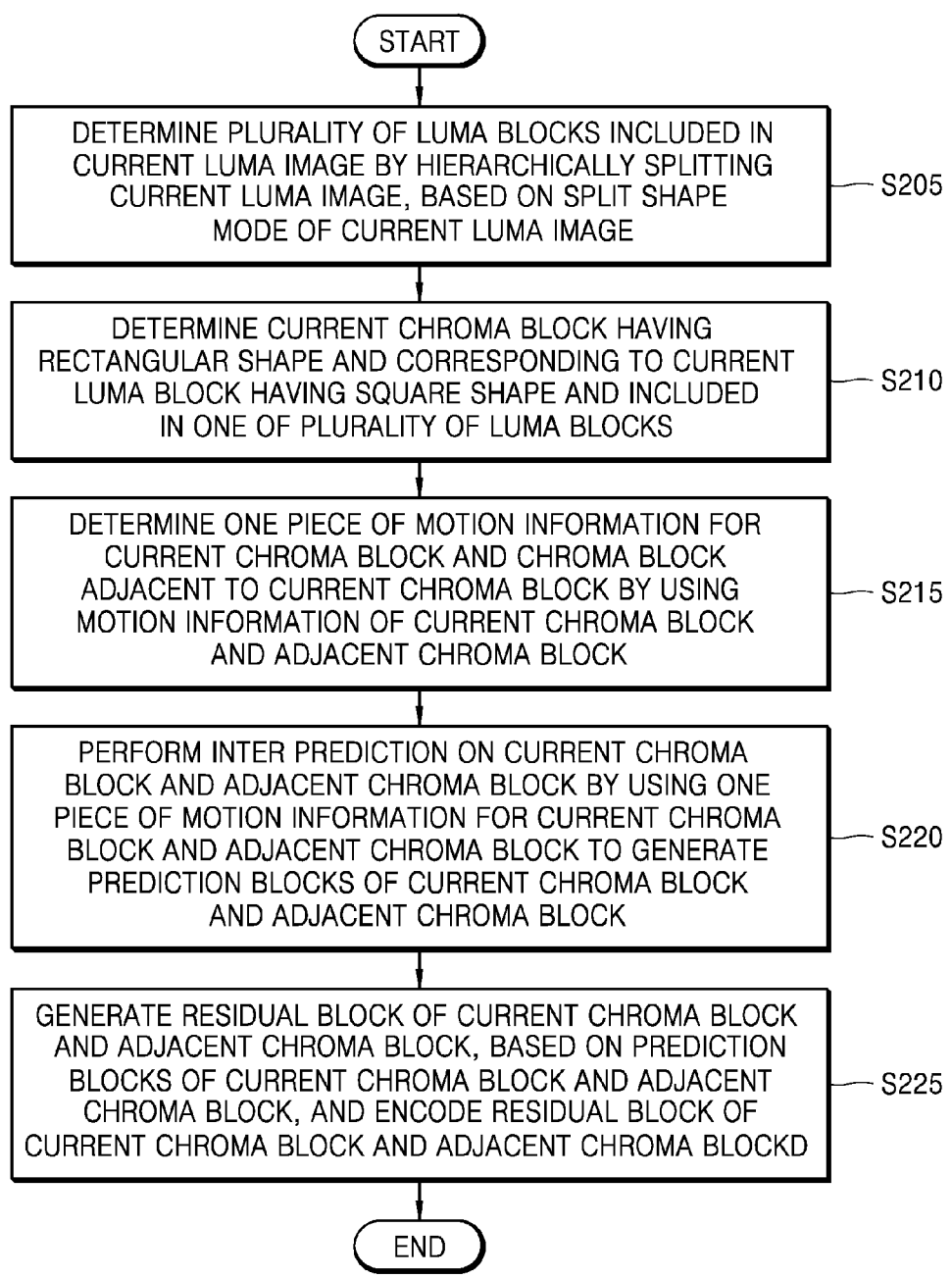
FIG. 2B illustrates a flowchart of an image encoding method according to various embodiments.

FIG. 2B is a flowchart of an image encoding method according to various embodiments.

In operation S205, the image encoding apparatus 200 may determine a plurality of luma blocks included in a current luma image by hierarchically splitting the current luma image, based on a split shape mode of the current luma image.

In operation S210, the image encoding apparatus 200 may determine a current chroma block having a rectangular shape and corresponding to a current luma block having a square shape and included in one of the plurality of luma blocks.

In operation S215, the image encoding apparatus 200 may determine a piece of motion information for the current chroma block and a chroma block adjacent to the current chroma block by using motion information of the current chroma block and the adjacent chroma block.

In operation S220, the image encoding apparatus 200 may perform inter prediction on the current chroma block and the adjacent chroma block by using a piece of motion information for the current chroma block and the adjacent chroma block to generate prediction blocks of the current chroma block and the adjacent chroma block.

In operation S225, the image encoding apparatus 200 may generate a residual block of the current chroma block and the adjacent chroma block, based on the prediction blocks of the current chroma block and the adjacent chroma block, and encode the residual block of the current chroma block and the adjacent chroma block.

Figure 2C:
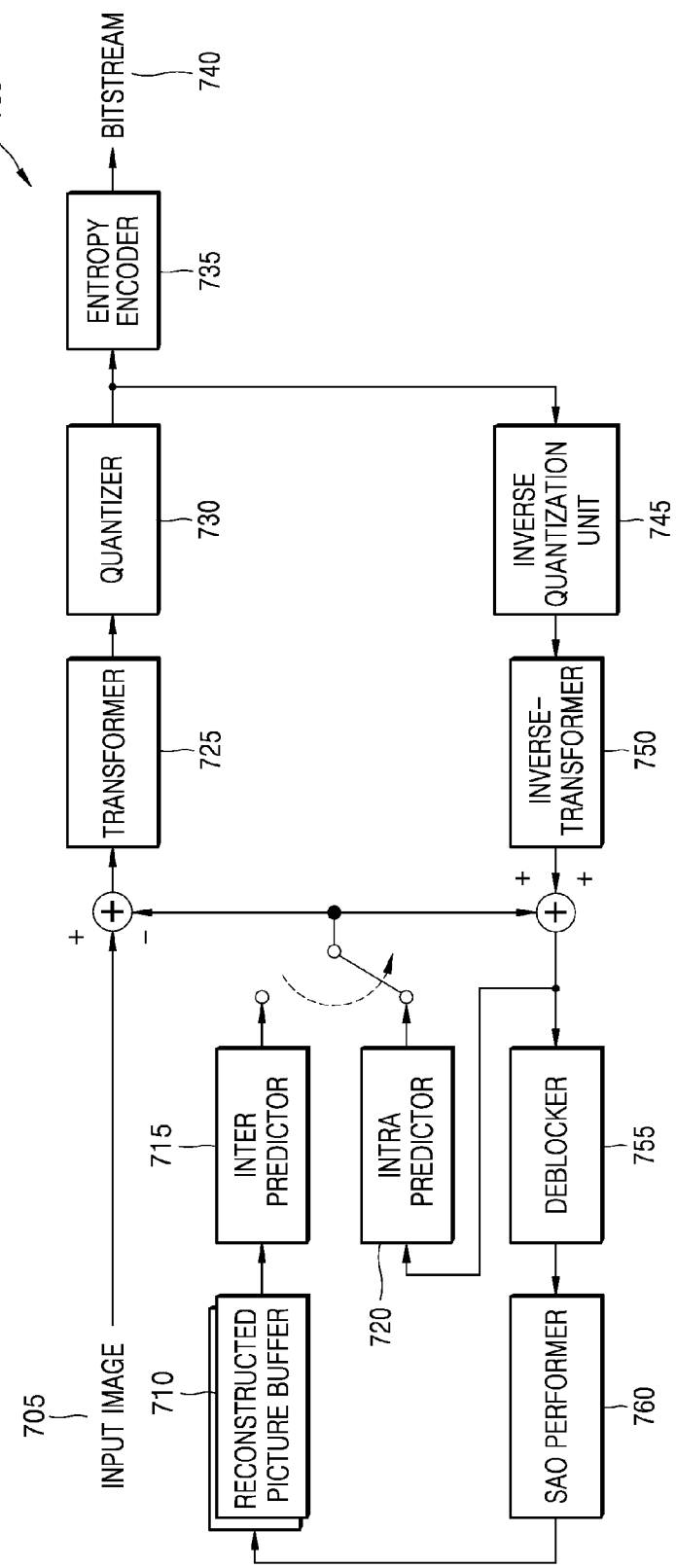
FIG. 2C is a block diagram of an image encoder according to various embodiments.

FIG. 2C is a block diagram of an image encoder according to various embodiments.

An image encoder 7000 according to various embodiments performs operations necessary for the image encoder 210 of the image encoding apparatus 200 to encode image data.

That is, an intra predictor 7200 performs intra prediction on each of blocks of a current image 7050, and an inter predictor 7200 performs inter prediction on each of the blocks by using the current image 7050 and a reference image obtained from a reconstructed picture buffer 7100.

Prediction data is subtracted from data of a block to be encoded in the current image 7050, wherein the prediction data is related to each block and is output from the intra predictor 7200 or the inter predictor 7200, and the transformer 7250 and the quantizer 7300 may output a quantized transform coefficient of each block by performing transformation and quantization on the residue data. An inverse quantization unit 7450 and an inverse-transformer 7500 may reconstruct residue data of a spatial domain by performing de-quantization and inverse transformation on the quantized transform coefficient. The reconstructed residue data of the spatial domain may be added to the prediction data that is related to each block and is output from the intra predictor 7200 or the inter predictor 7200, and thus may be reconstructed as data of a spatial domain with respect to a block of the current image 7050. A deblocker 7550 and a SAO performer generate a filtered reconstructed image by performing inloop filtering on the reconstructed data of the spatial domain. The inter predictor 205 may include the inter predictor 7200 of the image encoder 7000. The generated reconstructed image is stored in the reconstructed picture buffer 7100. Reconstructed images stored in the reconstructed picture buffer 7100 may be used as a reference image for inter prediction with respect to another image. An entropy encoder 7350 may entropy encode the quantized transform coefficient, and the entropy encoded coefficient may be output as a bitstream 7400.

In order for the image encoder 7000 according to various embodiments to be applied to the image encoding apparatus 200, the image encoder 7000 according to various embodiments may perform operations of each stage on each block.

Hereinafter, splitting of a coding unit will be described in detail according to an embodiment of the disclosure.

An image may be split into largest coding units. A size of each largest coding unit may be determined based on information obtained from a bitstream. A shape of each largest coding unit may be a square shape of the same size. However, the disclosure is not limited thereto. Also, a largest coding unit may be hierarchically split into coding units based on split shape mode information obtained from the bitstream. The split shape mode information may include at least one of information indicating whether splitting is to be performed, split direction information, and split type information. The information indicating whether splitting is to be performed indicates whether a coding unit is to be split. The split direction information indicates that splitting is to be performed in one of a horizontal direction or a vertical direction. The split type information indicates that a coding unit is to be split by using one of binary split, tri split (also referred to as triple split), or quad split.

For convenience of description, in the disclosure, it is assumed that the split shape mode information includes the information indicating whether splitting is to be performed, the split direction information, and the split type information, but the disclosure is not limited thereto. The image decoding apparatus 100 may obtain, from a bitstream, the split shape mode information as one bin string. The image decoding apparatus 100 may determine whether to split a coding unit, a split direction, and a split type, based on the one bin string.

The coding unit may be equal to or smaller than a largest coding unit. For example, when the split shape mode information indicates that splitting is not to be performed, the coding unit has a same size as the largest coding unit. When the split shape mode information indicates that splitting is to be performed, the largest coding unit may be split into lower-depth coding units. When split shape mode information about the lower-depth coding units indicates splitting, the lower-depth coding units may be split into smaller coding units. However, the splitting of the image is not limited thereto, and the largest coding unit and the coding unit may not be distinguished. The splitting of the coding unit will be described in detail with reference to FIGS. 3 to 16.

Also, the coding unit may be split into prediction units for prediction of the image. The prediction units may each be equal to or smaller than the coding unit. Also, the coding unit may be split into transform units for transformation of the image. The transform units may each be equal to or smaller than the coding unit. Shapes and sizes of the transform unit and the prediction unit may not be related to each other. The coding unit may be distinguished from the prediction unit and the transform unit, or the coding unit, the prediction unit, and the transform unit may be equal to each other. Splitting of the prediction unit and the transform unit may be performed in a same manner as splitting of the coding unit. The splitting of the coding unit will be described in detail with reference to FIGS. 3 to 16. A current block and a neighboring block of the disclosure may indicate one of the largest coding unit, the coding unit, the prediction unit, and the transform unit. Also, the current block of the current coding unit is a block that is currently being decoded or encoded or a block that is currently being split. The neighboring block may be a block reconstructed prior to the current block. The neighboring block may be spatially or temporally adjacent to the current block. The neighboring block may be located at one of the lower-left, left, upper-left, top, upper-right, right, lower-right of the current block.

Figure 3:
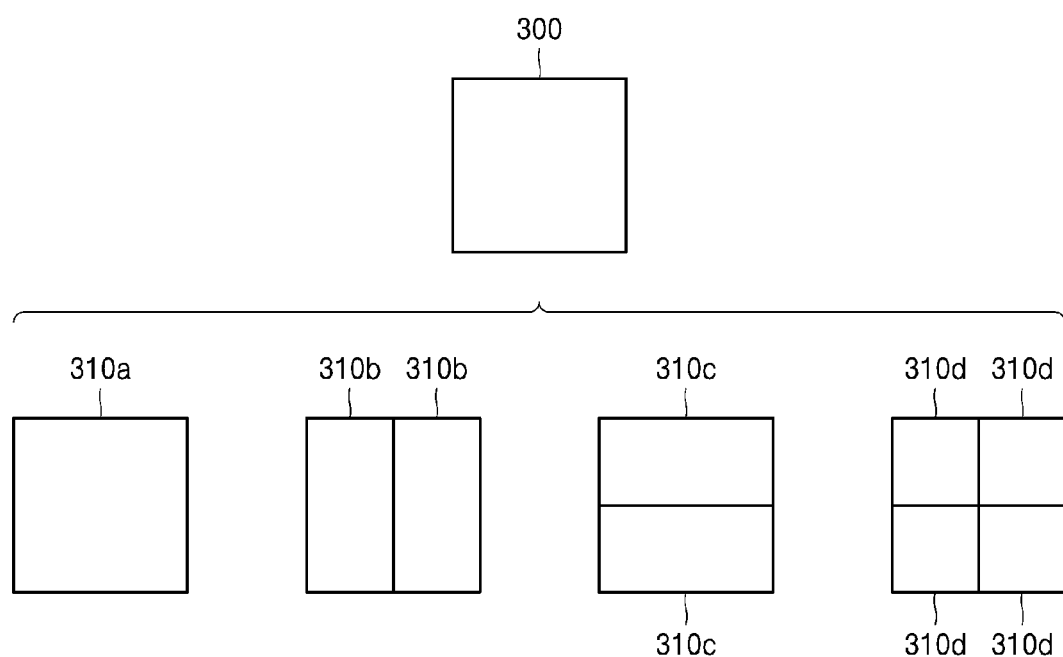
FIG. 3 illustrates a process, performed by the image decoding apparatus, of determining at least one coding unit by splitting a current coding unit, according to an embodiment.

FIG. 3 illustrates a process, performed by the image decoding apparatus 100, of determining at least one coding unit by splitting a current coding unit, according to an embodiment.

A block shape may include 4N×4N, 4N×2N, 2N×4N, 4N×N, or N×4N. Here, N may be a positive integer. Block shape information is information indicating at least one of a shape, direction, a ratio of a width and height, or sizes of the coding unit.

The shape of the coding unit may include a square and a non-square. When the lengths of the width and height of the coding unit are equal (i.e., when the block shape of the coding unit is 4N×4N), the image decoding apparatus 100 may determine the block shape information of the coding unit as a square. The image decoding apparatus 100 may determine the shape of the coding unit to be a non-square.

When the lengths of the width and the height of the coding unit are different from each other (i.e., when the block shape of the coding unit is 4N×2N, 2N×4N, 4N×N, or N×4N), the image decoding apparatus 100 may determine the block shape information of the coding unit as a non-square shape. When the shape of the coding unit is non-square, the image decoding apparatus 100 may determine the ratio of the width and height in the block shape information of the coding unit to be at least one of 1:2, 2:1, 1:4, 4:1, 1:8, or 8:1. Also, the image decoding apparatus 100 may determine whether the coding unit is in a horizontal direction or a vertical direction, based on the length of the width and the length of the height of the coding unit. Also, the image decoding apparatus 100 may determine the size of the coding unit, based on at least one of the length of the width, the length of the height, or the area of the coding unit.

According to an embodiment, the image decoding apparatus 100 may determine the shape of the coding unit by using the block shape information, and may determine a splitting method of the coding unit by using the split shape mode information. That is, a coding unit splitting method indicated by the split shape mode information may be determined based on a block shape indicated by the block shape information used by the image decoding apparatus 100.

The image decoding apparatus 100 may obtain the split shape mode information from a bitstream. However, an embodiment is not limited thereto, and the image decoding apparatus 100 and the image encoding apparatus 200 may obtain pre-agreed split shape mode information, based on the block shape information. The image decoding apparatus 100 may obtain the pre-agreed split shape mode information with respect to a largest coding unit or a smallest coding unit. For example, the image decoding apparatus 100 may determine split shape mode information with respect to the largest coding unit to be a quad split. Also, the image decoding apparatus 100 may determine split shape mode information regarding the smallest coding unit to be "not to perform splitting". In particular, the image decoding apparatus 100 may determine the size of the largest coding unit to be 256×256. The image decoding apparatus 100 may determine the pre-agreed split shape mode information to be a quad split. The quad split is a split shape mode in which both the width and the height of the coding unit are bisected. The image decoding apparatus 100 may obtain a coding unit of a 128×128 size from the largest coding unit of a 256×256 size, based on the split shape mode information. Also, the image decoding apparatus 100 may determine the size of the smallest coding unit to be 4×4. The image decoding apparatus 100 may obtain split shape mode information indicating "not to perform splitting" with respect to the smallest coding unit.

According to an embodiment, the image decoding apparatus 100 may use the block shape information indicating that the current coding unit has a square shape. For example, the image decoding apparatus 100 may determine whether not to split a square coding unit, whether to vertically split the square coding unit, whether to horizontally split the square coding unit, or whether to split the square coding unit into four coding units, based on the split shape mode information. Referring to FIG. 3, when the block shape information of a current coding unit 300 indicates a square shape, the image decoder 110 may not split a coding unit 310a having the same size as the current coding unit 300, based on the split shape mode information indicating not to perform splitting, or may determine coding units 310b, 310c, or 310d split based on the split shape mode information indicating a predetermined splitting method.

Referring to FIG. 3, according to an embodiment, the image decoding apparatus 100 may determine two coding units 310b obtained by splitting the current coding unit 300 in a vertical direction, based on the split shape mode information indicating to perform splitting in a vertical direction. The image decoding apparatus 100 may determine two coding units 310c obtained by splitting the current coding unit 300 in a horizontal direction, based on the split shape mode information indicating to perform splitting in a horizontal direction. The image decoding apparatus 100 may determine four coding units 310d obtained by splitting the current coding unit 300 in vertical and horizontal directions, based on the split shape mode information indicating to perform splitting in vertical and horizontal directions. However, splitting methods of the square coding unit are not limited to the aforementioned methods, and may include various methods that may be indicated by the split shape mode information. Predetermined splitting methods of splitting the square coding unit will be described in detail below in relation to various embodiments.

Figure 4:
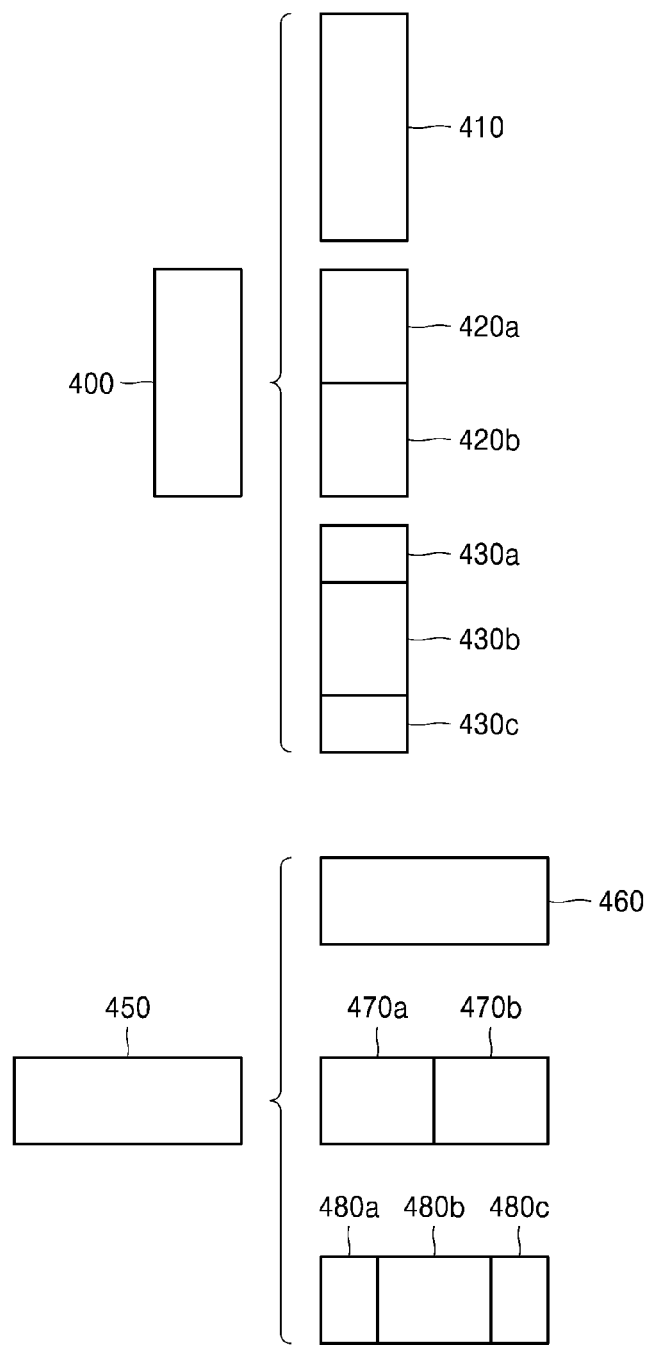
FIG. 4 illustrates a process, performed by the image decoding apparatus, of determining at least one coding unit by splitting a non-square coding unit, according to an embodiment.

FIG. 4 illustrates a process, performed by the image decoding apparatus 100, of determining at least one coding unit by splitting a non-square coding unit, according to an embodiment.

According to an embodiment, the image decoding apparatus 100 may use block shape information indicating that a current coding unit has a non-square shape. The image decoding apparatus 100 may determine whether not to split the non-square current coding unit or whether to split the non-square current coding unit by using a predetermined splitting method, based on split shape mode information. Referring to FIG. 4, when the block shape information of a current coding unit 400 or 450 indicates a non-square shape, the image decoding apparatus 100 may determine that a coding unit 410 or 460 having the same size as the current coding unit 400 or 450, based on the split shape mode information indicating not to perform splitting, or may determine coding units 420a and 420b, 430a, 430b, and 430c, 470a and 470b, or 480a, 480b, and 480c which are split based on the split shape mode information indicating a predetermined splitting method. Predetermined splitting methods of splitting a non-square coding unit will be described in detail below in relation to various embodiments.

According to an embodiment, the image decoding apparatus 100 may determine a splitting method of a coding unit by using the split shape mode information and, in this case, the split shape mode information may indicate the number of one or more coding units generated by splitting a coding unit. Referring to FIG. 4, when the split shape mode information indicates to split the current coding unit 400 or 450 into two coding units, the image decoding apparatus 100 may determine two coding units 420a and 420b, or 470a and 470b included in the current coding unit 400 or 450, by splitting the current coding unit 400 or 450 based on the split shape mode information.

According to an embodiment, when the image decoding apparatus 100 splits the non-square current coding unit 400 or 450 based on the split shape mode information, the image decoding apparatus 100 may split a current coding unit, in consideration of the location of a long side of the non-square current coding unit 400 or 450. For example, the image decoding apparatus 100 may determine a plurality of coding units by splitting the current coding unit 400 or 450 by splitting a long side of the current coding unit 400 or 450, in consideration of the shape of the current coding unit 400 or 450.

According to an embodiment, when the split shape mode information indicates to split (tri-split) a coding unit into an odd number of blocks, the image decoding apparatus 100 may determine an odd number of coding units included in the current coding unit 400 or 450. For example, when the split shape mode information indicates to split the current coding unit 400 or 450 into three coding units, the image decoding apparatus 100 may split the current coding unit 400 or 450 into three coding units 430a, 430b, and 430c, or 480a, 480b, and 480c.

According to an embodiment, a ratio of the width and height of the current coding unit 400 or 450 may be 4:1 or 1:4. When the ratio of the width and height is 4:1, the block shape information may indicate a horizontal direction because the length of the width is longer than the length of the height. When the ratio of the width and height is 1:4, the block shape information may indicate a vertical direction because the length of the width is shorter than the length of the height. The image decoding apparatus 100 may determine to split a current coding unit into the odd number of blocks, based on the split shape mode information. Also, the image decoding apparatus 100 may determine a split direction of the current coding unit 400 or 450, based on the block shape information of the current coding unit 400 or 450. For example, when the current coding unit 400 is in the vertical direction, the image decoding apparatus 100 may determine the coding units 430a, 430b, and 430c by splitting the current coding unit 400 in the horizontal direction. Also, when the current coding unit 450 is in the horizontal direction, the image decoding apparatus 100 may determine the coding units 480a, 480b, and 480c by splitting the current coding unit 450 in the vertical direction.

According to an embodiment, the image decoding apparatus 100 may determine the odd number of coding units included in the current coding unit 400 or 450, and not all the determined coding units may have the same size. For example, a predetermined coding unit 430b or 480b from among the determined odd number of coding units 430a, 430b, and 430c, or 480a, 480b, and 480c may have a size different from the size of the other coding units 430a and 430c, or 480a and 480c. That is, coding units which may be determined by splitting the current coding unit 400 or 450 may have multiple sizes and, in some cases, all of the odd number of coding units 430a, 430b, and 430c, or 480a, 480b, and 480c may have different sizes.

According to an embodiment, when the split shape mode information indicates to split a coding unit into the odd number of blocks, the image decoding apparatus 100 may determine the odd number of coding units included in the current coding unit 400 or 450, and in addition, may put a predetermined restriction on at least one coding unit from among the odd number of coding units generated by splitting the current coding unit 400 or 450. Referring to FIG. 4, the image decoding apparatus 100 may allow a decoding process of the coding unit 430b or 480b to be different from that of the other coding units 430a and 430c, or 480a or 480c, wherein coding unit 430b or 480b is at a center location from among the three coding units 430a, 430b, and 430c or 480a, 480b, and 480c generated by splitting the current coding unit 400 or 450. For example, the image decoding apparatus 100 may restrict the coding unit 430b or 480b at the center location to be no longer split or to be split only a predetermined number of times, unlike the other coding units 430a and 430c, or 480a and 480c.

Figure 5:
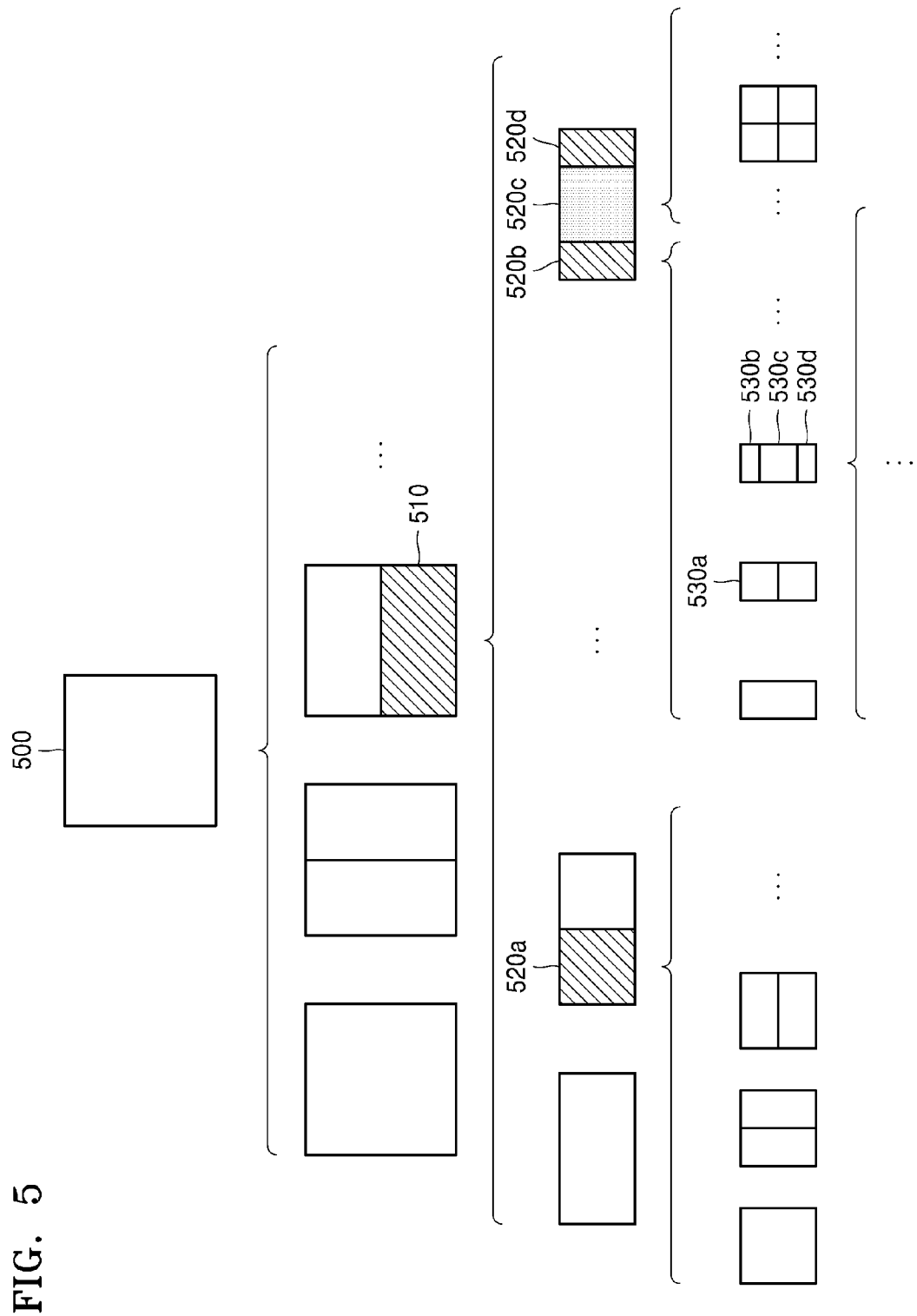
FIG. 5 illustrates a process, performed by the image decoding apparatus, of splitting a coding unit based on at least one of block shape information and split shape mode information, according to an embodiment.

FIG. 5 illustrates a process, performed by the image decoding apparatus 100, of splitting a coding unit based on at least one of block shape information and split shape mode information, according to an embodiment.

According to an embodiment, the image decoding apparatus 100 may determine to split a square first coding unit 500 into coding units, based on at least one of the block shape information and the split shape mode information, or may determine to not split the square first coding unit 500. According to an embodiment, when the split shape mode information indicates to split the first coding unit 500 in a horizontal direction, the image decoding apparatus 100 may determine a second coding unit 510 by splitting the first coding unit 500 in a horizontal direction. A first coding unit, a second coding unit, and a third coding unit used according to an embodiment are terms used to understand a relation before and after splitting a coding unit. For example, the second coding unit may be determined by splitting the first coding unit, and the third coding unit may be determined by splitting the second coding unit. It will be understood that the structure of the first coding unit, the second coding unit, and the third coding unit follows the above descriptions.

According to an embodiment, the image decoding apparatus 100 may determine to split the determined second coding unit 510 into coding units, based on at least one of the block shape information and the split shape mode information, or may determine to not split the determined second coding unit 510. Referring to FIG. 5, the image decoding apparatus 100 may split the non-square second coding unit 510, which is determined by splitting the first coding unit 500, into one or more third coding units 520a, or 520b, 520c, and 520d at least one of the block shape information and the split shape mode information, or may not split the non-square second coding unit 510. The image decoding apparatus 100 may obtain at least one of the block shape information and the split shape mode information, and may split a plurality of various-shaped second coding units (e.g., 510) by splitting the first coding unit 500, based on at least one of the obtained block shape information and the obtained split shape mode information, and the second coding unit 510 may be split by using a splitting method of the first coding unit 500 based on at least one of the block shape information and the split shape mode information. According to an embodiment, when the first coding unit 500 is split into the second coding units 510 based on at least one of block shape information and split shape mode information about the first coding unit 500, the second coding unit 510 may also be split into the third coding units 520a, or 520b, 520c, and 520d based on at least one of block shape information and split shape mode information about the second coding unit 510. That is, a coding unit may be recursively split based on at least one of block shape information and split shape mode information about each coding unit. Therefore, a square coding unit may be determined by splitting a non-square coding unit, and a non-square coding unit may be determined by recursively splitting the square coding unit.

Referring to FIG. 5, a predetermined coding unit (e.g., a coding unit located at a center location or a square coding unit) from among the odd number of third coding units 520b, 520c, and 520d determined by splitting the non-square second coding unit 510 may be recursively split. According to an embodiment, the non-square third coding unit 520b from among the odd number of third coding units 520b, 520c, and 520d may be split in a horizontal direction into a plurality of fourth coding units. A non-square fourth coding unit 530b or 530d from among a plurality of fourth coding units 530*a*, 530*b*, 530*c*, and 530*d* may be re-split into a plurality of coding units. For example, the non-square fourth coding unit 530*b* or 530*d* may be re-split into the odd number of coding units. A method that may be used to recursively split a coding unit will be described below in relation to various embodiments.

According to an embodiment, the image decoding apparatus 100 may split each of the third coding units 520*a*, or 520*b*, 520*c*, and 520*d* into coding units, based on at least one of block shape information and split shape mode information. Also, the image decoding apparatus 100 may determine to not split the second coding unit 510 based on at least one of block shape information and split shape mode information. According to an embodiment, the image decoding apparatus 100 may split the non-square second coding unit 510 into the odd number of third coding units 520*b*, 520*c*, and 520*d*. The image decoding apparatus 100 may put a predetermined restriction on a predetermined third coding unit from among the odd number of third coding units 520*b*, 520*c*, and 520*d*. For example, the image decoding apparatus 100 may restrict the third coding unit 520*c* at a center location from among the odd number of third coding units 520*b*, 520*c*, and 520*d* to be no longer split or to be split a settable number of times.

Referring to FIG. 5, the image decoding apparatus 100 may restrict the third coding unit 520*c*, which is at the center location from among the odd number of third coding units 520*b*, 520*c*, and 520*d* included in the non-square second coding unit 510, to be no longer split, to be split by using a predetermined splitting method (e.g., split into only four coding units or split by using a splitting method of the second coding unit 510), or to be split only a predetermined number of times (e.g., split only n times (where n>0)). However, the restrictions on the third coding unit 520*c* at the center location are not limited to the aforementioned examples, and it should be interpreted that the restrictions may include various restrictions for decoding the third coding unit 520*c* at the center location differently from the other third coding units 520*b* and 520*d*.

According to an embodiment, the image decoding apparatus 100 may obtain at least one of block shape information and split shape mode information, which is used to split a current coding unit, from a predetermined location in the current coding unit.

Figure 6:
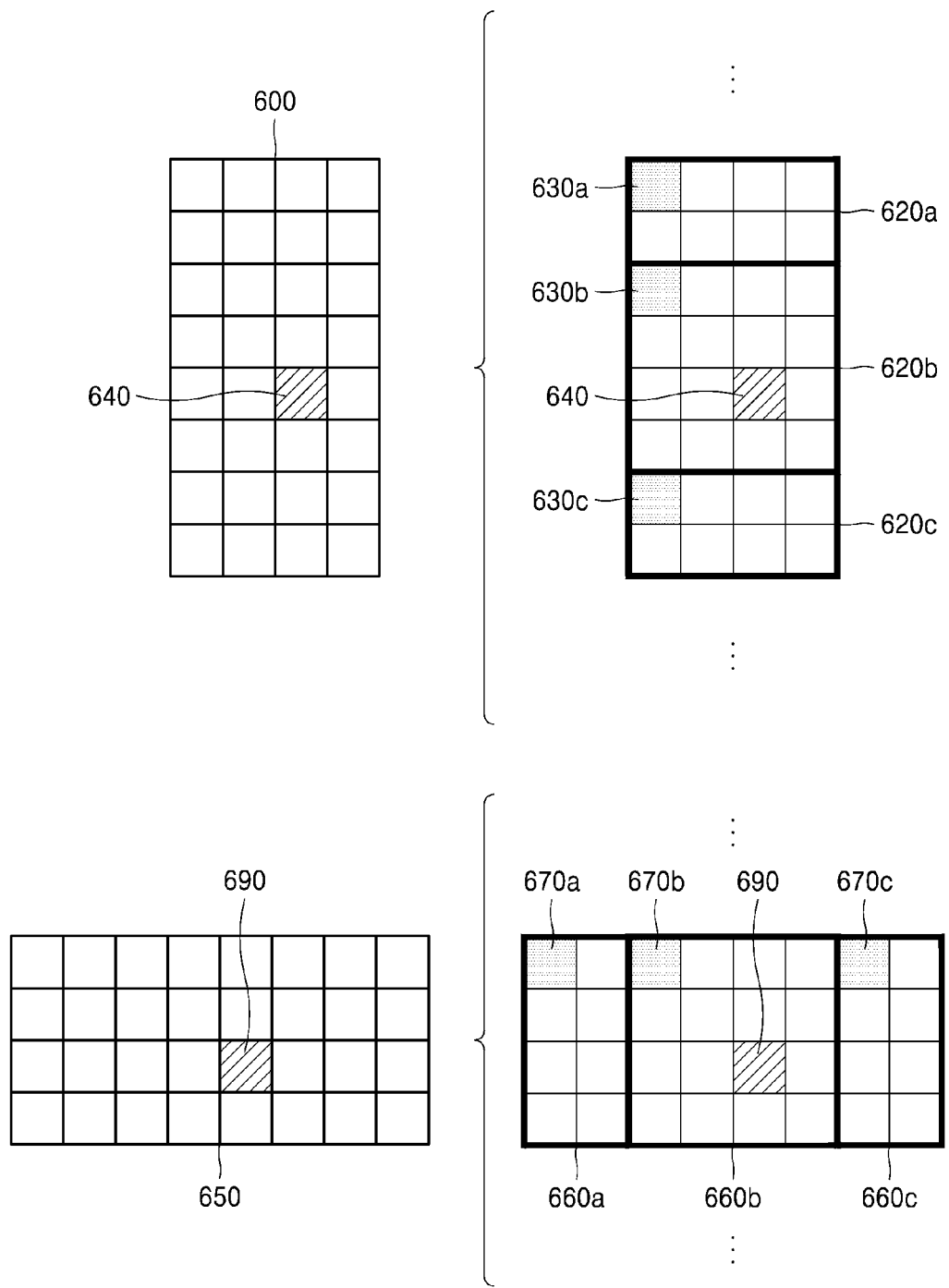
FIG. 6 illustrates a method, performed by the image decoding apparatus, of determining a predetermined coding unit from among an odd number of coding units, according to an embodiment.

FIG. 6 illustrates a method, performed by the image decoding apparatus 100, of determining a predetermined coding unit from among an odd number of coding units, according to an embodiment.

Referring to FIG. 6, at least one of block shape information and split shape mode information about a current coding unit 600 or 650 may be obtained from a sample of a predetermined location (e.g., a sample 640 or 690 of a center location) from among a plurality of samples included in the current coding unit 600 or 650. However, the predetermined location in the current coding unit 600, from which at least one of the block shape information and the split shape mode information may be obtained, is not limited to the center location in FIG. 6, and may include various locations included in the current coding unit 600 (e.g., top, bottom, left, right, upper-left, lower-left, upper-right, and lower-right locations). The image decoding apparatus 100 may obtain at least one of the block shape information and the split shape mode information from the predetermined location and may determine to split or not to split the current coding unit into various-shaped and various-sized coding units.

According to an embodiment, when the current coding unit is split into a predetermined number of coding units, the image decoding apparatus 100 may select one of the coding units. Various methods may be used to select one of a plurality of coding units, as will be described below in relation to various embodiments.

According to an embodiment, the image decoding apparatus 100 may split the current coding unit into a plurality of coding units, and may determine a coding unit at a predetermined location.

According to an embodiment, the image decoding apparatus 100 may use information indicating locations of the odd number of coding units, so as to determine a coding unit at a center location from among the odd number of coding units. Referring to FIG. 6, the image decoding apparatus 100 may determine the odd number of coding units 620*a*, 620*b*, and 620*c* or the odd number of coding units 660*a*, 660*b*, and 660*c* by splitting the current coding unit 600 or the current coding unit 650. The image decoding apparatus 100 may determine the middle coding unit 620*b* or the middle coding unit 660*b* by using information about the locations of the odd number of coding units 620*a*, 620*b*, and 620*c* or the odd number of coding units 660*a*, 660*b*, and 660*c*. For example, the image decoding apparatus 100 may determine the coding unit 620*b* of the center location by determining the locations of the coding units 620*a*, 620*b*, and 620*c* based on information indicating locations of predetermined samples included in the coding units 620*a*, 620*b*, and 620*c*. In detail, the image decoding apparatus 100 may determine the coding unit 620*b* at the center location by determining the locations of the coding units 620*a*, 620*b*, and 620*c* based on information indicating locations of top-left samples 630*a*, 630*b*, and 630*c* of the coding units 620*a*, 620*b*, and 620*c*.

According to an embodiment, the information indicating the locations of the top-left samples 630*a*, 630*b*, and 630*c*, which are included in the coding units 620*a*, 620*b*, and 620*c*, respectively, may include information about locations or coordinates of the coding units 620*a*, 620*b*, and 620*c* in a picture. According to an embodiment, the information indicating the locations of the top-left samples 630*a*, 630*b*, and 630*c*, which are included in the coding units 620*a*, 620*b*, and 620*c*, respectively, may include information indicating widths or heights of the coding units 620*a*, 620*b*, and 620*c* included in the current coding unit 600, and the widths or heights may correspond to information indicating differences between the coordinates of the coding units 620*a*, 620*b*, and 620*c* in the picture. That is, the image decoding apparatus 100 may determine the coding unit 620*b* at the center location by directly using the information about the locations or coordinates of the coding units 620*a*, 620*b*, and 620*c* in the picture, or by using the information about the widths or heights of the coding units, which correspond to the difference values between the coordinates.

According to an embodiment, information indicating the location of the top-left sample 630*a* of the upper coding unit 620*a* may include coordinates (xa, ya), information indicating the location of the top-left sample 630*b* of the middle coding unit 620*b* may include coordinates (xb, yb), and information indicating the location of the top-left sample 630*c* of the lower coding unit 620*c* may include coordinates (xc, yc). The image decoding apparatus 100 may determine the middle coding unit 620*b* by using the coordinates of the top-left samples 630*a*, 630*b*, and 630*c* which are included in the coding units 620*a*, 620*b*, and 620*c*, respectively. For example, when the coordinates of the top-left samples 630*a*, 630*b*, and 630*c* are sorted in an ascending or descending order, the coding unit 620*b* including the coordinates (xb, yb) of the sample 630*b* at a center location may be determined as a coding unit at a center location from among the coding units 620*a*, 620*b*, and 620*c* determined by splitting the current coding unit 600. However, the coordinates indicating the locations of the top-left samples 630*a*, 630*b*, and 630*c* may include coordinates indicating absolute locations in the picture, or may use coordinates (dxb, dyb) indicating a relative location of the top-left sample 630*b* of the middle coding unit 620*b* and coordinates (dxc, dyc) indicating a relative location of the top-left sample 630*c* of the lower coding unit 620*c* with reference to the location of the top-left sample 630*a* of the upper coding unit 620*a*. A method of determining a coding unit at a predetermined location by using coordinates of a sample included in the coding unit, as information indicating a location of the sample, is not limited to the aforementioned method, and may include various arithmetic methods capable of using the coordinates of the sample.

According to an embodiment, the image decoding apparatus 100 may split the current coding unit 600 into a plurality of coding units 620*a*, 620*b*, and 620*c*, and may select one of the coding units 620*a*, 620*b*, and 620*c* based on a predetermined criterion. For example, the image decoding apparatus 100 may select the coding unit 620*b*, which has a size different from that of the others, from among the coding units 620*a*, 620*b*, and 620*c*.

According to an embodiment, the image decoding apparatus 100 may determine the width or height of each of the coding units 620*a*, 620*b*, and 620*c* by using the coordinates (xa, ya) that is the information indicating the location of the top-left sample 630*a* of the upper coding unit 620*a*, the coordinates (xb, yb) that is the information indicating the location of the top-left sample 630*b* of the middle coding unit 620*b*, and the coordinates (xc, yc) that is the information indicating the location of the top-left sample 630*c* of the lower coding unit 620*c*. The image decoding apparatus 100 may determine the respective sizes of the coding units 620*a*, 620*b*, and 620*c* by using the coordinates (xa, ya), (xb, yb), and (xc, yc) indicating the locations of the coding units 620*a*, 620*b*, and 620*c*. According to an embodiment, the image decoding apparatus 100 may determine the width of the upper coding unit 620*a* to be the width of the current coding unit 600. The image decoding apparatus 100 may determine the height of the upper coding unit 620*a* to be yb-ya. According to an embodiment, the image decoding apparatus 100 may determine the width of the middle coding unit 620*b* to be the width of the current coding unit 600. The image decoding apparatus 100 may determine the height of the middle coding unit 620*b* to be yc-yb. According to an embodiment, the image decoding apparatus 100 may determine the width or height of the lower coding unit by using the width or height of the current coding unit or the widths or heights of the upper and middle coding units 620*a* and 620*b*. The image decoding apparatus 100 may determine a coding unit, which has a size different from that of the others, based on the determined widths and heights of the coding units 620*a*, 620*b*, and 620*c*. Referring to FIG. 6, the image decoding apparatus 100 may determine the middle coding unit 620*b*, which has a size different from the size of the upper and lower coding units 620*a* and 620*c*, as the coding unit of the predetermined location. However, the aforementioned method, performed by the image decoding apparatus 100, of determining a coding unit having a size different from the size of the other coding units merely corresponds to an example of determining a coding unit at a predetermined location by using the sizes of coding units, which are determined based on coordinates of samples, and thus various methods of determining a coding unit at a predetermined location by comparing the sizes of coding units, which are determined based on coordinates of predetermined samples, may be used.

The image decoding apparatus 100 may determine the width or height of each of the coding units 660*a*, 660*b*, and 660*c* by using the coordinates (xd, yd) that is information indicating the location of a top-left sample 670*a* of the left coding unit 660*a*, the coordinates (xe, ye) that is information indicating the location of a top-left sample 670*b* of the middle coding unit 660*b*, and the coordinates (xf, yf) that is information indicating a location of the top-left sample 670*c* of the right coding unit 660*c*. The image decoding apparatus 100 may determine the respective sizes of the coding units 660*a*, 660*b*, and 660*c* by using the coordinates (xd, yd), (xe, ye), and (xf, yf) indicating the locations of the coding units 660*a*, 660*b*, and 660*c*.

According to an embodiment, the image decoding apparatus 100 may determine the width of the left coding unit 660*a* to be xe-xd. The image decoding apparatus 100 may determine the height of the left coding unit 660*a* to be the height of the current coding unit 650. According to an embodiment, the image decoding apparatus 100 may determine the width of the middle coding unit 660*b* to be xf-xe. The image decoding apparatus 100 may determine the height of the middle coding unit 660*b* to be the height of the current coding unit 650. According to an embodiment, the image decoding apparatus 100 may determine the width or height of the right coding unit 660*c* by using the width or height of the current coding unit 650 or the widths or heights of the left and middle coding units 660*a* and 660*b*. The image decoding apparatus 100 may determine a coding unit, which has a size different from that of the others, based on the determined widths and heights of the coding units 660*a*, 660*b*, and 660*c*. Referring to FIG. 6, the image decoding apparatus 100 may determine the middle coding unit 660*b*, which has a size different from the sizes of the left and right coding units 660*a* and 660*c*, as the coding unit of the predetermined location. However, the aforementioned method, performed by the image decoding apparatus 100, of determining a coding unit having a size different from the size of the other coding units merely corresponds to an example of determining a coding unit at a predetermined location by using the sizes of coding units, which are determined based on coordinates of samples, and thus various methods of determining a coding unit at a predetermined location by comparing the sizes of coding units, which are determined based on coordinates of predetermined samples, may be used.

However, locations of samples considered to determine locations of coding units are not limited to the aforementioned top-left locations, and information about arbitrary locations of samples included in the coding units may be used.

According to an embodiment, the image decoding apparatus 100 may select a coding unit at a predetermined location from among an odd number of coding units determined by splitting the current coding unit, in consideration of the shape of the current coding unit. For example, when the current coding unit has a non-square shape, a width of which is longer than its height, the image decoding apparatus 100 may determine the coding unit at the predetermined location in a horizontal direction. That is, the image decoding apparatus 100 may determine one of coding units at different locations in a horizontal direction and may put a restriction on the coding unit. When the current coding unit has a non-square shape, a height of which is longer than its width, the image decoding apparatus 100 may determine the coding unit at the predetermined location in a vertical direction. That is, the image decoding apparatus 100 may determine one of coding units at different locations in a vertical direction and may put a restriction on the coding unit.

According to an embodiment, the image decoding apparatus 100 may use information indicating respective locations of an even number of coding units, so as to determine the coding unit at the predetermined location from among the even number of coding units. The image decoding apparatus 100 may determine an even number of coding units by splitting (bi split; binary split) the current coding unit, and may determine the coding unit at the predetermined location by using the information about the locations of the even number of coding units. An operation related thereto may correspond to the operation of determining a coding unit at a predetermined location (e.g., a center location) from among an odd number of coding units, which is described in detail above with reference to FIG. 6, and thus detailed descriptions thereof are not provided here.

According to an embodiment, when a non-square current coding unit is split into a plurality of coding units, predetermined information about a coding unit at a predetermined location may be used in a splitting process to determine the coding unit at the predetermined location from among the plurality of coding units. For example, the image decoding apparatus 100 may use at least one of block shape information and split shape mode information, which is stored in a sample included in a middle coding unit, in a splitting process to determine a coding unit at a center location from among the plurality of coding units determined by splitting the current coding unit.

Referring to FIG. 6, the image decoding apparatus 100 may split the current coding unit 600 into the plurality of coding units 620a, 620b, and 620c based on at least one of the block shape information and the split shape mode information, and may determine the coding unit 620b at a center location from among the plurality of the coding units 620a, 620b, and 620c. Furthermore, the image decoding apparatus 100 may determine the coding unit 620b at the center location, in consideration of a location from which based on at least one of the block shape information and the split shape mode information is obtained. That is, at least one of block shape information and split shape mode information about the current coding unit 600 may be obtained from the sample 640 at a center location of the current coding unit 600 and, when the current coding unit 600 is split into the plurality of coding units 620a, 620b, and 620c based on at least one of the block shape information and the split shape mode information, the coding unit 620b including the sample 640 may be determined as the coding unit at the center location. However, information used to determine the coding unit at the center location is not limited to at least one of block shape information and split shape mode information, and various types of information may be used to determine the coding unit at the center location.

According to an embodiment, predetermined information for identifying the coding unit at the predetermined location may be obtained from a predetermined sample included in a coding unit to be determined. Referring to FIG. 6, the image decoding apparatus 100 may use at least one of the block shape information and the split shape mode information, which is obtained from a sample at a predetermined location in the current coding unit 600 (e.g., a sample at a center location of the current coding unit 600), to determine a coding unit at a predetermined location from among the plurality of the coding units 620a, 620b, and 620c determined by splitting the current coding unit 600 (e.g., a coding unit at a center location from among a plurality of split coding units). That is, the image decoding apparatus 100 may determine the sample at the predetermined location by considering a block shape of the current coding unit 600, may determine the coding unit 620b including a sample, from which predetermined information (e.g., at least one of the block shape information and the split shape mode information) is obtainable, from among the plurality of coding units 620a, 620b, and 620c determined by splitting the current coding unit 600, and may put a predetermined restriction on the coding unit 620b. Referring to FIG. 6, according to an embodiment, the image decoding apparatus 100 may determine the sample 640 at the center location of the current coding unit 600 as the sample from which the predetermined information is obtainable, and may put a predetermined restriction on the coding unit 620b including the sample 640, in a decoding operation. However, the location of the sample from which the predetermined information is obtainable is not limited to the aforementioned location, and may include arbitrary locations of samples included in the coding unit 620b to be determined for a restriction.

According to an embodiment, the location of the sample from which the predetermined information is obtainable may be determined based on the shape of the current coding unit 600. According to an embodiment, the block shape information may indicate whether the current coding unit has a square or non-square shape, and the location of the sample from which the predetermined information is obtainable may be determined based on the shape. For example, the image decoding apparatus 100 may determine a sample located on a boundary for splitting at least one of a width and height of the current coding unit in half, as the sample from which the predetermined information is obtainable, by using at least one of information about the width of the current coding unit and information about the height of the current coding unit. As another example, when the block shape information of the current coding unit indicates a non-square shape, the image decoding apparatus 100 may determine one of samples adjacent to a boundary for splitting a long side of the current coding unit in half, as the sample from which the predetermined information is obtainable.

According to an embodiment, when the current coding unit is split into a plurality of coding units, the image decoding apparatus 100 may use at least one of the block shape information and the split shape mode information so as to determine a coding unit at a predetermined location from among the plurality of coding units. According to an embodiment, the image decoding apparatus 100 may obtain at least one of the block shape information and the split shape mode information from a sample at a predetermined location in a coding unit, and may split the plurality of coding units, which are generated by splitting the current coding unit, by using at least one of the block shape information and the split shape mode information, which is obtained from the sample of the predetermined location in each of the plurality of coding units. That is, a coding unit may be recursively split based on at least one of the block shape information and the split shape mode information, which is obtained from the sample at the predetermined location in each coding unit. An operation of recursively splitting a coding unit is described above with reference to FIG. 5, and thus detailed descriptions thereof are not provided here.

According to an embodiment, the image decoding apparatus 100 may determine one or more coding units by splitting the current coding unit, and may determine an order of decoding the one or more coding units, based on a predetermined block (e.g., the current coding unit).

Figure 7:
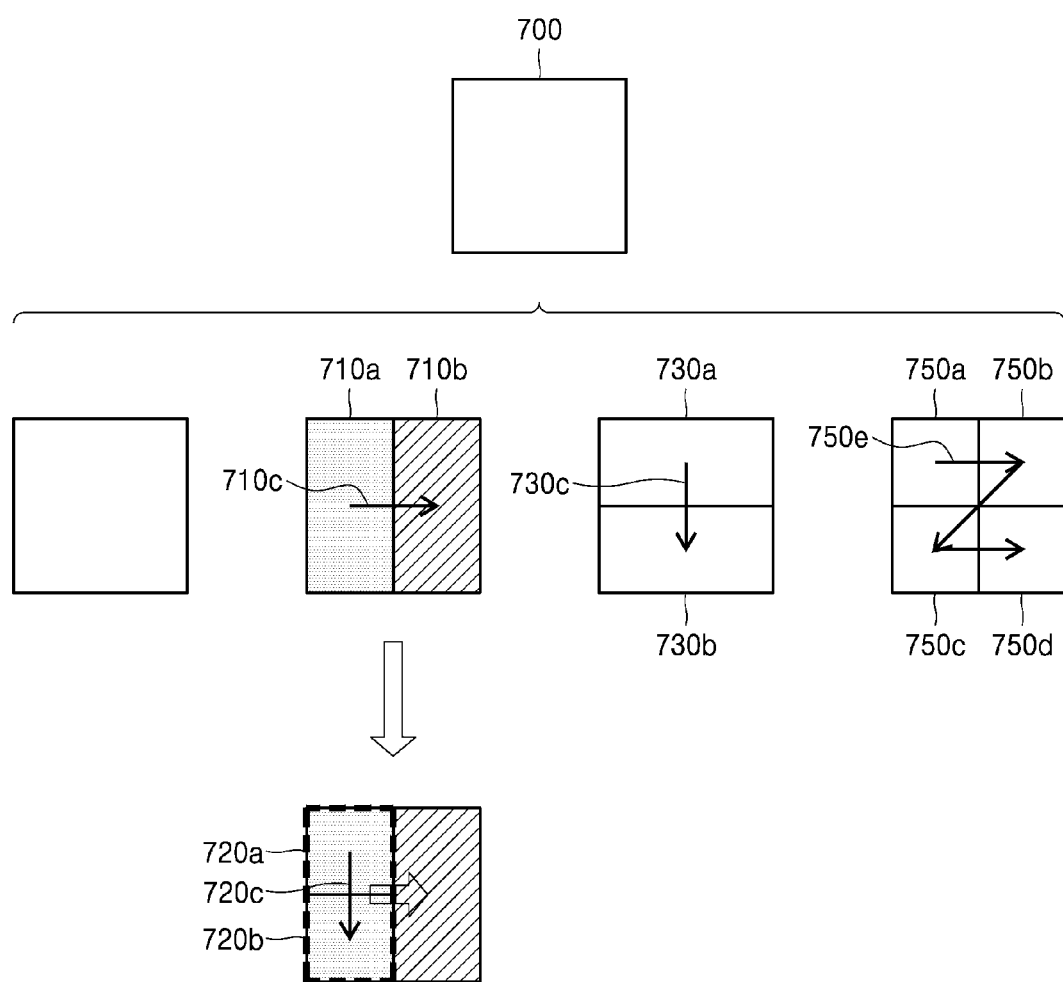
FIG. 7 illustrates an order of processing a plurality of coding units when the image decoding apparatus determines the plurality of coding units by splitting a current coding unit, according to an embodiment.

FIG. 7 illustrates an order of processing a plurality of coding units when the image decoding apparatus 100 determines the plurality of coding units by splitting a current coding unit, according to an embodiment.

According to an embodiment, the image decoding apparatus 100 may determine second coding units 710a and 710b by splitting a first coding unit 700 in a vertical direction, may determine second coding units 730a and 730b by splitting the first coding unit 700 in a horizontal direction, or may determine second coding units 750a, 750b, 750c, and 750d by splitting the first coding unit 700 in vertical and horizontal directions, based on at least one of block shape information and split shape mode information.

Referring to FIG. 7, the image decoding apparatus 100 may determine to process the second coding units 710a and 710b in a horizontal direction order 710c, the second coding units 710a and 710b being determined by splitting the first coding unit 700 in a vertical direction. The image decoding apparatus 100 may determine to process the second coding units 730a and 730b in a vertical direction order 730c, the second coding units 730a and 730b being determined by splitting the first coding unit 700 in a horizontal direction. The image decoding apparatus 100 may determine the second coding units 750a, 750b, 750c, and 750d, which are determined by splitting the first coding unit 700 in vertical and horizontal directions, according to a predetermined order (e.g., in a raster scan order or Z-scan order 750e) by which coding units in a row are processed and then coding units in a next row are processed.

According to an embodiment, the image decoding apparatus 100 may recursively split coding units. Referring to FIG. 7, the image decoding apparatus 100 may determine the plurality of coding units 710a and 710b, 730a and 730b, or 750a, 750b, 750c, and 750d by splitting the first coding unit 700, and may recursively split each of the determined plurality of coding units 710a and 710b, 730a and 730b, or 750a, 750b, 750c, and 750d. A splitting method of the plurality of coding units 710a and 710b, 730a and 730b, or 750a, 750b, 750c, and 750d may correspond to a splitting method of the first coding unit 700. Accordingly, each of the plurality of coding units 710a and 710b, 730a and 730b, or 750a, 750b, 750c, and 750d may be independently split into a plurality of coding units. Referring to FIG. 7, the image decoding apparatus 100 may determine the second coding units 710a and 710b by splitting the first coding unit 700 in a vertical direction, and may determine to independently split each of the second coding units 710a and 710b or to not split the second coding units 710a and 710b.

According to an embodiment, the image decoding apparatus 100 may determine third coding units 720a and 720b by splitting the left second coding unit 710a in a horizontal direction, and may not split the right second coding unit 710b.

According to an embodiment, a processing order of coding units may be determined based on an operation of splitting a coding unit. In other words, a processing order of split coding units may be determined based on a processing order of coding units immediately before being split. The image decoding apparatus 100 may determine a processing order of the third coding units 720a and 720b determined by splitting the left second coding unit 710a, independently of the right second coding unit 710b. Because the third coding units 720a and 720b are determined by splitting the left second coding unit 710a in a horizontal direction, the third coding units 720a and 720b may be processed in a vertical direction order 720c. Because the left and right second coding units 710a and 710b are processed in the horizontal direction order 710c, the right second coding unit 710b may be processed after the third coding units 720a and 720b included in the left second coding unit 710a are processed in the vertical direction order 720c. It should be construed that an operation of determining a processing order of coding units based on a coding unit before being split is not limited to the aforementioned example, and various methods may be used to independently process coding units, which are split and determined to various shapes, in a predetermined order.

Figure 8:
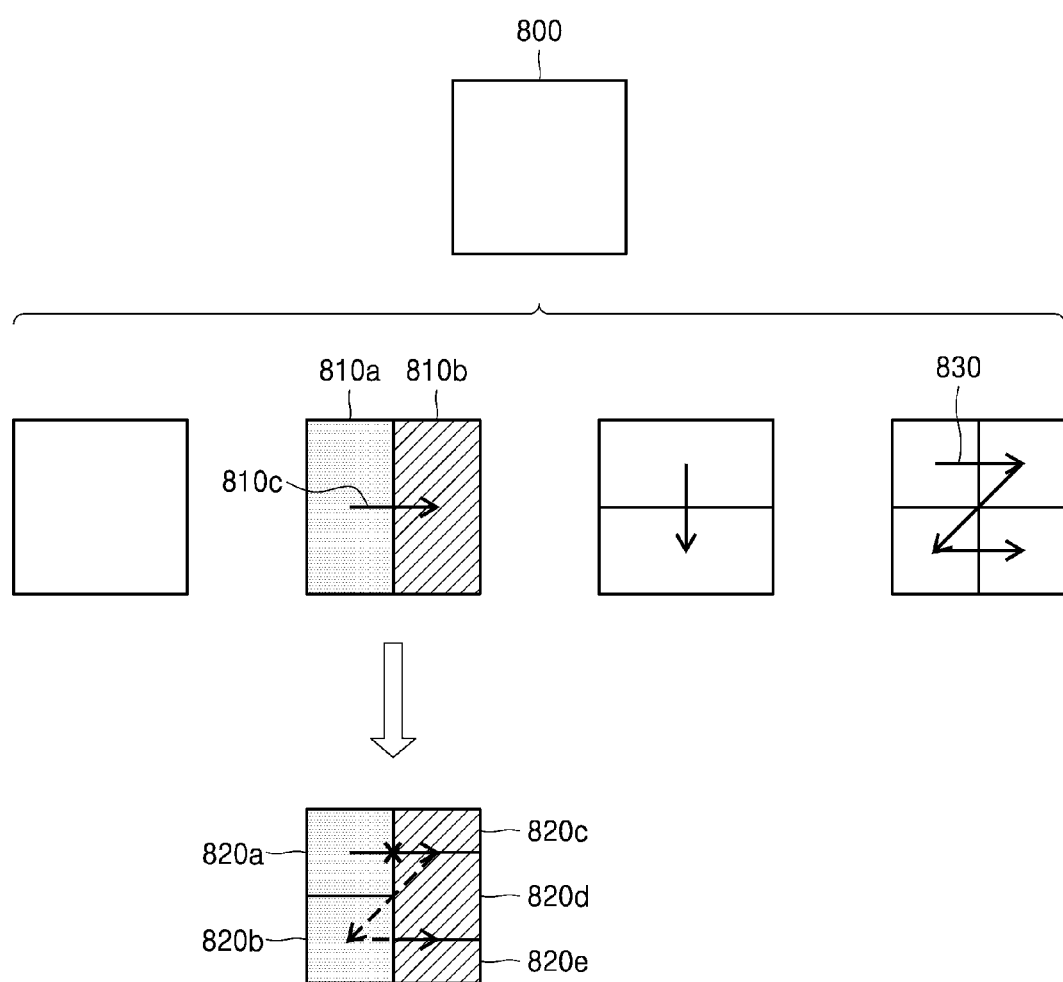
FIG. 8 illustrates a process, performed by the image decoding apparatus, of determining that a current coding unit is to be split into an odd number of coding units, when the coding units are not processable in a predetermined order, according to an embodiment.

FIG. 8 illustrates a process, performed by the image decoding apparatus 100, of determining that a current coding unit is to be split into an odd number of coding units, when the coding units are not processable in a predetermined order, according to an embodiment.

According to an embodiment, the image decoding apparatus 100 may determine that the current coding unit is to be split into an odd number of coding units, based on obtained block shape information and split shape mode information. Referring to FIG. 8, a square first coding unit 800 may be split into non-square second coding units 810a and 810b, and the second coding units 810a and 810b may be independently split into third coding units 820a and 820b, and 820c, 820d, and 820e. According to an embodiment, the image decoding apparatus 100 may determine the plurality of third coding units 820a and 820b by splitting the left second coding unit 810a in a horizontal direction, and may split the right second coding unit 810b into the odd number of third coding units 820c, 820d, and 820e.

According to an embodiment, the image decoding apparatus 100 may determine whether there are an odd number of split coding units, by determining whether the third coding units 820a and 820b, and 820c, 820d, and 820e are processable in a predetermined order. Referring to FIG. 8, the image decoding apparatus 100 may determine the third coding units 820a and 820b, and 820c, 820d, and 820e by recursively splitting the first coding unit 800. The image decoding apparatus 100 may determine whether any of the first coding unit 800, the second coding units 810a and 810b, or the third coding units 820a and 820b, and 820c, 820d, and 820e is to be split into an odd number of coding units, based on at least one of the block shape information and the split shape mode information. For example, the second coding unit 810b located in the right from among the second coding units 810a and 810b may be split into an odd number of third coding units 820c, 820d, and 820e. A processing order of a plurality of coding units included in the first coding unit 800 may be a predetermined order (e.g., a Z-scan order 830), and the image decoding apparatus 100 may determine whether the third coding units 820c, 820d, and 820e, which are determined by splitting the right second coding unit 810b into an odd number of coding units, satisfy a condition for processing in the predetermined order.

According to an embodiment, the image decoding apparatus 100 may determine whether the third coding units 820a and 820b, and 820c, 820d, and 820e included in the first coding unit 800 satisfy the condition for processing in the predetermined order, and the condition relates to whether at least one of a width and height of the second coding units 810a and 810b is to be split in half along a boundary of the third coding units 820a and 820b, and 820c, 820d, and 820e. For example, the third coding units 820a and 820b determined when the height of the left second coding unit 810a of the non-square shape is split in half may satisfy the condition. It may be determined that the third coding units 820c, 820d, and 820e do not satisfy the condition because the boundaries of the third coding units 820c, 820d, and 820e determined when the right second coding unit 810b is split into three coding units are unable to split the width or height of the right second coding unit 810b in half. When the condition is not satisfied as described above, the image decoding apparatus 100 may determine disconnection of a scan order, and may determine that the right second coding unit 810b is to be split into an odd number of coding units, based on a result of the determination. According to an embodiment, when a coding unit is split into an odd number of coding units, the image decoding apparatus 100 may put a predetermined restriction on a coding unit at a predetermined location from among the split coding units. The restriction or the predetermined location is described above in relation to various embodiments, and thus detailed descriptions thereof are not provided herein.

Figure 9:
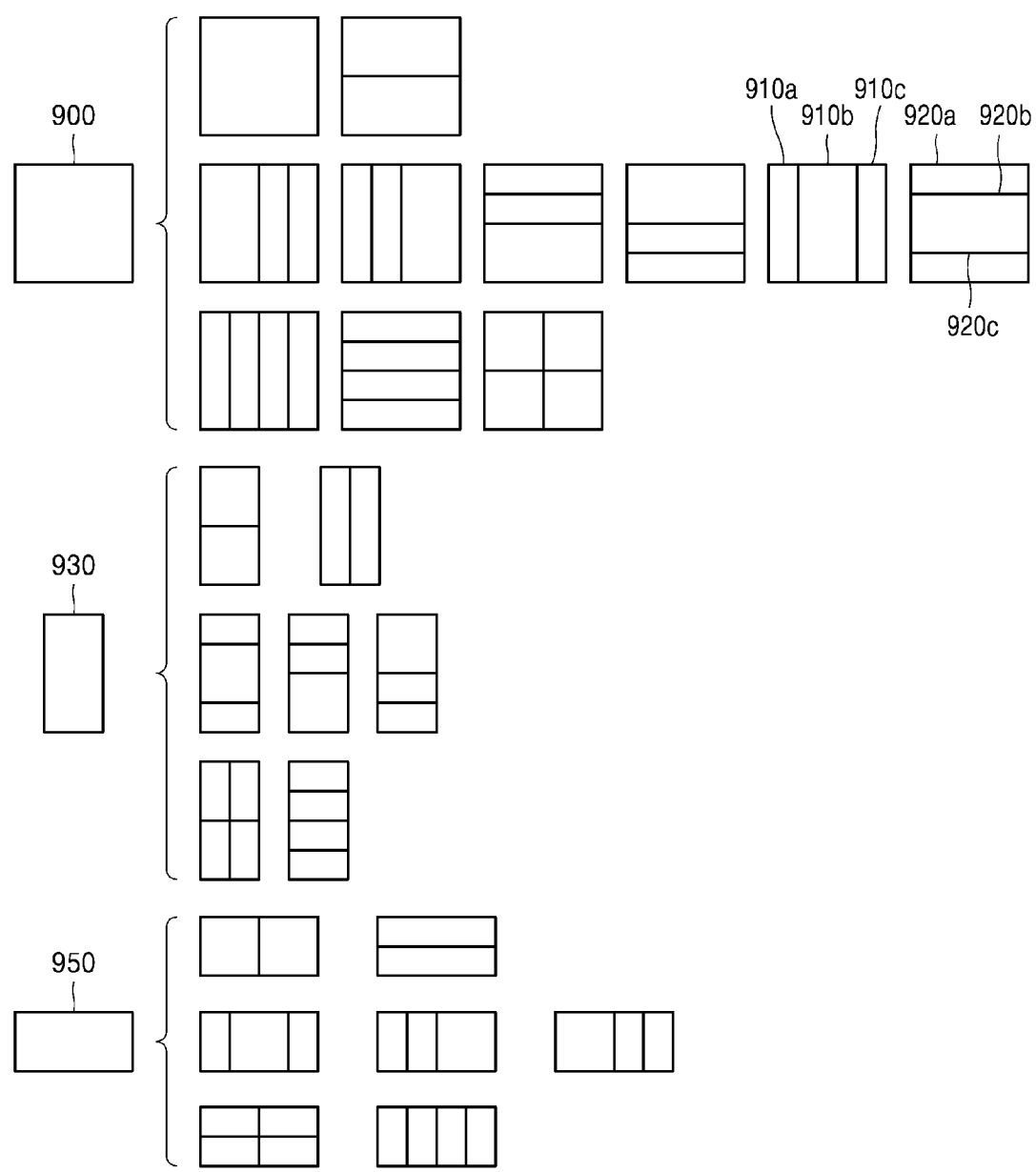
FIG. 9 illustrates a process, performed by the image decoding apparatus, of determining at least one coding unit by splitting a first coding unit, according to an embodiment.

FIG. 9 illustrates a process, performed by the image decoding apparatus 100, of determining at least one coding unit by splitting a first coding unit 900, according to an embodiment.

According to an embodiment, the image decoding apparatus 100 may split the first coding unit 900, based on at least one of block shape information and split shape mode information that is obtained through a receiver (not shown). The square first coding unit 900 may be split into four square coding units, or may be split into a plurality of non-square coding units. For example, referring to FIG. 9, when the block shape information indicates that the first coding unit 900 is a square and the split shape mode information indicates to split the first coding unit 900 into non-square coding units, the image decoding apparatus 100 may split the first coding unit 900 into a plurality of non-square coding units. In detail, when the split shape mode information indicates to determine an odd number of coding units by splitting the first coding unit 900 in a horizontal direction or a vertical direction, the image decoding apparatus 100 may split the square first coding unit 900 into an odd number of coding units, e.g., second coding units 910a, 910b, and 910c determined by splitting the square first coding unit 900 in a vertical direction or second coding units 920a, 920b, and 920c determined by splitting the square first coding unit 900 in a horizontal direction.

According to an embodiment, the image decoding apparatus 100 may determine whether the second coding units 910a, 910b, 910c, 920a, 920b, and 920c included in the first coding unit 900 satisfy a condition for processing in a predetermined order, and the condition relates to whether at least one of a width and height of the first coding unit 900 is to be split in half along boundaries of the second coding units 910a, 910b, 910c, 920a, 920b, and 920c. Referring to FIG. 9, because boundaries of the second coding units 910a, 910b, and 910c determined by splitting the square first coding unit 900 in a vertical direction do not split the width of the first coding unit 900 in half, it may be determined that the first coding unit 900 does not satisfy the condition for processing in the predetermined order. In addition, because boundaries of the second coding units 920a, 920b, and 920c determined by splitting the square first coding unit 900 in a horizontal direction do not split the height of the first coding unit 900 in half, it may be determined that the first coding unit 900 does not satisfy the condition for processing in the predetermined order. When the condition is not satisfied as described above, the image decoding apparatus 100 may determine disconnection of a scan order, and may determine that the first coding unit 900 is to be split into an odd number of coding units, based on a result of the determination. According to an embodiment, when a coding unit is split into an odd number of coding units, the image decoding apparatus 100 may put a predetermined restriction on a coding unit at a predetermined location from among the split coding units. The restriction or the predetermined location is described above in relation to various embodiments, and thus detailed descriptions thereof are not provided herein.

According to an embodiment, the image decoding apparatus 100 may determine various-shaped coding units by splitting a first coding unit.

Referring to FIG. 9, the image decoding apparatus 100 may split the square first coding unit 900 or a non-square first coding unit 930 or 950 into various-shaped coding units.

FIG. 10 illustrates that a shape into which a second coding unit is splittable is restricted when the second coding unit having a non-square shape, which is determined as the image decoding apparatus 100 splits a first coding unit 1000, satisfies a predetermined condition, according to an embodiment.

According to an embodiment, the image decoding apparatus 100 may determine to split the square first coding unit 1000 into non-square second coding units 1010a and 1010b or 1020a and 1020b, based on at least one of block shape information and split shape mode information which is obtained by the receiver (not shown). The second coding units 1010a and 1010b or 1020a and 1020b may be independently split. Accordingly, the image decoding apparatus 100 may determine to split or not to split each of the second coding units 1010a and 1010b or 1020a and 1020b into a plurality of coding units, based on at least one of block shape information and split shape mode information about each of the second coding units 1010a and 1010b or 1020a and 1020b. According to an embodiment, the image decoding apparatus 100 may determine third coding units 1012a and 1012b by splitting the non-square left second coding unit 1010a, which is determined by splitting the first coding unit 1000 in a vertical direction, in a horizontal direction. However, when the left second coding unit 1010a is split in a horizontal direction, the image decoding apparatus 100 may restrict the right second coding unit 1010b to not be split in a horizontal direction in which the left second coding unit 1010a is split. When third coding units 1014a and 1014b are determined by splitting the right second coding unit 1010b in a same direction, because the left second coding unit 1010a and the right second coding unit 1010b are independently split in a horizontal direction, the third coding units 1012a and 1012b or 1014a and 1014b may be determined. However, this case serves equally as a case in which the image decoding apparatus 100 splits the first coding unit 1000 into four square second coding units 1030a, 1030b, 1030c, and 1030d, based on at least one of the block shape information and the split shape mode information, and may be inefficient in terms of image decoding.

According to an embodiment, the image decoding apparatus 100 may determine third coding units 1022a and 1022b or 1024a and 1024b by splitting the non-square second coding unit 1020a or 1020b, which is determined by splitting the first coding unit 1000 in a horizontal direction, in a vertical direction. However, when a second coding unit (e.g., the upper second coding unit 1020a) is split in a vertical direction, for the aforementioned reason, the image decoding apparatus 100 may restrict the other second coding unit (e.g., the lower second coding unit 1020b) to not be split in a vertical direction in which the upper second coding unit 1020a is split.

Figure 11:
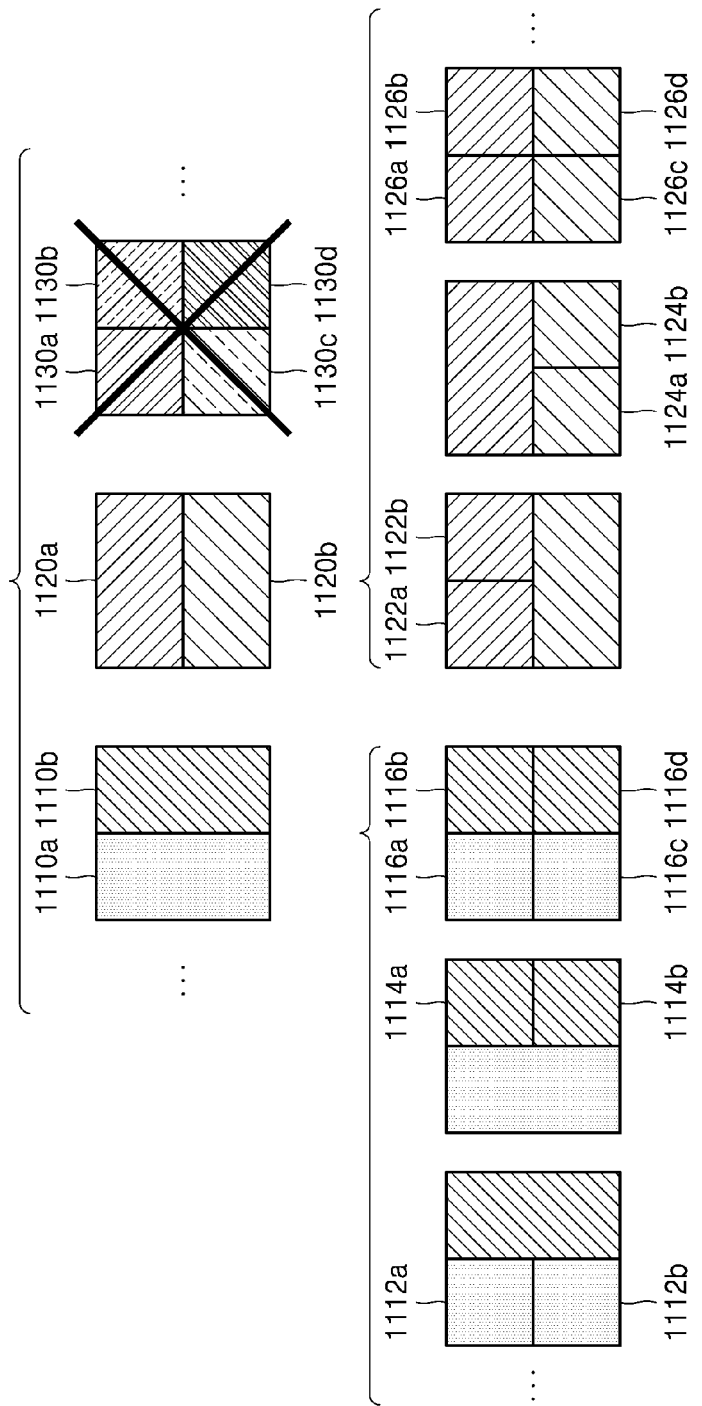
FIG. 11 illustrates a process, performed by the image decoding apparatus, of splitting a square coding unit when split shape mode information indicates that the square coding unit is to not be split into four square coding units, according to an embodiment.

FIG. 11 illustrates a process, performed by the image decoding apparatus 100, of splitting a square coding unit when split shape mode information indicates that the square coding unit is to not be split into four square coding units, according to an embodiment.

According to an embodiment, the image decoding apparatus 100 may determine second coding units 1110a and 1110b or 1120a and 1120b, etc. by splitting a first coding unit 1100, based on at least one of block shape information and split shape mode information. The split shape mode information may include information about various methods of splitting a coding unit, but the information about various splitting methods may not include information for splitting a coding unit into four square coding units. Based on the split shape mode information, the image decoding apparatus 100 does not split the square first coding unit 1100 into four square second coding units 1130a, 1130b, 1130c, and 1130d. The image decoding apparatus 100 may determine the non-square second coding units 1110a and 1110b or 1120a and 1120b, etc., based on the split shape mode information.

According to an embodiment, the image decoding apparatus 100 may independently split the non-square second coding units 1110a and 1110b or 1120a and 1120b, etc. Each of the second coding units 1110a and 1110b or 1120a and 1120b, etc. may be recursively split in a predetermined order, and this splitting method may correspond to a method of splitting the first coding unit 1100, based on at least one of the block shape information and the split shape mode information.

For example, the image decoding apparatus 100 may determine square third coding units 1112a and 1112b by splitting the left second coding unit 1110a in a horizontal direction, and may determine square third coding units 1114a and 1114b by splitting the right second coding unit 1110b in a horizontal direction. Furthermore, the image decoding apparatus 100 may determine square third coding units 1116a, 1116b, 1116c, and 1116d by splitting both the left second coding unit 1110a and the right second coding unit 1110b in a horizontal direction. In this case, coding units having the same shape as the four square second coding units 1130a, 1130b, 1130c, and 1130d split from the first coding unit 1100 may be determined.

As another example, the image decoding apparatus 100 may determine square third coding units 1122a and 1122b by splitting the upper second coding unit 1120a in a vertical direction, and may determine square third coding units 1124a and 1124b by splitting the lower second coding unit 1120b in a vertical direction. Furthermore, the image decoding apparatus 100 may determine square third coding units 1126a, 1126b, 1126c, and 1126d by splitting both the upper second coding unit 1120a and the lower second coding unit 1120b in a vertical direction. In this case, coding units having the same shape as the four square second coding units 1130a, 1130b, 1130c, and 1130d split from the first coding unit 1100 may be determined.

Figure 12:
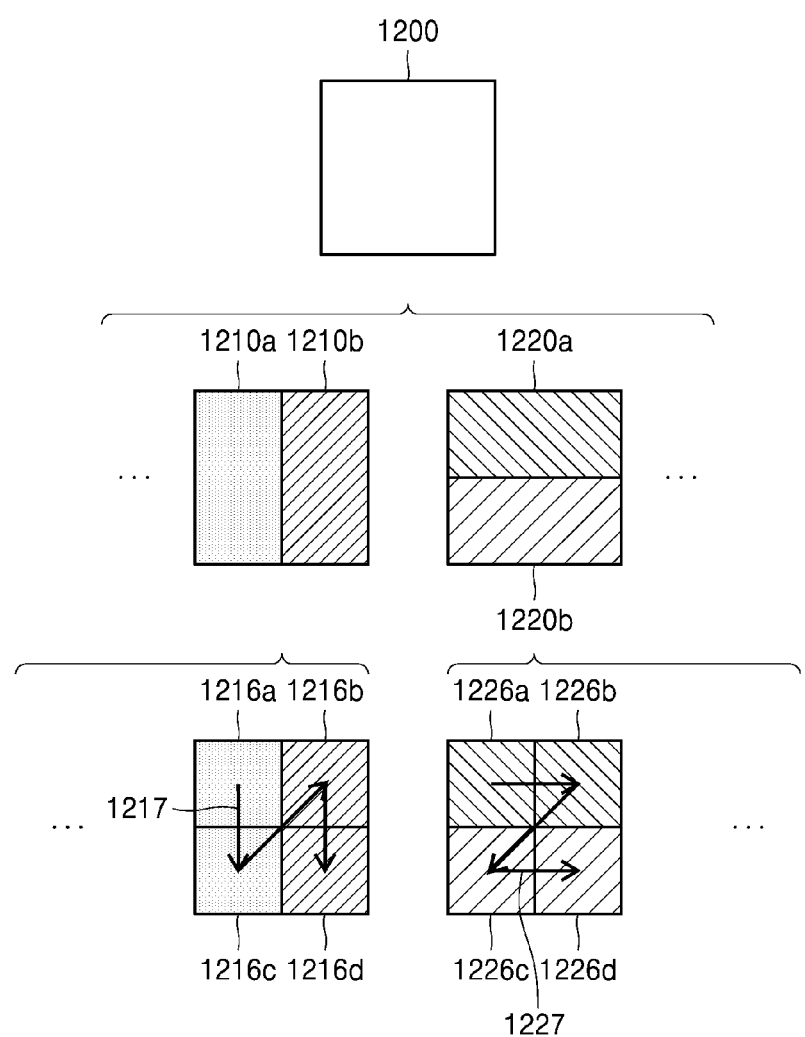
FIG. 12 illustrates that a processing order between a plurality of coding units may be changed depending on a process of splitting a coding unit, according to an embodiment.

FIG. 12 illustrates that a processing order between a plurality of coding units may be changed depending on a process of splitting a coding unit, according to an embodiment.

According to an embodiment, the image decoding apparatus 100 may split a first coding unit 1200, based on at least one of block shape information and split shape mode information. When the block shape information indicates a square shape and the split shape mode information indicates to split the first coding unit 1200 in at least one of horizontal and vertical directions, the image decoding apparatus 100 may determine second coding units 1210a and 1210b or 1220a and 1220b, etc. by splitting the first coding unit 1200. Referring to FIG. 12, the non-square second coding units 1210a and 1210b or 1220a and 1220b determined by splitting the first coding unit 1200 in only a horizontal direction or vertical direction may be independently split based on at least one of block shape information and split shape mode information about each coding unit. For example, the image decoding apparatus 100 may determine third coding units 1216a, 1216b, 1216c, and 1216d by splitting the second coding units 1210a and 1210b, which are generated by splitting the first coding unit 1200 in a vertical direction, in a horizontal direction, and may determine third coding units 1226a, 1226b, 1226c, and 1226d by splitting the second coding units 1220a and 1220b, which are generated by splitting the first coding unit 1200 in a horizontal direction, in a vertical direction. An operation of splitting the second coding units 1210a and 1210b or 1220a and 1220b is described above with reference to FIG. 11, and thus detailed descriptions thereof are not provided herein.

According to an embodiment, the image decoding apparatus 100 may process coding units in a predetermined order. An operation of processing coding units in a predetermined order is described above with reference to FIG. 7, and thus detailed descriptions thereof are not provided herein. Referring to FIG. 12, the image decoding apparatus 100 may determine four square third coding units 1216a, 1216b, 1216c, and 1216d, and 1226a, 1226b, 1226c, and 1226d by splitting the square first coding unit 1200. According to an embodiment, the image decoding apparatus 100 may determine processing orders of the third coding units 1216a, 1216b, 1216c, and 1216d, and 1226a, 1226b, 1226c, and 1226d, based on a split shape by which the first coding unit 1200 is split.

According to an embodiment, the image decoding apparatus 100 may determine the third coding units 1216a, 1216b, 1216c, and 1216d by splitting the second coding units 1210a and 1210b generated by splitting the first coding unit 1200 in a vertical direction, in a horizontal direction, and may process the third coding units 1216a, 1216b, 1216c, and 1216d in a processing order 1217 for initially processing the third coding units 1216a and 1216c, which are included in the left second coding unit 1210a, in a vertical direction and then processing the third coding unit 1216b and 1216d, which are included in the right second coding unit 1210b, in a vertical direction.

According to an embodiment, the image decoding apparatus 100 may determine the third coding units 1226a, 1226b, 1226c, and 1226d by splitting the second coding units 1220a and 1220b generated by splitting the first coding unit 1200 in a horizontal direction, in a vertical direction, and may process the third coding units 1226a, 1226b, 1226c, and 1226d in a processing order 1227 for initially processing the third coding units 1226a and 1226b, which are included in the upper second coding unit 1220a, in a horizontal direction and then processing the third coding unit 1226c and 1226d, which are included in the lower second coding unit 1220b, in a horizontal direction.

Referring to FIG. 12, the square third coding units 1216a, 1216b, 1216c, and 1216d, and 1226a, 1226b, 1226c, and 1226d may be determined by splitting the second coding units 1210a and 1210b, and 1220a and 1220b, respectively. Although the second coding units 1210a and 1210b are determined by splitting the first coding unit 1200 in a vertical direction differently from the second coding units 1220a and 1220b which are determined by splitting the first coding unit 1200 in a horizontal direction, the third coding units 1216a, 1216b, 1216c, and 1216d, and 1226a, 1226b, 1226c, and 1226d split therefrom eventually show same-shaped coding units split from the first coding unit 1200.

Accordingly, by recursively splitting a coding unit in different manners based on at least one of block shape information and split shape mode information, the image decoding apparatus 100 may process a plurality of coding units in different orders even when the coding units are eventually determined to have the same shape.

FIG. 13 illustrates a process of determining a depth of a coding unit as a shape and size of the coding unit change, when the coding unit is recursively split such that a plurality of coding units are determined, according to an embodiment.

According to an embodiment, the image decoding apparatus 100 may determine the depth of the coding unit, based on a predetermined criterion. For example, the predetermined criterion may be the length of a long side of the coding unit. When the length of a long side of a coding unit before being split is 2n times (n>0) the length of a long side of a split current coding unit, the image decoding apparatus 100 may determine that a depth of the current coding unit is increased from a depth of the coding unit before being split, by n. In the following descriptions, a coding unit having an increased depth is expressed as a coding unit of a deeper depth.

Referring to FIG. 13, according to an embodiment, the image decoding apparatus 100 may determine a second coding unit 1302 and a third coding unit 1304 of deeper depths by splitting a square first coding unit 1300 based on block shape information indicating a square shape (for example, the block shape information may be expressed as '0: SQUARE'). Assuming that the size of the square first coding unit 1300 is 2N×2N, the second coding unit 1302 determined by splitting a width and height of the first coding unit 1300 in ½ may have a size of N×N. Furthermore, the third coding unit 1304 determined by splitting a width and height of the second coding unit 1302 in ½ may have a size of N/2×N/2. In this case, a width and height of the third coding unit 1304 are ¼ times those of the first coding unit 1300. When a depth of the first coding unit 1300 is D, a depth of the second coding unit 1302, the width and height of which are ½ times those of the first coding unit 1300, may be D+1, and a depth of the third coding unit 1304, the width and height of which are ¼ times those of the first coding unit 1300, may be D+2.

According to an embodiment, the image decoding apparatus 100 may determine a second coding unit 1312 or 1322 and a third coding unit 1314 or 1324 of deeper depths by splitting a non-square first coding unit 1310 or 1320 based on block shape information indicating a non-square shape (for example, the block shape information may be expressed as '1: NS_VER' indicating a non-square shape, a height of which is longer than its width, or as '2: NS_HOR' indicating a non-square shape, a width of which is longer than a height).

The image decoding apparatus 100 may determine a second coding unit 1302, 1312, or 1322 by splitting at least one of a width and height of the first coding unit 1310 having a size of N×2N. That is, the image decoding apparatus 100 may determine the second coding unit 1302 having a size of N×N or the second coding unit 1322 having a size of N×N/2 by splitting the first coding unit 1310 in a horizontal direction, or may determine the second coding unit 1312 having a size of N/2×N by splitting the first coding unit 1310 in horizontal and vertical directions.

According to an embodiment, the image decoding apparatus 100 may determine the second coding unit 1302, 1312, or 1322 by splitting at least one of a width and a height of the first coding unit 1320 having a size of 2N×N. That is, the image decoding apparatus 100 may determine the second coding unit 1302 having a size of N×N or the second coding unit 1312 having a size of N/2×N by splitting the first coding unit 1320 in a vertical direction, or may determine the second coding unit 1322 having a size of N×N/2 by splitting the first coding unit 1320 in horizontal and vertical directions.

According to an embodiment, the image decoding apparatus 100 may determine a third coding unit 1304, 1314, or 1324 by splitting at least one of a width and a height of the second coding unit 1302 having a size of N×N. That is, the image decoding apparatus 100 may determine the third coding unit 1304 having a size of N/2×N/2, the third coding unit 1314 having a size of N/4×N/2, or the third coding unit 1324 having a size of N/2×N/4 by splitting the second coding unit 1302 in vertical and horizontal directions.

According to an embodiment, the image decoding apparatus 100 may determine the third coding unit 1304, 1314, or 1324 by splitting at least one of a width and a height of the second coding unit 1312 having a size of N/2×N. That is, the image decoding apparatus 100 may determine the third coding unit 1304 having a size of N/2×N/2 or the third coding unit 1324 having a size of N/2×N/4 by splitting the second coding unit 1312 in a horizontal direction, or may determine the third coding unit 1314 having a size of N/4×N/2 by splitting the second coding unit 1312 in vertical and horizontal directions.

According to an embodiment, the image decoding apparatus 100 may determine the third coding unit 1304, 1314, or 1324 by splitting at least one of a width and a height of the second coding unit 1322 having a size of N×N/2. That is, the image decoding apparatus 100 may determine the third coding unit 1304 having a size of N/2×N/2 or the third coding unit 1314 having a size of N/4×N/2 by splitting the second coding unit 1322 in a vertical direction, or may determine the third coding unit 1324 having a size of N/2×N/4 by splitting the second coding unit 1322 in vertical and horizontal directions.

According to an embodiment, the image decoding apparatus 100 may split the square coding unit 1300, 1302, or 1304 in a horizontal or vertical direction. For example, the image decoding apparatus 100 may determine the first coding unit 1310 having a size of N×2N by splitting the first coding unit 1300 having a size of 2N×2N in a vertical direction, or may determine the first coding unit 1320 having a size of 2N×N by splitting the first coding unit 1300 in a horizontal direction. According to an embodiment, when a depth is determined based on the length of the longest side of a coding unit, a depth of a coding unit determined by splitting the first coding unit 1300 having a size of 2N×2N in a horizontal or vertical direction may be the same as the depth of the first coding unit 1300.

According to an embodiment, a width and height of the third coding unit 1314 or 1324 may be ¼ times those of the first coding unit 1310 or 1320. When a depth of the first coding unit 1310 or 1320 is D, a depth of the second coding unit 1312 or 1322, the width and height of which are ½ times those of the first coding unit 1310 or 1320, may be D+1, and a depth of the third coding unit 1314 or 1324, the width and height of which are ¼ times those of the first coding unit 1310 or 1320, may be D+2.

Figure 14:
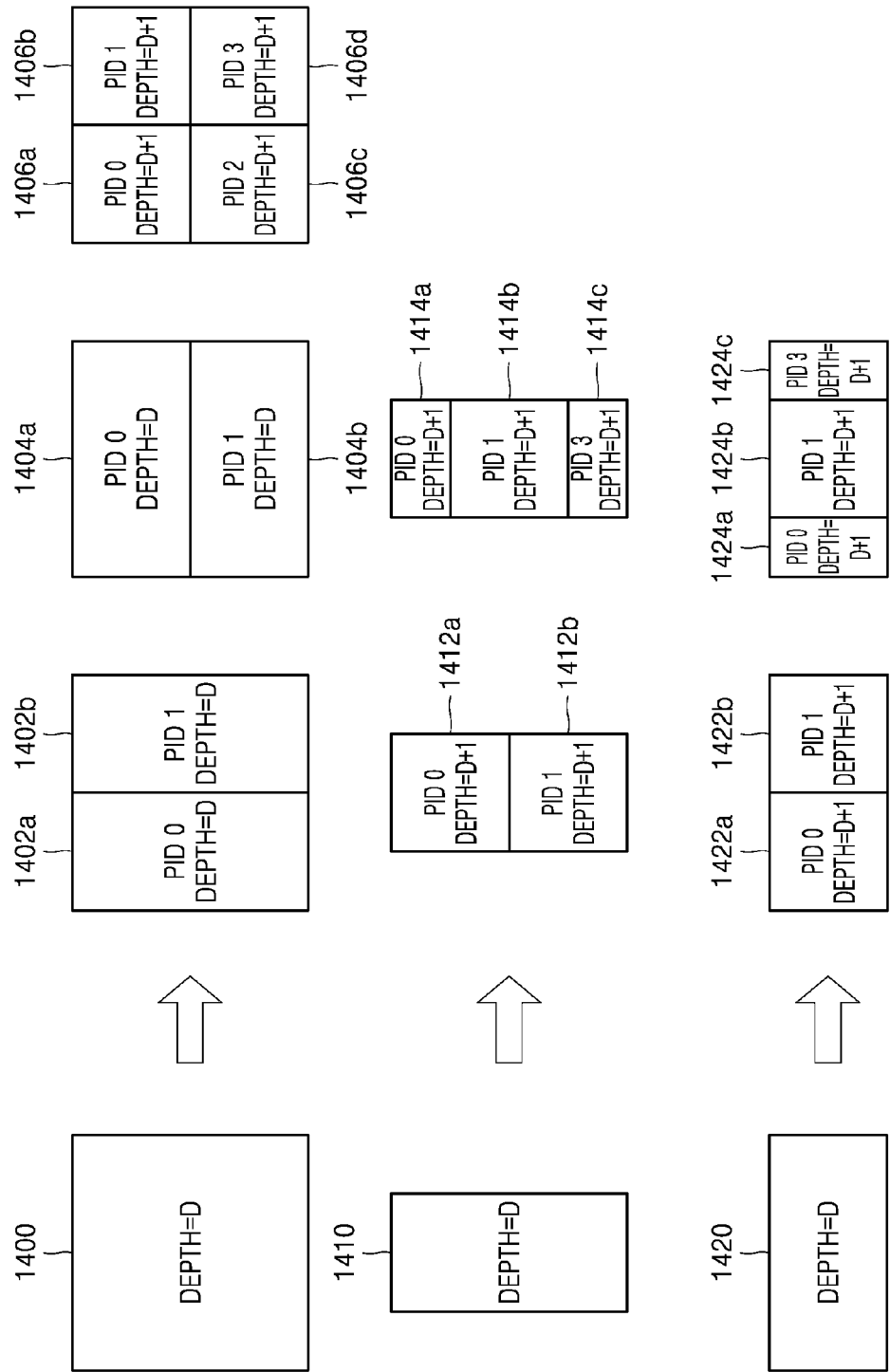
FIG. 14 illustrates depths that are determinable based on shapes and sizes of coding units, and part indexes (PIDs) that are for distinguishing the coding units, according to an embodiment.

FIG. 14 illustrates depths that are determinable based on shapes and sizes of coding units, and part indexes (PIDs) that are for distinguishing the coding units, according to an embodiment.

According to an embodiment, the image decoding apparatus 100 may determine various-shape second coding units by splitting a square first coding unit 1400. Referring to FIG.

14, the image decoding apparatus 100 may determine second coding units 1402a and 1402b, 1404a and 1404b, and 1406a, 1406b, 1406c, and 1406d by splitting the first coding unit 1400 in at least one of vertical and horizontal directions based on split shape mode information. That is, the image decoding apparatus 100 may determine the second coding units 1402a and 1402b, 1404a and 1404b, and 1406a, 1406b, 1406c, and 1406d, based on the split shape mode information of the first coding unit 1400.

According to an embodiment, depths of the second coding units 1402a and 1402b, 1404a and 1404b, and 1406a, 1406b, 1406c, and 1406d that are determined based on the split shape mode information of the square first coding unit 1400 may be determined based on the length of a long side thereof. For example, because the length of a side of the square first coding unit 1400 equals the length of a long side of the non-square second coding units 1402a and 1402b, and 1404a and 1404b, the first coding unit 1400 and the non-square second coding units 1402a and 1402b, and 1404a and 1404b may have the same depth, e.g., D. However, when the image decoding apparatus 100 splits the first coding unit 1400 into the four square second coding units 1406a, 1406b, 1406c, and 1406d based on the split shape mode information, because the length of a side of the square second coding units 1406a, 1406b, 1406c, and 1406d is ½ times the length of a side of the first coding unit 1400, a depth of the second coding units 1406a, 1406b, 1406c, and 1406d may be D+1 which is deeper than the depth D of the first coding unit 1400 by 1.

According to an embodiment, the image decoding apparatus 100 may determine a plurality of second coding units 1412a and 1412b, and 1414a, 1414b, and 1414c by splitting a first coding unit 1410, a height of which is longer than its width, in a horizontal direction based on the split shape mode information. According to an embodiment, the image decoding apparatus 100 may determine a plurality of second coding units 1422a and 1422b, and 1424a, 1424b, and 1424c by splitting a first coding unit 1420, a width of which is longer than its height, in a vertical direction based on the split shape mode information.

According to an embodiment, a depth of the second coding units 1412a and 1412b, and 1414a, 1414b, and 1414c, or 1422a and 1422b, and 1424a, 1424b, and 1424c, which are determined based on the split shape mode information of the non-square first coding unit 1410 or 1420, may be determined based on the length of a long side thereof. For example, because the length of a side of the square second coding units 1412a and 1412b is ½ times the length of a long side of the first coding unit 1410 having a non-square shape, a height of which is longer than its width, a depth of the square second coding units 1412a and 1412b is D+1 which is deeper than the depth D of the non-square first coding unit 1410 by 1.

Furthermore, the image decoding apparatus 100 may split the non-square first coding unit 1410 into an odd number of second coding units 1414a, 1414b, and 1414c based on the split shape mode information. The odd number of second coding units 1414a, 1414b, and 1414c may include the non-square second coding units 1414a and 1414c and the square second coding unit 1414b. In this case, because the length of a long side of the non-square second coding units 1414a and 1414c and the length of a side of the square second coding unit 1414b are ½ times the length of a long side of the first coding unit 1410, a depth of the second coding units 1414a, 1414b, and 1414c may be D+1 which is deeper than the depth D of the non-square first coding unit 1410 by 1. The image decoding apparatus 100 may determine depths of coding units split from the first coding unit 1420 having a non-square shape, a width of which is longer than its height, by using the aforementioned method of determining depths of coding units split from the first coding unit 1410.

According to an embodiment, the image decoding apparatus 100 may determine PIDs for identifying split coding units, based on a size ratio between the coding units when an odd number of split coding units do not have equal sizes. Referring to FIG. 14, a coding unit 1414b of a center location among an odd number of split coding units 1414a, 1414b, and 1414c may have a width being equal to that of the other coding units 1414a and 1414c and a height being twice that of the other coding units 1414a and 1414c. That is, in this case, the coding unit 1414b at the center location may include two of the other coding unit 1414a or 1414c. Therefore, when a PID of the coding unit 1414b at the center location is 1 based on a scan order, a PID of the coding unit 1414c located next to the coding unit 1414b may be increased by 2 and thus may be 3. That is, discontinuity in PID values may be present. According to an embodiment, the image decoding apparatus 100 may determine whether an odd number of split coding units do not have equal sizes, based on whether discontinuity is present in PIDs for identifying the split coding units.

According to an embodiment, the image decoding apparatus 100 may determine whether to use a particular splitting method, based on PID values for identifying a plurality of coding units determined by splitting a current coding unit. Referring to FIG. 14, the image decoding apparatus 100 may determine an even number of coding units 1412a and 1412b or an odd number of coding units 1414a, 1414b, and 1414c by splitting the first coding unit 1410 having a rectangular shape, a height of which is longer than its width. The image decoding apparatus 100 may use PIDs indicating respective coding units so as to identify the respective coding units. According to an embodiment, the PID may be obtained from a sample at a predetermined location of each coding unit (e.g., an upper left sample).

According to an embodiment, the image decoding apparatus 100 may determine a coding unit at a predetermined location from among the split coding units, by using the PIDs for distinguishing the coding units. According to an embodiment, when the split shape mode information of the first coding unit 1410 having a rectangular shape, a height of which is longer than its width, indicates to split a coding unit into three coding units, the image decoding apparatus 100 may split the first coding unit 1410 into three coding units 1414a, 1414b, and 1414c. The image decoding apparatus 100 may assign a PID to each of the three coding units 1414a, 1414b, and 1414c. The image decoding apparatus 100 may compare PIDs of an odd number of split coding units so as to determine a coding unit at a center location from among the coding units. The image decoding apparatus 100 may determine the coding unit 1414b having a PID corresponding to a middle value among the PIDs of the coding units, as the coding unit at the center location from among the coding units determined by splitting the first coding unit 1410. According to an embodiment, the image decoding apparatus 100 may determine PIDs for distinguishing split coding units, based on a size ratio between the coding units when the split coding units do not have equal sizes. Referring to FIG. 14, the coding unit 1414b generated by splitting the first coding unit 1410 may have a width being equal to that of the other coding units 1414a and 1414c and a height being twice that of the other coding units 1414a and 1414c. In this case, when the PID of the coding unit 1414b at the center location is 1, the PID of the coding unit 1414c located next to the coding unit 1414b may be increased by 2 and thus may be 3. When the PID is not uniformly increased as described above, the image decoding apparatus 100 may determine that a coding unit is split into a plurality of coding units including a coding unit having a size different from that of the other coding units. According to an embodiment, when the split shape mode information indicates to split a coding unit into an odd number of coding units, the image decoding apparatus 100 may split a current coding unit in such a manner that a coding unit of a predetermined location among an odd number of coding units (e.g., a coding unit of a centre location) has a size different from that of the other coding units. In this case, the image decoding apparatus 100 may determine the coding unit of the centre location, which has a different size, by using PIDs of the coding units. However, the PIDs and the size or location of the coding unit of the predetermined location are not limited to the aforementioned examples, and various PIDs and various locations and sizes of coding units may be used.

According to an embodiment, the image decoding apparatus 100 may use a predetermined data unit where a coding unit starts to be recursively split.

Figure 15:
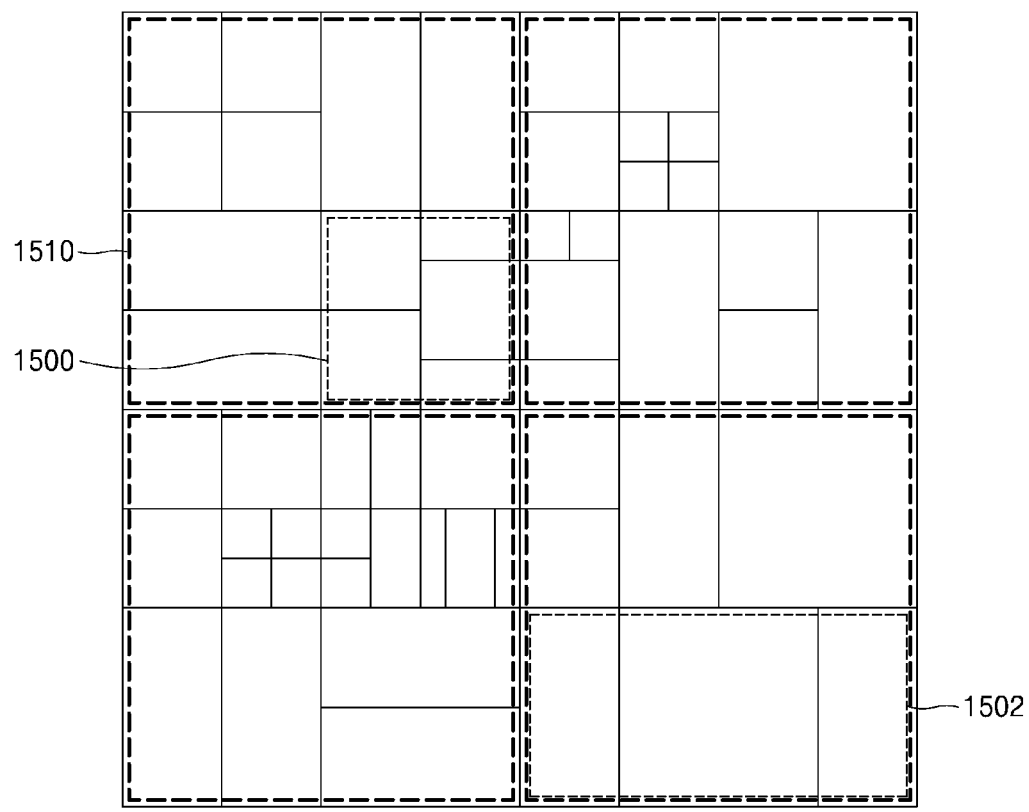
FIG. 15 illustrates that a plurality of coding units are determined based on a plurality of predetermined data units included in a picture, according to an embodiment.

FIG. 15 illustrates that a plurality of coding units are determined based on a plurality of predetermined data units included in a picture, according to an embodiment.

According to an embodiment, a predetermined data unit may be defined as a data unit where a coding unit starts to be recursively split by using at least one of block shape information and split shape mode information. That is, the predetermined data unit may correspond to a coding unit of an uppermost depth, which is used to determine a plurality of coding units split from a current picture. In the following descriptions, for convenience of explanation, the predetermined data unit is referred to as a reference data unit.

According to an embodiment, the reference data unit may have a predetermined size and a predetermined shape. According to an embodiment, the reference data unit may include M×N samples. Herein, M and N may be equal to each other, and may be integers expressed as powers of 2. That is, the reference data unit may have a square or non-square shape, and then may be split into an integer number of coding units.

According to an embodiment, the image decoding apparatus 100 may split the current picture into a plurality of reference data units. According to an embodiment, the image decoding apparatus 100 may split the plurality of reference data units, which are split from the current picture, by using the split shape mode information of each reference data unit. The operation of splitting the reference data unit may correspond to a splitting operation using a quadtree structure.

According to an embodiment, the image decoding apparatus 100 may previously determine the minimum size allowed for the reference data units included in the current picture. Accordingly, the image decoding apparatus 100 may determine various reference data units having sizes equal to or greater than the minimum size, and may determine one or more coding units by using the block shape information and the split shape mode information with reference to the determined reference data unit.

Referring to FIG. 15, the image decoding apparatus 100 may use a square reference coding unit 1500 or a non-square reference coding unit 1502. According to an embodiment, the shape and size of reference coding units may be determined based on various data units that may include one or more reference coding units (e.g., sequences, pictures, slices, slice segments, largest coding units, or the like).

According to an embodiment, the receiver (not shown) of the image decoding apparatus 100 may obtain, from a bitstream, at least one of reference coding unit shape information and reference coding unit size information with respect to each of the various data units. An operation of splitting the square reference coding unit 1500 into one or more coding units has been described above in relation to the operation of splitting the current coding unit 300 of FIG. 3, and an operation of splitting the non-square reference coding unit 1502 into one or more coding units has been described above in relation to the operation of splitting the current coding unit 400 or 450 of FIG. 4. Thus, detailed descriptions thereof will not be provided herein.

According to an embodiment, the image decoding apparatus 100 may use a PID for identifying the size and shape of reference coding units, to determine the size and shape of reference coding units according to some data units previously determined based on a predetermined condition. That is, the receiver (not shown) may obtain, from the bitstream, only the PID for identifying the size and shape of reference coding units with respect to each slice, each slice segment, or each largest coding unit which is a data unit satisfying a predetermined condition (e.g., a data unit having a size equal to or smaller than a slice) among the various data units (e.g., sequences, pictures, slices, slice segments, largest coding units, or the like). The image decoding apparatus 100 may determine the size and shape of reference data units with respect to each data unit, which satisfies the predetermined condition, by using the PID. When the reference coding unit shape information and the reference coding unit size information are obtained and used from the bitstream according to each data unit having a relatively small size, efficiency of using the bitstream may not be high, and therefore, only the PID may be obtained and used instead of directly obtaining the reference coding unit shape information and the reference coding unit size information. In this case, at least one of the size and shape of reference coding units corresponding to the PID for identifying the size and shape of reference coding units may be previously determined. That is, the image decoding apparatus 100 may determine at least one of the size and shape of reference coding units included in a data unit serving as a unit for obtaining the PID, by selecting the previously determined at least one of the size and shape of reference coding units based on the PID.

According to an embodiment, the image decoding apparatus 100 may use one or more reference coding units included in a largest coding unit. That is, a largest coding unit split from an image may include one or more reference coding units, and coding units may be determined by recursively splitting each reference coding unit. According to an embodiment, at least one of a width and height of the largest coding unit may be integer times at least one of the width and height of the reference coding units. According to an embodiment, the size of reference coding units may be obtained by splitting the largest coding unit n times based on a quadtree structure. That is, the image decoding apparatus 100 may determine the reference coding units by splitting the largest coding unit n times based on a quadtree structure, and may split the reference coding unit based on at least one of the block shape information and the split shape mode information according to various embodiments.

Figure 16:
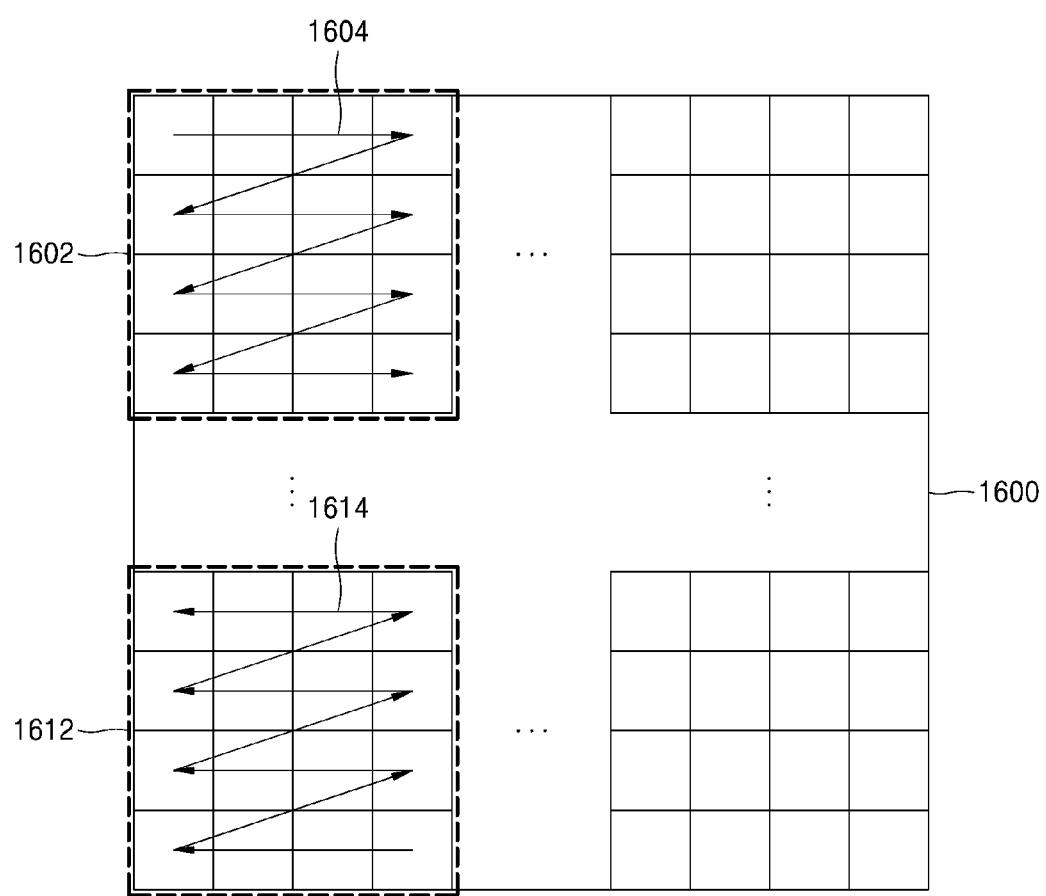
FIG. 16 illustrates a processing block serving as a criterion for determining a determination order of reference coding units included in a picture, according to an embodiment.

FIG. 16 illustrates a processing block serving as a criterion for determining a determination order of reference coding units included in a picture 1600, according to an embodiment.

According to an embodiment, the image decoding apparatus 100 may determine one or more processing blocks split from a picture. The processing block is a data unit including one or more reference coding units split from a picture, and the one or more reference coding units included in the processing block may be determined according to a particular order. That is, a determination order of one or more reference coding units determined in each of processing blocks may correspond to one of various types of orders for determining reference coding units, and may vary depending on the processing block. The determination order of reference coding units, which is determined with respect to each processing block, may be one of various orders, e.g., raster scan order, Z-scan, N-scan, up-right diagonal scan, horizontal scan, and vertical scan, but is not limited to the aforementioned scan orders.

According to an embodiment, the image decoding apparatus 100 may obtain processing block size information and may determine the size of one or more processing blocks included in the picture. The image decoding apparatus 100 may obtain the processing block size information from a bitstream and may determine the size of one or more processing blocks included in the picture. The size of processing blocks may be a predetermined size of data units, which is indicated by the processing block size information.

According to an embodiment, the receiver (not shown) of the image decoding apparatus 100 may obtain the processing block size information from the bitstream according to each particular data unit. For example, the processing block size information may be obtained from the bitstream in a data unit such as an image, sequence, picture, slice, slice segment, or the like. That is, the receiver (not shown) may obtain the processing block size information from the bitstream according to each of the various data units, and the image decoding apparatus 100 may determine the size of one or more processing blocks, which are split from the picture, by using the obtained processing block size information. The size of the processing blocks may be integer times that of the reference coding units.

According to an embodiment, the image decoding apparatus 100 may determine the size of processing blocks 1602 and 1612 included in the picture 1600. For example, the image decoding apparatus 100 may determine the size of processing blocks based on the processing block size information obtained from the bitstream. Referring to FIG. 16, according to an embodiment, the image decoding apparatus 100 may determine a width of the processing blocks 1602 and 1612 to be four times the width of the reference coding units, and may determine a height of the processing blocks 1602 and 1612 to be four times the height of the reference coding units. The image decoding apparatus 100 may determine a determination order of one or more reference coding units in one or more processing blocks.

According to an embodiment, the image decoding apparatus 100 may determine the processing blocks 1602 and 1612, which are included in the picture 1600, based on the size of processing blocks, and may determine a determination order of one or more reference coding units in the processing blocks 1602 and 1612. According to an embodiment, determination of reference coding units may include determination of the size of the reference coding units.

According to an embodiment, the image decoding apparatus 100 may obtain, from the bitstream, determination order information of one or more reference coding units included in one or more processing blocks, and may determine a determination order with respect to one or more reference coding units based on the obtained determination order information. The determination order information may be defined as an order or direction for determining the reference coding units in the processing block. That is, the determination order of reference coding units may be independently determined with respect to each processing block.

According to an embodiment, the image decoding apparatus 100 may obtain, from the bitstream, the determination order information of reference coding units according to each particular data unit. For example, the receiver (not shown) may obtain the determination order information of reference coding units from the bitstream according to each data unit such as an image, sequence, picture, slice, slice segment, or processing block. Because the determination order information of reference coding units indicates an order for determining reference coding units in a processing block, the determination order information may be obtained with respect to each particular data unit including an integer number of processing blocks.

According to an embodiment, the image decoding apparatus 100 may determine one or more reference coding units based on the determined determination order.

According to an embodiment, the receiver (not shown) may obtain the determination order information of reference coding units from the bitstream as information related to the processing blocks 1602 and 1612, and the image decoding apparatus 100 may determine a determination order of one or more reference coding units included in the processing blocks 1602 and 1612 and may determine one or more reference coding units, which are included in the picture 1600, based on the determination order. Referring to FIG. 16, the image decoding apparatus 100 may determine determination orders 1604 and 1614 of one or more reference coding units in the processing blocks 1602 and 1612, respectively. For example, when the determination order information of reference coding units is obtained with respect to each processing block, different types of the determination order information of reference coding units may be obtained for the processing blocks 1602 and 1612. When the determination order 1604 of reference coding units in the processing block 1602 is a raster scan order, reference coding units included in the processing block 1602 may be determined according to a raster scan order. On the contrary, when the determination order 1614 of reference coding units in the other processing block 1612 is a backward raster scan order, reference coding units included in the processing block 1612 may be determined according to the backward raster scan order.

According to an embodiment, the image decoding apparatus 100 may decode the determined one or more reference coding units. The image decoding apparatus 100 may decode an image, based on the reference coding units determined as described above. A method of decoding the reference coding units may include various image decoding methods.

According to an embodiment, the image decoding apparatus 100 may obtain, from the bitstream, block shape information indicating the shape of a current coding unit or split shape mode information indicating a splitting method of the current coding unit, and may use the obtained information. The block shape information or the split shape mode information may be included in the bitstream related to various data units. For example, the image decoding apparatus 100 may use the block shape information or the split shape mode information which is included in a sequence parameter set, a picture parameter set, a video parameter set, a slice header, a slice segment header, a tile header, or a tile group header. Furthermore, the image decoding apparatus 100 may obtain, from the bitstream, a syntax element corresponding to the block shape information or the split shape mode information according to each largest coding unit, each reference coding unit, or each processing block, and may use the obtained syntax element.

An image encoding apparatus, an image decoding apparatus, an image encoding method, and an image decoding method for encoding or decoding an image by performing inter prediction or the like on data units determined in various shapes according to various embodiments will be described with reference to FIGS. 17A through 21D below.

Figure 17A:
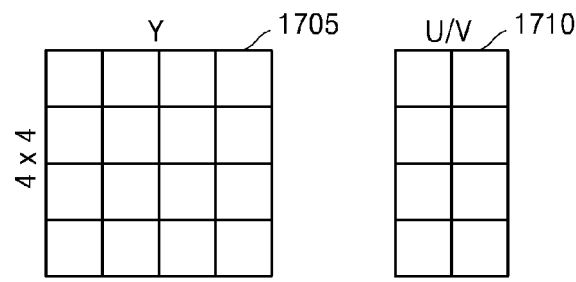
FIGS. 17A to 17C are diagrams for describing a process of determining a shape of a chroma block and motion information for motion compensation of chroma blocks when a format of a chroma image is 4:2:2, according to an embodiment.
Figure 17B:
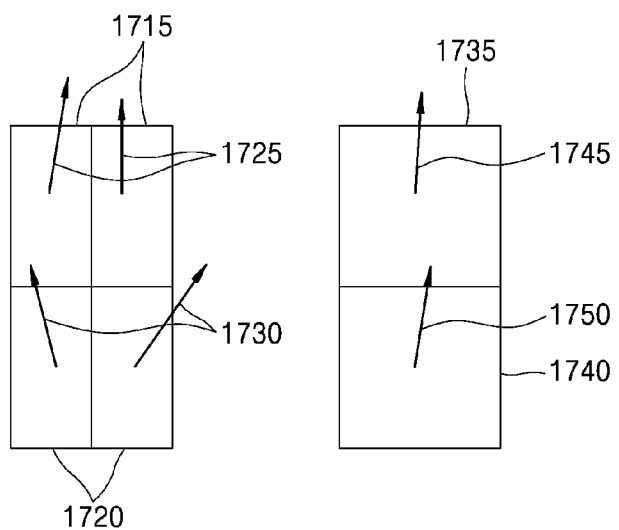
Figure 17C:
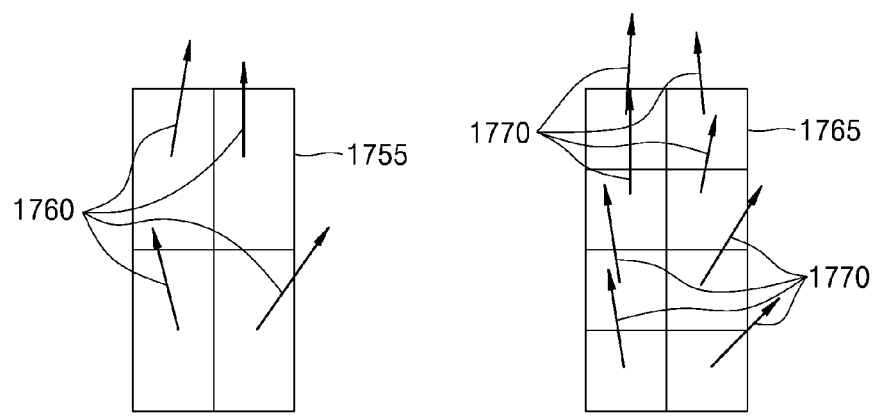

FIGS. 17A to 17C are diagrams for describing a process of determining a shape of a chroma block and motion information for motion compensation of chroma blocks when a format of a chroma image is 4:2:2, according to an embodiment.

FIG. 17A is a diagram for describing a shape of a chroma block when a format of a chroma image is 4:2:2, according to an embodiment.

Referring to FIG. 17A, when the format of the chroma image is 4:2:2, the image decoding apparatus 100 may determine a 2×4 chroma block UN 1710 corresponding to a 4×4 luma block Y 1705. That is, the image decoding apparatus 100 may determine a rectangular chroma block with respect to a square luma block. That is, the image decoding apparatus 100 may determine a chroma block having the same height as a luma block and a width half a width of the luma block.

FIG. 17B is a diagram for describing a process of performing motion compensation by merging motion information of chroma blocks adjacent to each other in a left-and-right direction when a format of a chroma image is 4:2:2, according to an embodiment.

Referring to FIG. 17B, the image decoding apparatus 100 may generate motion vectors 1745 and 1750 for 4×4 chroma blocks 1735 and 1740 by merging motion vectors 1725 and 1730 of 2×4 chroma blocks 1715 and 1720 adjacent to each other in a left-and-right direction. In this case, the image decoding apparatus 100 may determine an average value of the motion vectors 1725 and 1730 of the 2×4 chroma blocks 1715 and 1720 adjacent to each other in the left-and-right direction as a value of the motion vectors 1745 and 1750 for the 4×4 chroma blocks 1735 and 1740. Values of the motion vectors 1725 and 1730 may be determined based on values of motion vectors of luma blocks corresponding to the chroma blocks 1715 and 1720.

The image decoding apparatus 100 may perform motion compensation on the 4×4 chroma blocks 1735 and 1740 by using the motion vectors 1745 and 1750.

FIG. 17C is a diagram for describing a process of performing motion compensation by performing interpolation based on motion information of adjacent chroma blocks when a format of a chroma image is 4:2:2, according to an embodiment.

Referring to FIG. 17C, the image decoding apparatus 100 may perform an interpolation process on a motion vector 1760 of 2×4 chroma blocks 1755 and determine a motion vector 1770 of 2×2 chroma blocks 1765 according to a result of performing the interpolation process. The image decoding apparatus 100 may perform a motion compensation process on 2×2 chroma blocks by using the motion vector 1770.

Figure 18A:
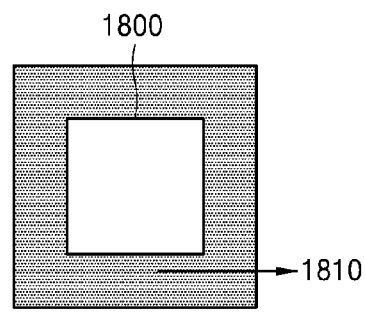
FIGS. 18A to 18C are diagrams for describing a problem in which a memory bandwidth increases during decoding based on a decoder side motion vector refinement (DMVR) technique and a method of solving the problem, according to an embodiment.
Figure 18B:
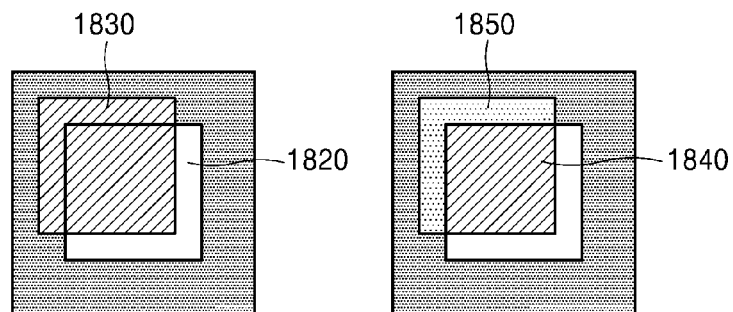
Figure 18C:
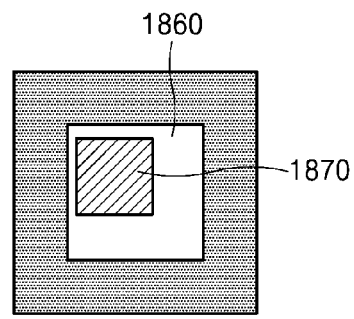

FIGS. 18A to 18C are diagrams for describing a problem in which a memory bandwidth increases when decoding is performed based on the DMVR technique and a method of solving this problem, according to an embodiment.

FIG. 18A is a diagram for describing a problem in which a memory bandwidth increases during decoding based on the DMVR technique according to an embodiment.

Referring to FIG. 18A, the image decoding apparatus 100 may determine a reference block 1800 corresponding to a current block, based on a motion vector during motion compensation. However, in order to refine the motion vector during inter prediction based on the DMVR technique, the image decoding apparatus 100 may refer to a pixel value of a neighboring region 1810 of the reference block 1800. That is, the image decoding apparatus 100 may additionally fetch the neighboring region 1810 to refine the motion vector. In this case, a memory bandwidth may increase.

FIG. 18B is a diagram for describing a process of refining a motion vector by referring only to an internal value of a reference block during decoding based on the DMVR decoding technique, according to an embodiment.

Referring to FIG. 18B, in order to solve the problem described above with reference to FIG. 18A, the image decoding apparatus 100 may perform the following process.

The image decoding apparatus 100 may perform a motion vector refinement process using only a pixel value of an overlapping portion 1840 between a search region 1830 for motion vector refinement and a reference block 1820 determined based on a motion vector. That is, the image decoding apparatus 100 may determine a pixel value of a non-overlapping portion 1850 by expanding the pixel value of the overlapping portion 1840, and perform the motion vector refinement process based on the pixel value of the search region 1830. In this case, the image decoding apparatus 100 may determine the pixel value of the non-overlapping portion 1850 by performing a padding process in horizontal and vertical directions by using a pixel value located at a boundary between the non-overlapping part 1850 and the overlapping part 1840. Embodiments of the disclosure are not limited thereto, and the image decoding apparatus 100 may perform a clipping process for pixel coordinates of the non-overlapping portion 1850 to modify the pixel coordinates to coordinates inside the overlapping portion 1840, and refer to a pixel value based on the modified coordinates. The image decoding apparatus 100 may prevent an increase in a memory bandwidth described above with reference to FIG. 18A by performing the motion vector refinement process by referring only to the pixel values of the reference block 1820.

FIG. 18C is a diagram for describing a process of refining a motion vector by referring only to an internal value of a reference block during decoding based on the DMVR decoding technique, according to an embodiment.

Referring to FIG. 18C, in order to solve the problem described above with reference to FIG. 18A, the image decoding apparatus 100 may perform the following process.

The image decoding apparatus 100 may limit a search region 1870 for motion vector refinement to the inside of a reference block 1860. That is, the image decoding apparatus 100 may prevent an increase in a memory bandwidth described above with reference to FIG. 18A by determining a region smaller than the reference block 1860 to be the search region 1870 for motion vector refinement.

Figure 19:
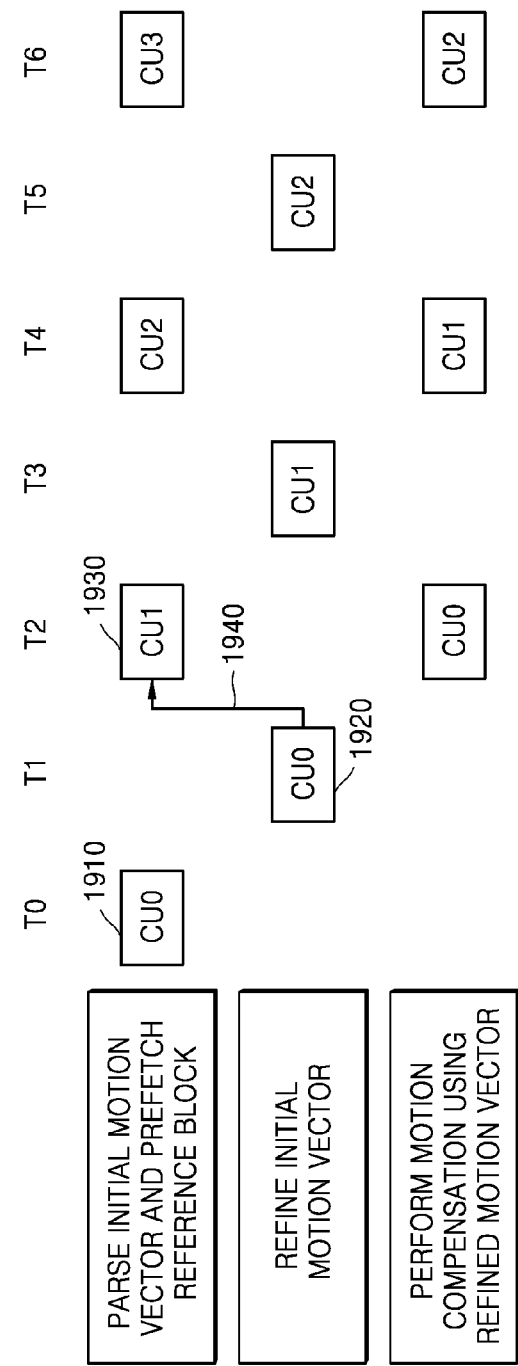
FIG. 19 is a diagram for describing a latency problem that may occur during decoding based on the DMVR technique and a method of solving the problem, according to an embodiment.

FIG. 19 is a diagram for describing a latency problem that may occur during decoding based on the DMVR technique and a method of solving the problem, according to an embodiment.

Referring to FIG. 19, the image decoding apparatus 100 may perform a process of parsing an initial motion vector of a coding unit CU0 and prefetching a reference block, based on a result of parsing for a time T0 (1910). The image decoding apparatus 100 may perform refinement of the first motion vector for a time T1, based on the first motion vector of the coding unit CU0 and the reference block (1920).

The image decoding apparatus 100 may refer to a motion vector of a neighboring block CU0 to perform a process of parsing an initial motion vector of a coding unit CU1 and prefetching a reference block based on a result of parsing. In this case, the referred motion vector may be a refined motion vector. Accordingly, the image decoding apparatus 100 may perform a process of refining the initial motion vector of the coding unit CU0 (1920), parsing the initial motion vector of the coding unit CU1 by referring to the refined motion vector (1940), and prefetching a reference block, based on a result of parsing (1930) for a time T2. Therefore, as long as a motion vector of a current block is determined based on a motion vector of a neighboring block, the image decoding apparatus 100 may perform a process of decoding a motion vector of a block being currently decoded only after the motion vector refinement process based on the DMVR technique is performed on a previously decoded block, thereby causing inter-process dependency. Eventually, a latency problem occurs due to this dependency.

To solve this problem, the image decoding apparatus 100 may perform a process of decoding a motion vector of a subsequent block, based on an initially decoded unrefined motion vector rather than a motion vector refined based on the DMVR technique. However, in this case, loss may occur due to the use of the initially decoded unrefined motion vector. The image decoding apparatus 100 may allocate low priority to motion vectors of DMVR-based inter predicted neighboring blocks during configuration of an AMVP or merge candidate list when a motion vector of a current block is determined based on a motion vector of an initially decoded previous block.

To reduce the loss, the image decoding apparatus 100 may not allow the inter prediction process based on the DMVR technique for some blocks, based on a predetermined condition. In this case, the condition may be a condition regarding whether the number of inter predicted neighboring blocks based on the DMVR technique is N or more.

Figure 20A:
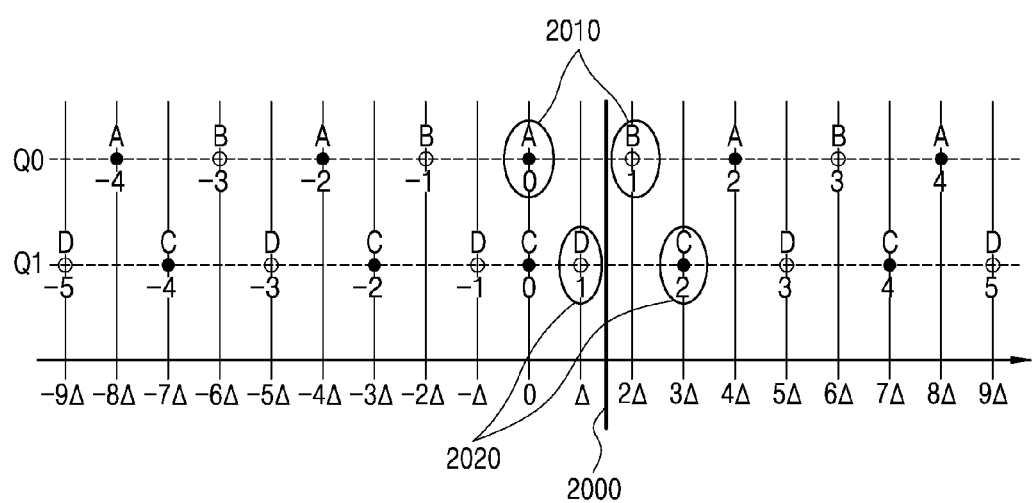
Figure 20B:
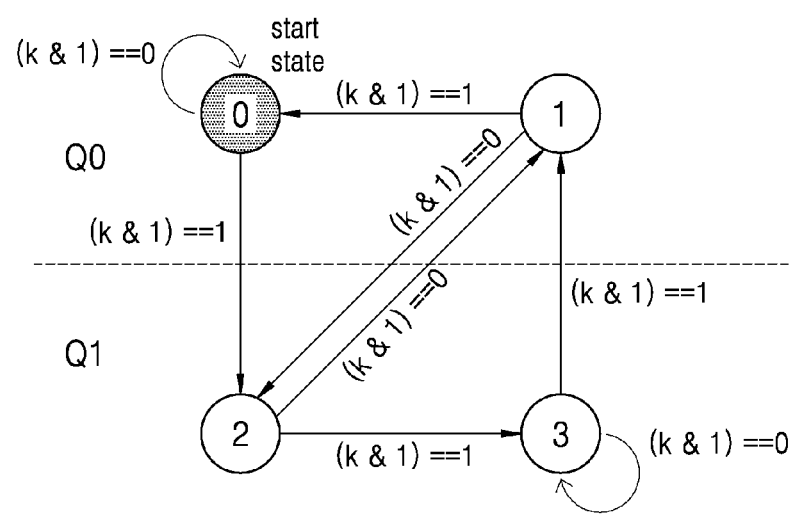

FIGS. 20A to 20C are diagrams for describing a dependent quantization process according to an embodiment.

FIG. 20A is a diagram illustrating a process of quantizing a current transform coefficient, based on the dependent quantization process, according to an embodiment.

Referring to FIG. 20A, the image encoding apparatus 200 may determine candidates A and B 2010 for a quantization unit Q0 and candidates C and D 2020 for a quantization unit Q1, based on an original transform coefficient 2005 generated through a transform process.

The image encoding apparatus 200 may calculate a rate distortion (RD) cost, based on a state based on parity of transform coefficients and the candidates 2010 and 2020, and determine a quantization unit to be used for a current transform coefficient and a quantization coefficient for the current transform coefficient, based on the RD cost. The image encoding apparatus 200 may modify a parity of a current original transform coefficient or a parity of a previous original transform coefficient, based on the RD cost, determine the quantization unit to be used for the current transform coefficient, and quantize the current transform coefficient. The state based on the parity of the transform coefficients will be described with reference to FIGS. 20B and 20C below.

A reconstruction level t' corresponding to the quantization unit Q0 may be determined based on Equation 5 below.

$$t'=2*k*\Delta \quad \text{[Equation 5]}$$

In this case, k is an associated transform coefficient level, may be a quantization transform coefficient (quantization index) to be transmitted, and $\Delta$ may be a quantization step size.

The reconstruction level t' corresponding to the quantization unit Q1 may be determined based on Equation 6 below.

$$t'=(2*k-\text{sgn}(k))*\Delta \quad \text{[Equation 6]}$$

In this case, sgn(k) may be determined based on Equation 7 below.

$$\text{sgn}(k)=(k==0?0:(k<0?-1:1)) \quad \text{[Equation 7]}$$

FIGS. 20B and 20C are diagrams illustrating a parity-based state machine of a coefficient to be used to perform the dependent quantization process, and a state table.

Referring to FIGS. 20B to 20C, the image encoding apparatus 200 may determine an initial state as a state 0, and determine a next state as the state 0 when a parity of a coefficient level k being currently encoded is 0 ((k&1)==0). When the parity of the coefficient level k being current encoded is 1 ((k&1)==1), the image encoding apparatus 200 may determine a next state as a state 2.

When a current state is the state 2, the image encoding apparatus 200 may determine a next state as a state 1 when the parity of the coefficient level k being currently encoded is 0 ((k&1)==0).

When the current state is the state 2, the image encoding apparatus 200 may determine a next state as a state 3 when the parity of the coefficient level k being currently encoded is 1 ((k&1)==1).

When the current state is the state 1, the image encoding apparatus 200 may determine a next state as the state 2 when the parity of the coefficient level k being currently encoded is 0 ((k&1)==0).

When the current state is the state 1, the image encoding apparatus 200 may determine a next state as the state 0 when the parity of the coefficient level k being currently encoded is 1 ((k&1)==1).

When the current state is the state 3, the image encoding apparatus 200 may determine a next state as the state 3 when the parity of the coefficient level k being currently encoded is 0 ((k&1)==0).

When the current state is the state 3, the image encoding apparatus 200 may determine a next state as the state 1 when the parity of the coefficient level k being currently encoded is 1 ((k&1)==1).

In addition, the image encoding apparatus 200 may determine one of the quantization units Q0 and Q1, based on the next state. When the next state is the state 0 or 1, the image encoding apparatus 200 may determine the quantization unit Q0 as a quantization unit for the current transform coefficient. When the state is the state 2 or 3, the image encoding apparatus 200 may determine the quantization unit Q1 as a quantization unit for the current transform coefficient.

The dependent quantization process according to an embodiment has been described above with reference to FIGS. 20A to 20C. However, although it has been described that the image encoding apparatus 200 changes a state, based on the parity of the current transform coefficient, embodiments of the disclosure are not limited thereto and it will be easily understood by those of ordinary skill in the art that the state may be changed based on a parity of an immediately decoded coefficient.

The dependent quantization process according to an embodiment has been described above with reference to FIGS. 20A to 20C. However, embodiments of the disclosure are not limited thereto, and it will be easily understood by those of ordinary skill in the art that a resolution of an MVD and a state machine for determining the MVD may be determined during encoding based on the AVMR technique, similar to the state machine of the dependent quantization process. That is, quantization parameters used for the quantization units Q0 and Q1 may correspond to the resolution of the MVD, and an MVD of a current block may correspond to a level of a current transform coefficient.

FIGS. 21A to 21D are diagrams illustrating a residual encoding syntax structure according to various embodiments.

FIG. 21A is a diagram illustrating a residual encoding syntax structure according to an embodiment.

Referring to FIG. 21A, the image decoding apparatus 100 may parse and decode each syntax element from a bitstream, based on an illustrated residual encoding syntax structure, and derive information indicated by each syntax element.

The image decoding apparatus 100 may parse a syntax element sig_coeff_flag 2105 from the bitstream, and perform context-model-based entropy decoding (ae(v)) on the syntax element sig_coeff_flag 2105. The syntax element sig_coeff_flag 2105 may be a flag indicating whether an absolute value of a transform coefficient at a current scan position (xC, yC) (determined based on n) is greater than 0.

When the syntax element sig_coeff_flag 2105 is 1, the image decoding apparatus 100 may parse a syntax element par_level_flag 2110 from the bitstream and perform context-based entropy decoding (ae(v)) on the syntax element par_level_flag 2110.

In this case, the syntax element par_level_flag 2110 may indicate a parity of a transform coefficient at a scan position n, which may be the same as (k&1) of FIGS. 20A to 20C.

When the image decoding apparatus 100 parses flags for parities of all transform coefficients from a bitstream and performs context-based entropy decoding thereon, complexity may increase considerably.

Accordingly, the image decoding apparatus 100 may not parse the flag for the transform coefficients at some locations from the bitstream, and set a current state to the state 0 (initial state) or the state 1 regardless of values of the parities of the transform coefficients at some locations or determine a value of a parity corresponding to the state 0 or the state 1. That is, for transform coefficients at some positions, an inverse quantization unit Q0 having a lower quantization parameter than a quantization parameter of an inverse quantization unit Q1 may be used for high accuracy and values of parity flags may be derived or states thereof may be determined without parsing the parity flags. However, embodiments of the disclosure are not limited thereto, and a value of a current parity flag may be derived, based on a parity of a previous coefficient, and a state of the state machine and an inverse quantization unit to be used for a current transform coefficient may be determined, based on the value of the current parity flag.

FIG. 21B is a diagram illustrating a residual encoding syntax structure according to another embodiment of the disclosure.

Referring to FIG. 21B, unlike FIG. 21A, only when a conditional sentence 2120 is satisfied, a syntax element par_level_flag 2130 may be parsed from a bitstream and entropy-decoded (ae(v)). That is, the image decoding apparatus 100 may parse the syntax element par_level_flag 2130 from the bitstream and perform entropy decoding (ae(v)) only when a condition that a scan position n should be greater than A and less than B is satisfied.

FIG. 21C is a diagram illustrating a residual encoding syntax structure according to another embodiment of the disclosure.

Referring to FIG. 21C, unlike FIG. 21A, only when a conditional sentence 2140 is satisfied, a syntax element par_level_flag 2150 may be parsed from a bitstream and entropy decoded (ae(v)). That is, the image decoding apparatus 100 may parse the syntax element par_level_flag 2150 from the bitstream and perform entropy decoding (ae(v)) only when a condition that a scan position n should be smaller than A is satisfied.

FIG. 21D is a diagram illustrating a residual encoding syntax structure according to another embodiment of the disclosure.

Referring to FIG. 21D, unlike FIG. 21A, only when a conditional statement 2160 is satisfied, a syntax element par_level_flag 2170 may be parsed from the bitstream and entropy decoded (ae(v)). That is, the image decoding apparatus 100 may parse the syntax element par_level_flag 2170 from the bitstream and perform entropy decoding (ae(v)) only when a condition that a scan position n should be greater than A is satisfied.

Although embodiments of the disclosure in which the image decoding apparatus 100 limits the number of syntax elements par_level_flag parsed from a bitstream have been described above with reference to FIGS. 21A to 21D, but embodiments of the disclosure are not limited thereto, and when the number of syntax elements par_level_flag parsed from a bitstream is counted and the number of the counted syntax elements par_level_flag is greater than or equal to a predetermined value, the syntax elements par_level_flag may no longer be parsed from the bitstream. In this case, the image decoding apparatus 100 may count not only the syntax elements par_level_flag parsed from the bitstream but also at least one of syntax elements sig_coeff_flag and rem_abs_gt1_flag parsed from the bitstream.

Here, the syntax element sig_coeff_flag may be a flag indicating whether a currently scanned coefficient is a significant coefficient (i.e., whether an absolute value of the coefficient is greater than 0), and the syntax element rem_abs_gt1_flag may be a flag indicating whether an absolute value of a currently scanned coefficient is greater than 1.

Although the operations of the image decoding apparatus 100 have been described above with reference to FIGS. 17A to 19 and 21A to 21D, it will be easily understood by those of ordinary skill in the art that the image encoding apparatus 200 may perform operations similar to those of the image decoding apparatus 100.

Similarly, although the operations of the image encoding apparatus 200 have been described above with reference to FIGS. 20A to 20C, it will be easily understood by those of ordinary skill in the art that the image decoding apparatus 100 may perform operations similar to those of the image encoding apparatus 200.

Various embodiments have been described above. It will be understood by those of ordinary skill in the art that the disclosure may be embodied in many different forms without departing from essential features of the disclosure. Therefore, the embodiments of the disclosure set forth herein should be considered in a descriptive sense only and not for purposes of limitation. The scope of the disclosure is set forth in the claims rather than in the foregoing description, and all differences falling within a scope equivalent thereto should be construed as being included in the disclosure.

The above-described embodiments of the disclosure may be written as a computer executable program and implemented by a general-purpose digital computer which operates the program via a computer-readable recording medium. The computer-readable recording medium may include a storage medium such as a magnetic storage medium (e.g., a ROM, a floppy disk, a hard disk, etc.) and an optical recording medium (e.g., a CD-ROM, a DVD, etc.).

The invention claimed is:

1. An image decoding method comprising:
 obtaining a first motion vector for a first N×N luma sub-block in a coding unit;
 obtaining a second motion vector for a second N×N luma sub-block in the coding unit, wherein the second N×N luma sub-block is on the right side of the first N×N luma sub-block;
 determining a chroma motion vector using an averaged motion vector determined by averaging the first motion vector and the second motion vector; and
 obtaining predicted samples for a N×N chroma sub-block, using the chroma motion vector and a reference picture, wherein the N×N chroma sub-block includes a first N/2×N chroma sub-block corresponding to the first N×N luma sub-block and a second N/2×N chroma sub-block corresponding to the second N×N luma sub-block.

2. An image decoding apparatus comprising at least one processor configured to:
 obtain a first motion vector for a first N×N luma sub-block in a coding unit;
 obtain a second motion vector for a second N×N luma sub-block in the coding unit, wherein the second N×N luma sub-block is on the right side of the first N×N luma sub-block;
 determine a chroma motion vector using an motion vector determined by averaging the first motion vector and the second motion vector;
 obtain predicted samples for a N×N chroma sub-block, using the chroma motion vector and a reference picture, wherein the N×N chroma sub-block includes a first N/2×N chroma sub-block corresponding to the first N×N luma sub-block and a second N/2×N chroma sub-block corresponding to the second N×N luma sub-block.

3. An image encoding method comprising:
 obtaining a first motion vector for a first N×N luma sub-block in a coding unit;
 obtaining a second motion vector for a second N×N luma sub-block in the coding unit, wherein the second N×N luma sub-block is on the right side of the first N×N luma sub-block;
 determining a chroma motion vector using an motion vector determined by averaging the first motion vector and the second motion vector;
 obtaining predicted samples for a N×N chroma sub-block, using the chroma motion vector and a reference picture, wherein the N×N chroma sub-block includes a first N/2×N chroma sub-block corresponding to the first N×N luma sub-block and a second N/2×N chroma sub-block corresponding to the second N×N luma sub-block.

* * * * *